United States Patent
Mehrabi

(10) Patent No.: US 12,507,032 B2
(45) Date of Patent: Dec. 23, 2025

(54) BINAURAL RENDERING INTERACTIONS

(71) Applicant: Sonos, Inc., Santa Barbara, CA (US)

(72) Inventor: Adib Mehrabi, London (GB)

(73) Assignee: Sonos, Inc., Goleta, CA (US)

( * ) Notice: Subject to any disclaimer, the term of this patent is extended or adjusted under 35 U.S.C. 154(b) by 115 days.

(21) Appl. No.: 18/411,964

(22) Filed: Jan. 12, 2024

(65) Prior Publication Data

US 2024/0259747 A1  Aug. 1, 2024

Related U.S. Application Data

(60) Provisional application No. 63/479,910, filed on Jan. 13, 2023, provisional application No. 63/518,698, (Continued)

(51) Int. Cl.
| | |
|---|---|
| H04R 5/033 | (2006.01) |
| G06F 3/01 | (2006.01) |
| G06F 3/16 | (2006.01) |
| H04R 5/02 | (2006.01) |
| H04R 5/027 | (2006.01) |

(Continued)

(52) U.S. Cl.
CPC ............. *H04S 7/306* (2013.01); *G06F 3/012* (2013.01); *G06F 3/013* (2013.01); *G06F 3/162* (2013.01); *G06F 3/165* (2013.01); *H04R 5/02* (2013.01); *H04R 5/027* (2013.01); *H04R 5/033* (2013.01); *H04R 5/04* (2013.01); *H04S 3/008* (2013.01); *H04S 7/30* (2013.01); *H04S 7/303* (2013.01); *H04S 7/304* (2013.01); *H04R 2420/07* (2013.01); *H04S 2400/01* (2013.01); *H04S 2400/11* (2013.01); *H04S 2400/15* (2013.01)

(58) Field of Classification Search
CPC . H04S 7/306; H04S 7/30; H04S 7/303; H04S 7/304; G06F 3/012; G06F 3/013; G06F 3/162; G06F 3/165; H04R 5/02; H04R 5/027; H04R 5/033; H04R 5/04
USPC ................ 381/17–19, 22–23, 309
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.

(Continued)

*Primary Examiner* — George C Monikang
(74) *Attorney, Agent, or Firm* — Fortem IP LLP

(57) ABSTRACT

Example technologies described herein relate to spatial audio on wearable playback devices, such as headphone and earbuds. Such technologies may include forms of binaural rendering of audio, which is played back on the wearable playback devices. These technologies may create or enhance an immersive listening experience which, to the listener, does not sound like you are listening on a wearable device, but are instead listening to a well-tuned, well-place, three-dimensional audio system of loudspeakers in a particular listening environment, such as the listener's actual living room.

20 Claims, 42 Drawing Sheets

Related U.S. Application Data filed on Aug. 10, 2023, provisional application No. 63/518,699, filed on Aug. 10, 2023, provisional application No. 63/518,702, filed on Aug. 10, 2023, provisional application No. 63/586,785, filed on Sep. 29, 2023, provisional application No. 63/586,808, filed on Sep. 29, 2023, provisional application No. 63/591,633, filed on Oct. 19, 2023, provisional application No. 63/591,650, filed on Oct. 19, 2023.

(51) Int. Cl.
*H04R 5/04* (2006.01)
*H04S 3/00* (2006.01)
*H04S 7/00* (2006.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 12,407,984 | B2 | 9/2025 | Spittle |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2007/0142944 | A1 | 6/2007 | Goldberg et al. |
| 2017/0188172 | A1 | 6/2017 | Horbach |
| 2020/0068335 | A1 | 2/2020 | Eronen et al. |
| 2022/0386063 | A1* | 12/2022 | Abel ............... H04S 7/302 |
| 2024/0205632 | A1 | 6/2024 | Scheuregger |
| 2024/0305946 | A1 | 9/2024 | Landemaine et al. |
| 2025/0024220 | A1 | 1/2025 | Munoz et al. |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
*Sonos, Inc.* v. *D&M Holdings* (No. 14-1330-RGA), DI 219, Claim Construction Opinion (Jan. 12, 2017) (24 pages).
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Notice of Allowance mailed on Sep. 16, 2025, issued in connection with U.S. Appl. No. 18/411,970, filed Jan. 12, 2024, 08 pages.

* cited by examiner

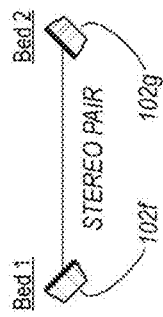
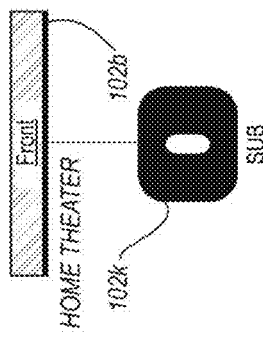
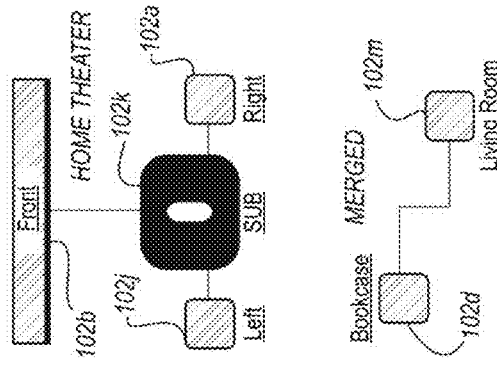
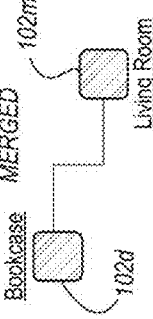
*Fig. 3B*
*Fig. 3C*
*Fig. 3D*
*Fig. 3E*
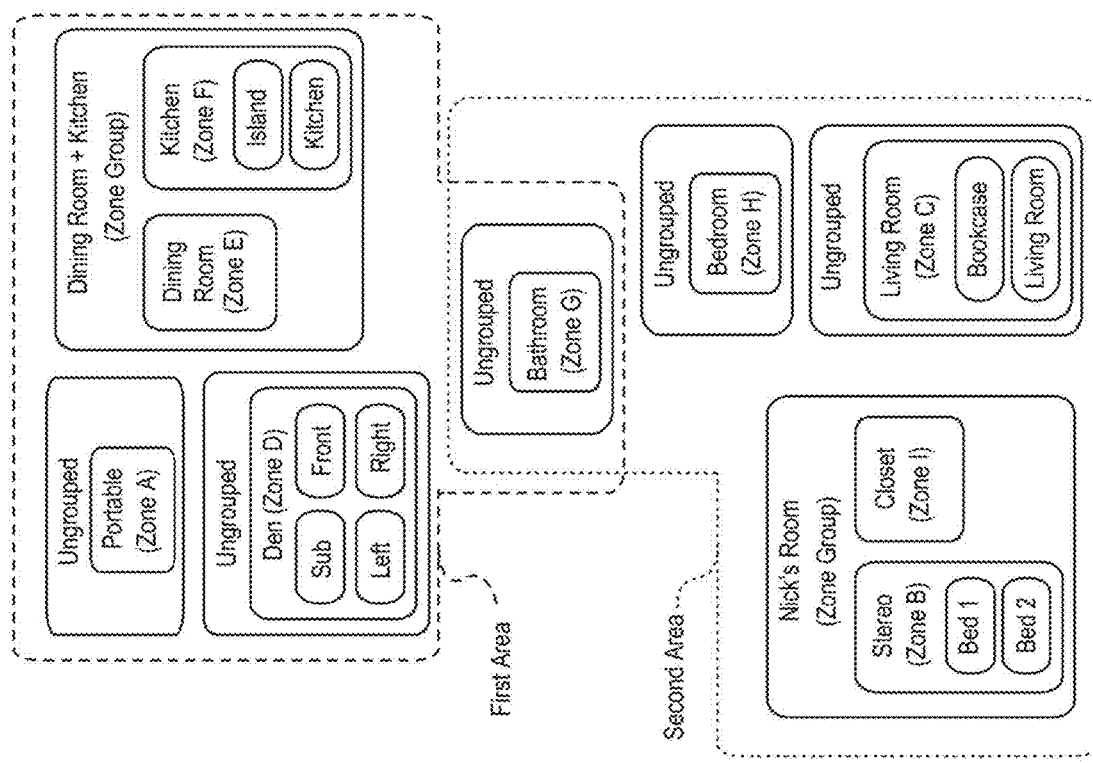
*Fig. 3A*

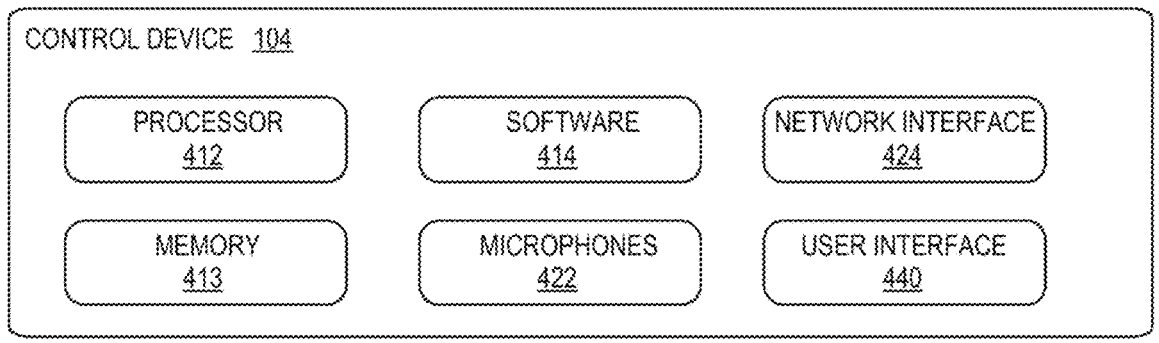
Fig. 4
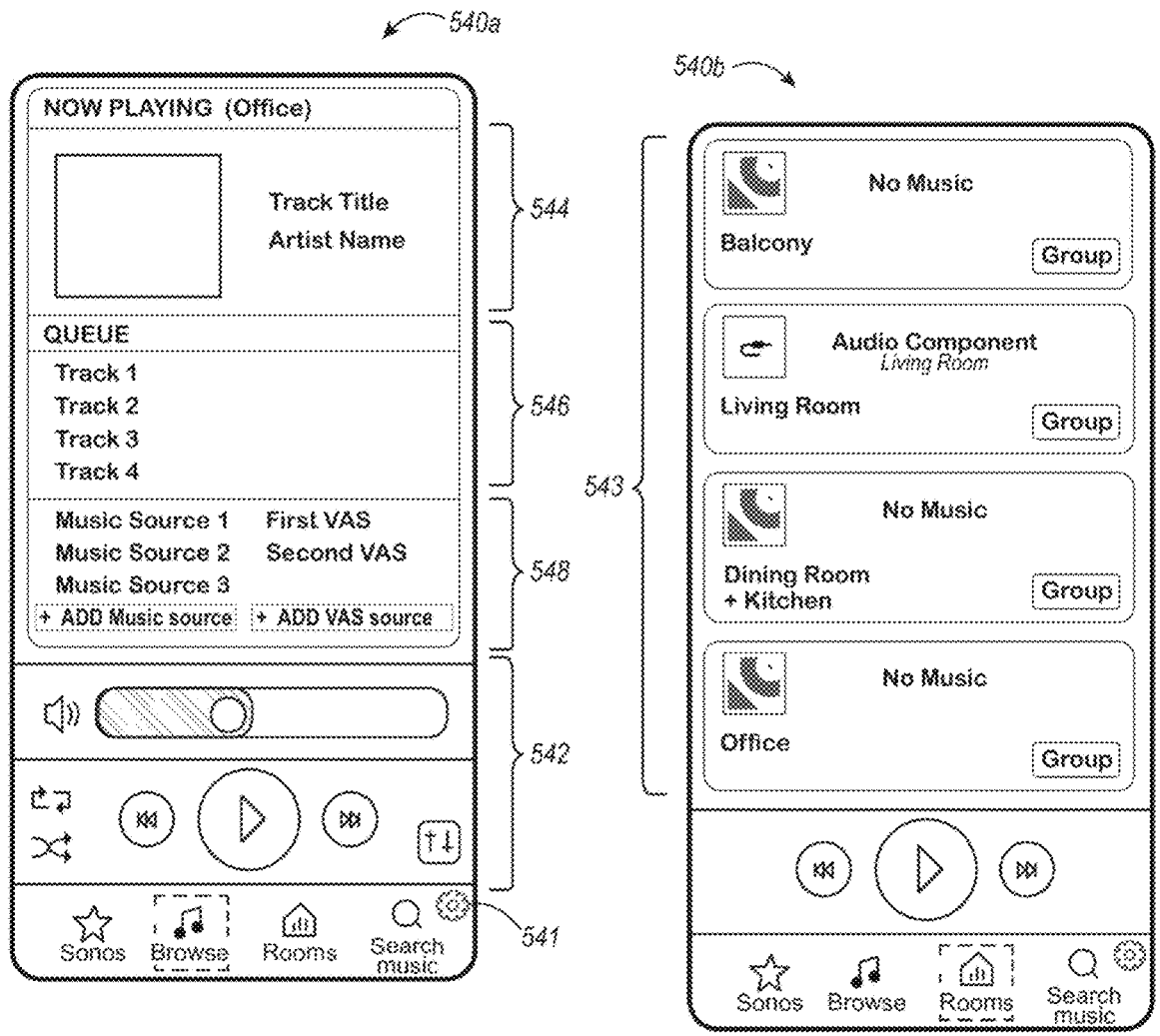
Fig. 5A
Fig. 5B

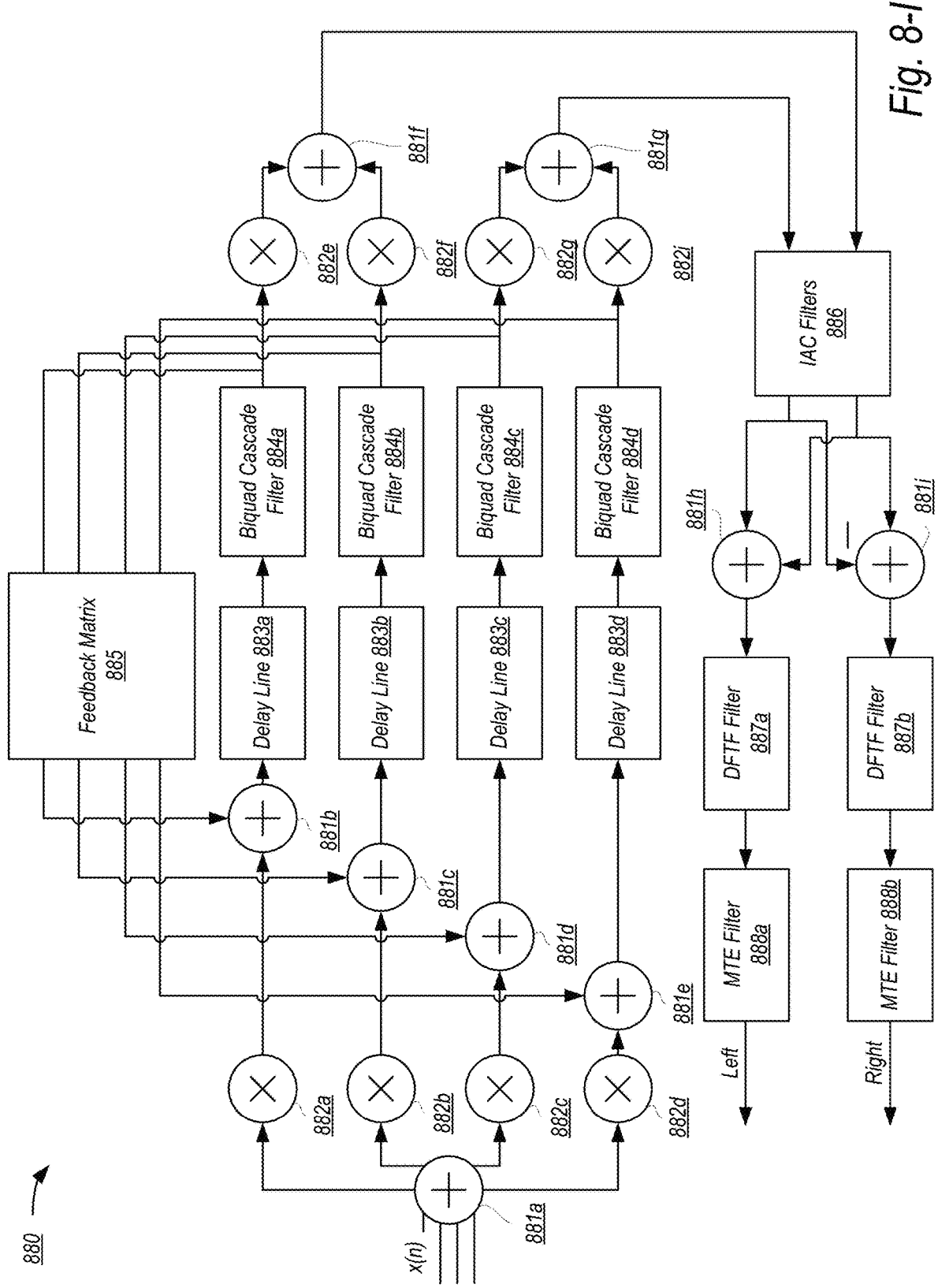
Fig. 8-I

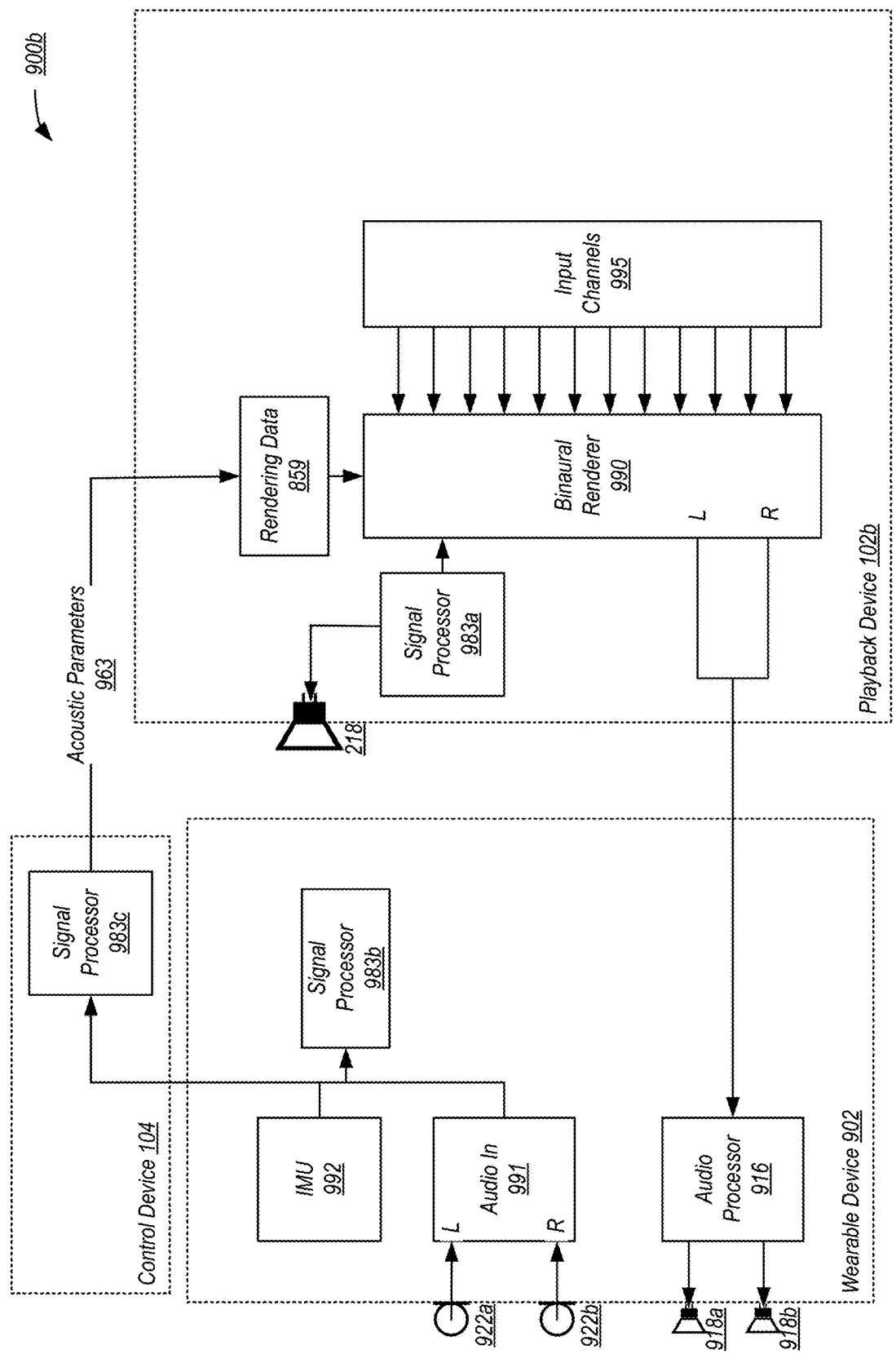

BINAURAL RENDERING INTERACTIONS

CROSS-REFERENCE TO RELATED APPLICATIONS

This application claims the benefit of priority to U.S. Patent Application No. 63/479,910, filed Jan. 13, 2023, U.S. Patent Application No. 63/518,698, filed Aug. 10, 2023, U.S. Patent Application No. 63/518,699, filed Aug. 10, 2023, U.S. Patent Application No. 63/518,702, filed Aug. 10, 2023, U.S. Patent Application No. 63/586,785, filed Sep. 29, 2023, U.S. Patent Application No. 63/586,808, filed Sep. 29, 2023, U.S. Patent Application No. 63/591,633, filed Oct. 19, 2023, and U.S. Patent Application No. 63/591,650, filed Oct. 19, 2023, which are each incorporated herein by reference in their entirety.

FIELD OF THE DISCLOSURE

The present technology relates to consumer goods and, more particularly, to methods, systems, products, features, services, and other elements directed to voice-assisted control of media playback systems or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings where:

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 3A, 3B, 3C, 3D and 3E are diagrams showing example playback device configurations in accordance with aspects of the disclosure.

FIG. 4 is a functional block diagram of an example controller device in accordance with aspects of the disclosure.

FIGS. 5A and 5B are controller interfaces in accordance with aspects of the disclosure.

FIG. 8I is a block diagram illustrating example late reverberation generation in accordance with aspects of the disclosed technology.

FIG. 9B is a block diagram illustrating a system to facilitate room-adapted binaural rendering in accordance with aspects of the disclosed technology.

Figure 1A:
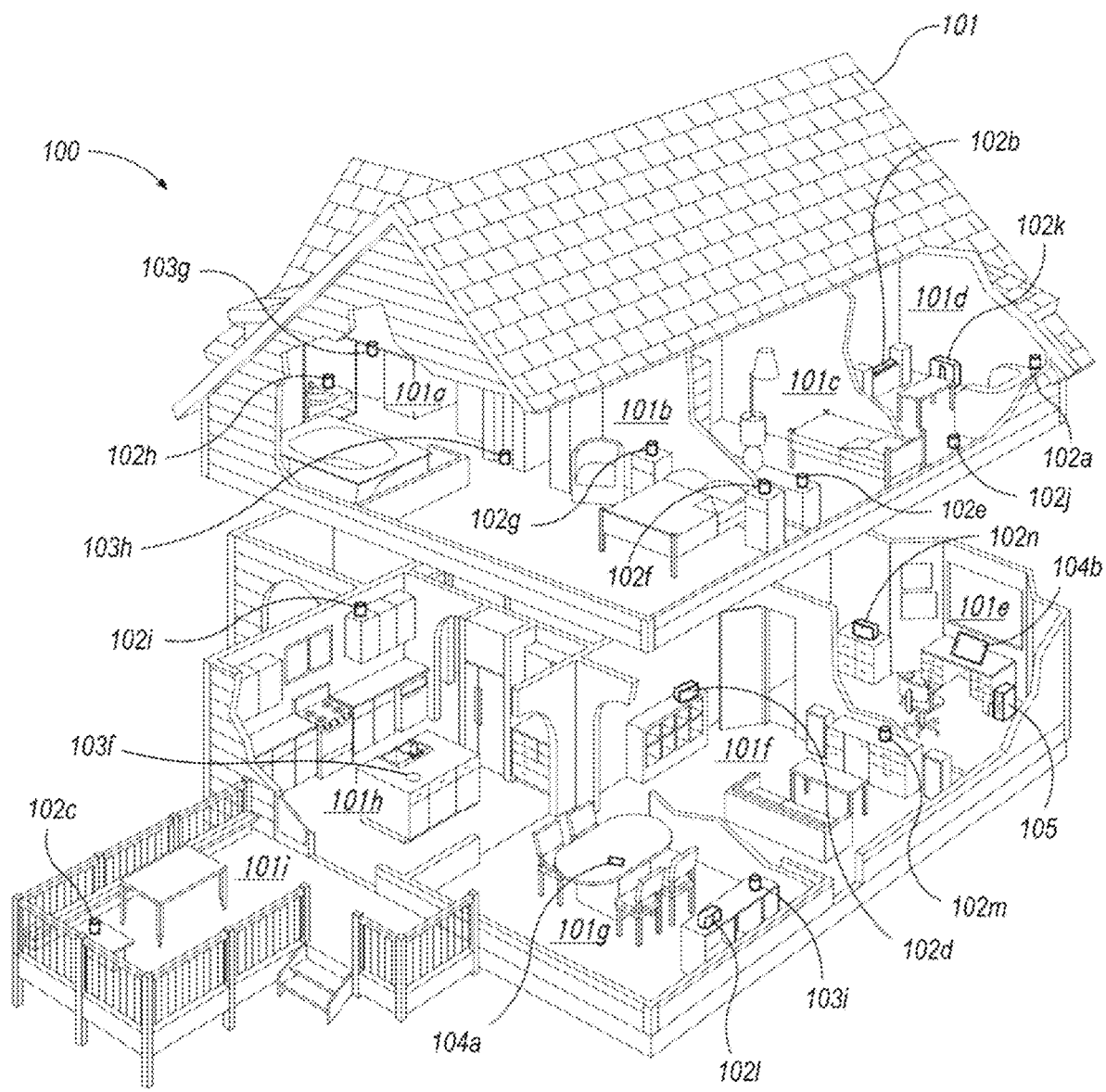
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles, and other features shown in the Figures are merely illustrative of particular embodiments of the disclosed technology. Accordingly, other embodiments can have other details, dimensions, angles, and features without departing from the spirit or scope of the disclosure. In addition, those of ordinary skill in the art will appreciate that further embodiments of the various disclosed technologies can be practiced without several of the details described below.

DETAILED DESCRIPTION

I. Overview

Example technologies described herein relate to spatial audio techniques on wearable playback devices, such as headphones and earbuds. Such techniques may include forms of binaural rendering of audio, which is played back on the wearable playback devices. These technologies may create or enhance an immersive listening experience that, to the listener, does not sound like you are listening on a wearable device, but are instead listening to a well-tuned, well-placed, three-dimensional audio system of loudspeakers in a particular listening environment, such as the listener's actual living room.

The example technologies may include binaural rendering in a media playback system. An example media playback system to utilize such binaural rendering may include a playback device, such as a soundbar, and a wearable device, such as a headphone device or earbuds. A user may switch between out-loud listening on the playback device and private listening on the wearable device. For instance, a soundbar may receive television audio and then send the television audio to the headphone device for headphone listening, perhaps after performing binaural rendering on the television audio. Binaural rendering in the media playback system may provide a similar listening experience in a given listening environment whether listening out-loud or via the headphone device.

Cooperation between the playback device and the wearable device may improve binaural rendering in the example media playback system relative to other example binaural rendering technology. Some example binaural rendering technologies provide dynamic binaural rendering with head tracking, which aim to create a "virtual sound stage" that gives a headphone listener the impression of the listener being surrounded by speakers. Such speakers are not actually in the room, however, these techniques use generic room models (e.g., a "typical" living room or a concert hall, among other examples) to create the virtual sources.

While such techniques may be appropriate for audio-only experiences, audio-visual experiences, such as watching a movie or television (and listening to accompanying audio), are enhanced by multi-modal congruence between the external listening environment (e.g., the living room) and what the listener is hearing. That is, when wearing the headphones, the audio should appear to come from the television regardless of which direction the user's head (and thus the worn headphone device) is oriented. Moreover, the audio should appear as if the audio is being played back out loud in the listening environment rather than privately via the wearable device. While audio-visual experiences benefit from such rendering due to the user's interaction with both mediums, audio-only experiences, such as music listening, may also be enhanced given the qualities such congruence confers.

To further such multi-modal congruence, example binaural rendering technology may involve configuring a binaural renderer (e.g., on the playback device) with a representation of the acoustic characteristics of the listening environment such that, during rendering, the binaural-rendered audio takes on these acoustic characteristics. Some example binaural rendering techniques may use directly-measured binaural room impulse responses (BRIRs) to impart such characteristics. However, such directly-measured BRIRs have potential drawbacks in practical applications within a user's home or other listening environment. In particular, direct measurement of BRIRs may involve a lengthy measurement period (e.g., >30 seconds). During this measurement, any noise or movement would negatively impact the measurement quality.

Rather than direct measurement, example binaural rendering may involve synthesis of binaural room impulse responses for binaural rendering. Example techniques may involve using analysis of impulse response (IR) measurements to generate a set of binaural filters for use in real-time binaural rendering. In contrast to lengthy and sensitive measurement of BRIRs, such IR measurements may can be measured more quickly (e.g., <30 seconds) with much less sensitivity to noise and movement.

More particularly, such IR measurements in a particular listening environment may be used to determine target room acoustic characteristic parameters that represent perceptually-important acoustic characteristics. These target room acoustic characteristic parameters may then be used as input along with reference (i.e., existing) binaural filters in an adaptation process. The adaptation process adapts the reference binaural filters using the room acoustic characteristic parameters into a parametric model representing a room impulse response (RIR) of the particular listening environment.

Within examples, the RIR model is divided into sections corresponding to different portions of the RIR, such as directly propagating sound, reflected sound, and diffuse reverberation (i.e., reflections that are too dense to individually distinguish aurally). Differences in acoustic characteristics between environments are largely represented by the reflections and reverberations created by the environment; directly propagating sound is similar in different environments including anechoic conditions. As such, an example parametric model of a RIR may include a direct sound portion (representing the direct path between the sound source and the listener's ears), an early reflections portion (representing build-up of environmental acoustic reflections reaching the listener's point up to a mixing time), and a late reverberation portion (representing diffuse reverberation after the mixing time).

Within examples, these different portions may be determined using different techniques, which may improve computational efficiency relative to other techniques, such as those that treat these different portions similarly. For instance, the early reflections may be generated using filter adaptation while the late reverberation is generated using a feedback delay network, which may more accurately or efficiently represent those portions of the RIR. Further, given the similarity of the direct sound across environments, the direct sound may use a fixed head-related impulse response (HRIR) filter set, which may reduce computational complexity and/or and improve the consistency of sound quality.

As part of the adaptation process, the different sections may be conditioned using various techniques to facilitate correspondence among the sections. For example, the adaptation process may gain-match the early reflections and the late reverberation to facilitate a smooth transition between these components. Further, additional gain adjustments may be performed to achieve the appropriate direct-to-reverberant ratio as compared with the direct sound HRIR. Yet further, the entire filter set may be normalized for consistent output loudness.

As noted above, impulse responses of the listening environment may be measured using the playback device and wearable device to derive target room parameters. In particular, the playback device may output audio and the headphone device may capture the direct audio as well as reflections within the listening environment via microphones on the headphone device (e.g., while the user is wearing the headphone device in a preferred listening location, such as a sofa or chair). Acoustic characteristics of the environment are indicated in the difference between the played back and captured audio (assuming that inherent characteristics of the speakers and microphones are accounted for). Such microphones may be mounted on the external housing of the headphone device (e.g., on the earcups) to facilitate audio capture.

Yet further, example binaural rendering technology may also involve configuring the binaural rendering with current user head orientation. Some binaural rendering techniques use an inertial measurement unit (IMU) to track user head orientation. However, over time, IMUs drift and need to be re-zeroed. Some existing techniques will zero when a user holds their head still for a threshold time period, which can create issues when the user looks away from the television for the threshold time period (e.g., if the user for instance, looks down at their phone on their lap during a commercial break). In such cases, the television sound may then appear to come from the user's lap (or wherever they were looking when the IMU was re-zeroed).

To avoid such issues, example binaural rendering described herein may anchor the IMU to the playback device, which acts as a proxy for the location of the television (given that soundbars are typically more or less centered below (or above) the television). In particular, the media playback system may measure the angle between the playback device and the headphone device using time-of-flight measurements between the playback device and microphones on each of the earcups. That is, differences between time-of-flight of audio output by the playback device and captured by a first microphone on the left earcup and time-of-flight of the same audio captured by a second microphone on the right earcup are indicative of orientation of the headphone device relative to the playback device.

Such anchoring may involve combining the IMU data and data from the time-of-flight measurements to generate an estimation of head position. Over time, the time-of-flight measurement can be repeated to facilitate re-estimation of head position (which may change with user head movement). Such estimations may have significantly greater accuracy than estimations based on IMU data alone because the anchor provides a stable reference point in the environment which can mitigate IMU drift.

In combination, such technologies may enhance binaural rendering such that audio played back by the headphone device appears to not originate from the headphone device, but rather to originate from the playback device. Moreover, the acoustic characteristics of the playback device and the listening environment are included in the binaural rendering such that the characteristics of the sound are of the playback device in the listening environment, rather than that of private listening on the headphone device. Yet further, such immersive effects are retained over time and various user head positions by zeroing the head tracking to a physical reference point in the listening environment (i.e., the television, via its proxy, the playback device).

A spatial audio rendering system may change its operation based on various interactions with one or more users. For instance, direct user interactions, such as user input received via a user interface, may cause the system 900 to toggle spatial audio rendering (e.g., on or off). Moreover, indirect user actions, such as movement within (or outside of) the listening environment, may also cause the system 900 to change its mode of operation.

As noted above, example technologies relate to binaural rendering. An example may include a system comprising a wearable playback device and a playback device. The system is configured to: receive a command to play back audio on a wearable playback device; after the wearable playback device is donned by a user, determine, via a first gaze direction estimator, first preliminary estimates of user gaze direction, the first preliminary estimates based on one or more time-of-flight measurements of at least one signal propagating from a non-wearable playback device at a first location in a listening environment to the wearable playback device at a second location in the listening environment; determine, via a second gaze direction estimator, second preliminary estimates of user gaze direction, the second preliminary estimates based on first samples from an inertial measurement unit (IMU); estimate gaze directions based on fusion of the first gaze direction estimates and the second preliminary estimates; determine head tracking data based on a rotation of second samples from the IMU to a reference frame centered on the estimated gaze directions; during binaural rendering of the audio via a binaural renderer, update binaural rendering filters with the determined head tracking data; and cause the wearable playback device to play back the binaural-rendered audio to simulate playback from at least one virtual source in the listening environment.

Another example may include a system comprising a wearable playback device and a playback device. The system is configured to: send, via a wireless network interface, instructions to play a localization signal on a non-wearable playback device at a first location in a listening environment; while a wearable playback device is donned by a user at a second location in the listening environment, capture, via microphones of the wearable playback device; recordings of the localization signal, wherein the microphones comprise first microphones carried on a first earcup of the wearable playback device and second microphones carried on a second earcup of the wearable playback device; determine respective times-of-arrival of the localization signal at the microphones; determine pairwise angles-of-arrival for each pair of the microphones that are on opposite earcups such that each pair includes one of the first microphones and one of the second microphones; determine an ensemble angle-of-arrival based on the determined pairwise angles-of-arrival; add the determined ensemble angle-of-arrival to a buffer representing estimated user gaze directions; determine head tracking data based on a rotation of samples from an inertial measurement unit (IMU) to a reference frame centered on the estimated gaze directions stored in the buffer; during binaural rendering of the audio via a binaural renderer, update binaural rendering filters with the determined head tracking data; and cause the wearable playback device to play back the binaural-rendered audio to simulate playback from at least one virtual source in the listening environment, wherein the at least virtual source comprises the non-wearable playback device at the first location.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

Moreover, some functions are described herein as being performed "based on" or "in response to" another element or function. "Based on" should be understood that one element or function is related to another function or element. "In response to" should be understood that one element or function is a necessary result of another function or element. For the sake of brevity, functions are generally described as being based on another function when a functional link exists; however, such disclosure should be understood as disclosing either type of functional relationship.

II. Example Operation Environment

Figure 1B:
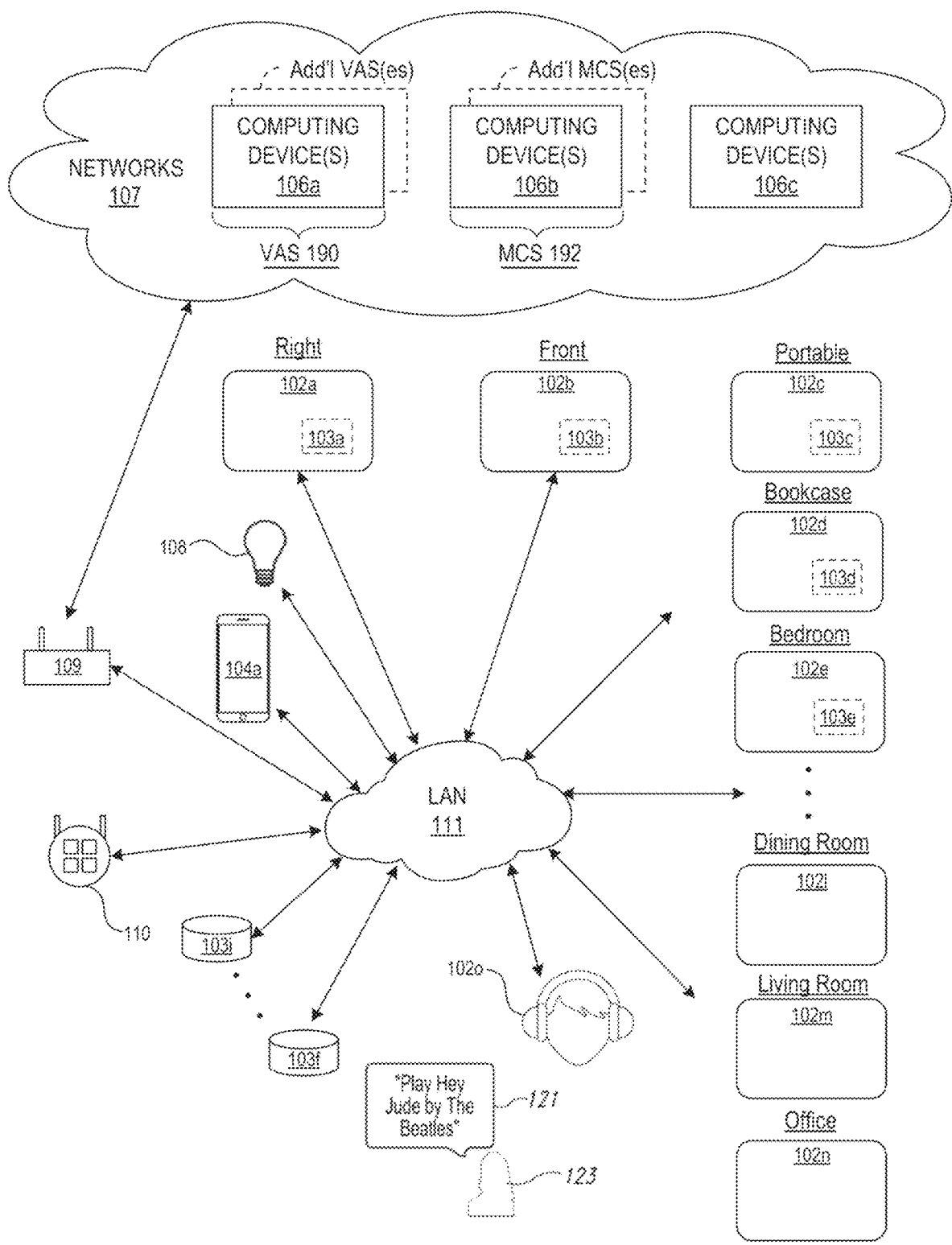
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b, (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A).

In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a LAN including a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-d. In some embodiments, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
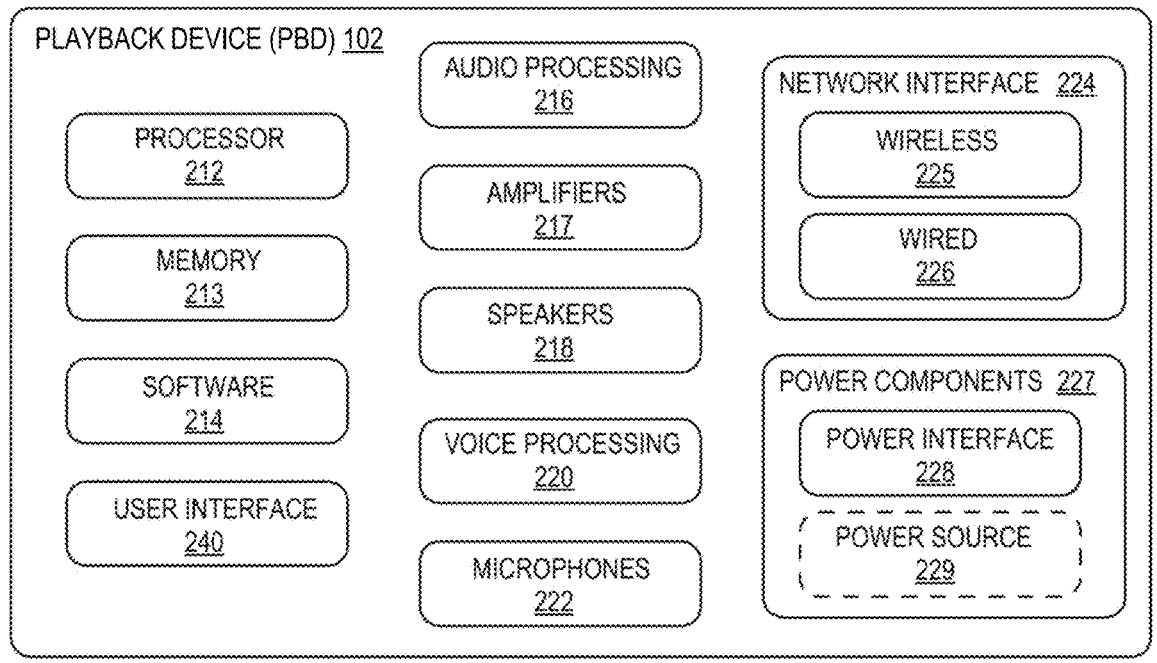
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device (s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
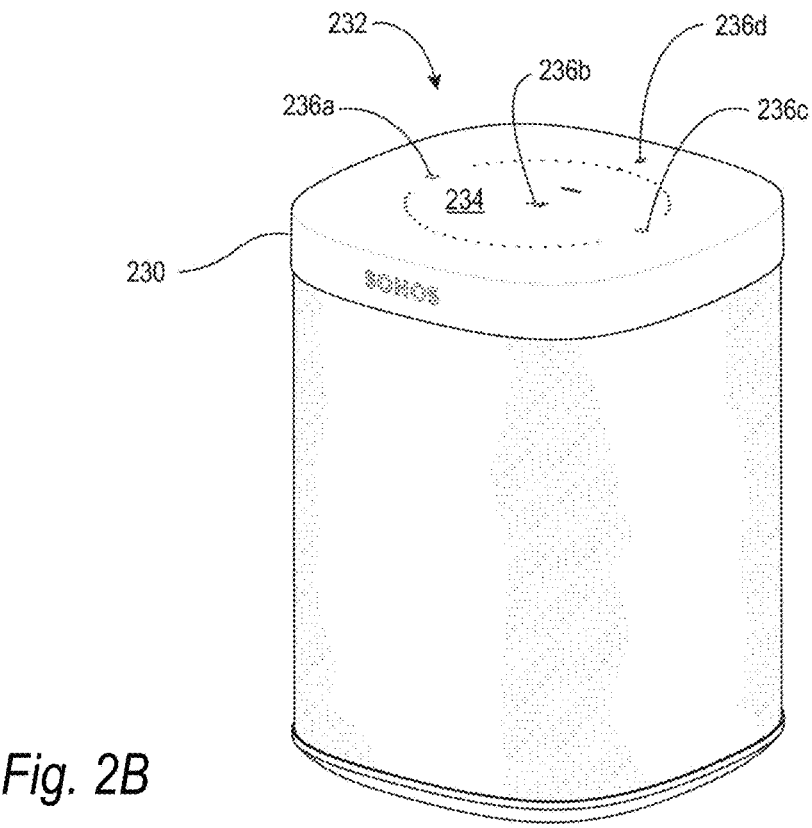
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the embodiments disclosed herein, including a "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
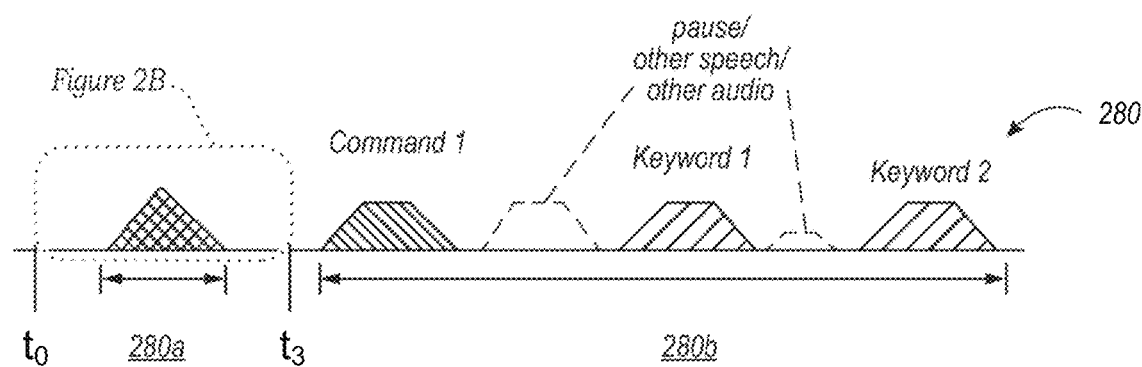
FIG. 2C is a diagram of an example voice input.

FIG. 2C is a diagram of an example voice input 280 that may be processed by an NMD or an NMD-equipped playback device. The voice input 280 may include a keyword portion 280a and an utterance portion 280b. The keyword portion 280a may include a wake word or a local keyword.

In the case of a wake word, the keyword portion 280a corresponds to detected sound that caused a VAS wake-word event. In practice, a wake word is typically a predetermined nonce word or phrase used to "wake up" an NMD and cause it to invoke a particular voice assistant service ("VAS") to interpret the intent of voice input in detected sound. For example, a user might speak the wake word "Alexa" to invoke the AMAZON® VAS, "Ok, Google" to invoke the GOOGLE® VAS, or "Hey, Siri" to invoke the APPLE® VAS, among other examples. In practice, a wake word may also be referred to as, for example, an activation-, trigger-, wakeup-word or -phrase, and may take the form of any suitable word, combination of words (e.g., a particular phrase), and/or some other audio cue.

The utterance portion 280b corresponds to detected sound that potentially comprises a user request following the keyword portion 280a. An utterance portion 280b can be processed to identify the presence of any words in detected-sound data by the NMD in response to the event caused by the keyword portion 280a. In various implementations, an underlying intent can be determined based on the words in the utterance portion 280b. In certain implementations, an underlying intent can also be based or at least partially based on certain words in the keyword portion 280a, such as when keyword portion includes a command keyword. In any case, the words may correspond to one or more commands, as well as a certain command and certain keywords.

A keyword in the voice utterance portion 280b may be, for example, a word identifying a particular device or group in the MPS 100. For instance, in the illustrated example, the keywords in the voice utterance portion 280b may be one or more words identifying one or more zones in which the music is to be played, such as the Living Room and the Dining Room (FIG. 1A). In some cases, the utterance portion 280b may include additional information, such as detected pauses (e.g., periods of non-speech) between words spoken by a user, as shown in FIG. 2C. The pauses may demarcate the locations of separate commands, keywords, or other information spoken by the user within the utterance portion 280b.

Based on certain command criteria, the NMD and/or a remote VAS may take actions as a result of identifying one or more commands in the voice input. Command criteria may be based on the inclusion of certain keywords within the voice input, among other possibilities. Additionally, state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280a. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
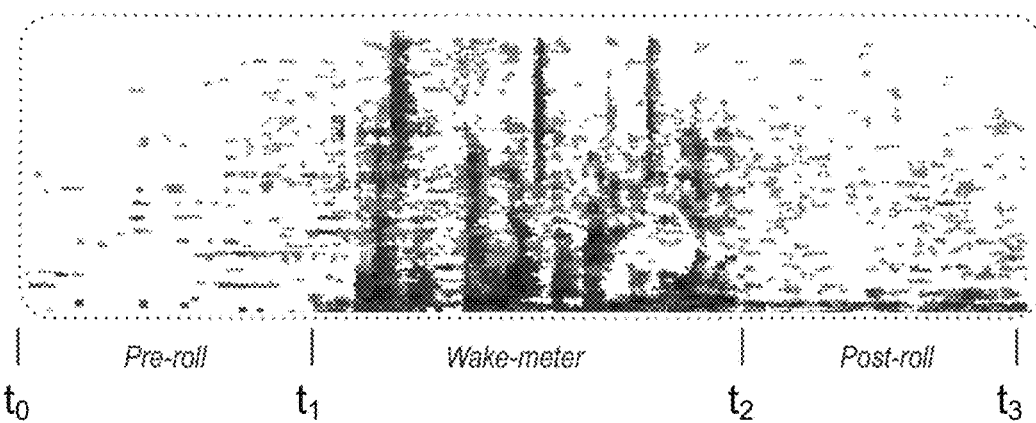
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280a of FIG. 2A. As illustrated, the example sound specimen comprises sound detected in an NMD's environment (i) immediately before a wake or command word was spoken, which may be referred to as a pre-roll portion (between times to and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for command-keyword detection. Wake-word detection engines, by contrast, may be precisely tuned to identify a specific wake-word, and a downstream action of invoking a VAS (e.g., by targeting only nonce words in the voice input processed by the playback device).

ASR for local keyword detection may be tuned to accommodate a wide range of keywords (e.g., 5, 10, 100, 1,000, 10,000 keywords). Local keyword detection, in contrast to wake-word detection, may involve feeding ASR output to an onboard, local NLU which together with the ASR determine when local keyword events have occurred. In some implementations described below, the local NLU may determine an intent based on one or more keywords in the ASR output produced by a particular voice input. In these or other implementations, a playback device may act on a detected command keyword event only when the playback devices determines that certain conditions have been met, such as environmental conditions (e.g., low background noise).

b. Example Playback Device Configurations

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*h* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102*a*, 102*b*, 102*j*, and 102*k* may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102*d* and 102*m* in the Living Room merged, which would result in these devices being represented by the single UI entity of Zone C. In one embodiment, the playback devices 102*d* and 102*m* may playback audio in synchrony, during which each outputs the full range of audio content that each respective playback device 102*d* and 102*m* is capable of rendering.

In some embodiments, a stand-alone NMD may be in a zone by itself. For example, the NMD 103*h* from FIG. 1A is named "Closet" and forms Zone I in FIG. 3A. An NMD may also be bonded or merged with another device so as to form a zone. For example, the NMD device 103*f* named "Island" may be bonded with the playback device 102*i* Kitchen, which together form Zone F, which is also named "Kitchen." Additional details regarding assigning NMDs and playback devices as designated or default devices may be found, for example, in previously referenced U.S. patent application Ser. No. 15/438,749. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102*a*, 102*b*, 102*j*, and 102*k*. Identifiers associated with the Dining Room may indicate that the Dining Room is part of Dining Room+Kitchen group and that devices 103*f* and 102*i* are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4 is a functional block diagram illustrating certain aspects of a selected one of the controller devices 104 of the MPS 100 of FIG. 1A. Such controller devices may also be referred to herein as a "control device" or "controller." The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540*a* and 540*b* shown in FIGS. 5A and 5B. Referring to FIGS. 5A and 5B together, the controller interfaces 540*a* and 540*b* includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
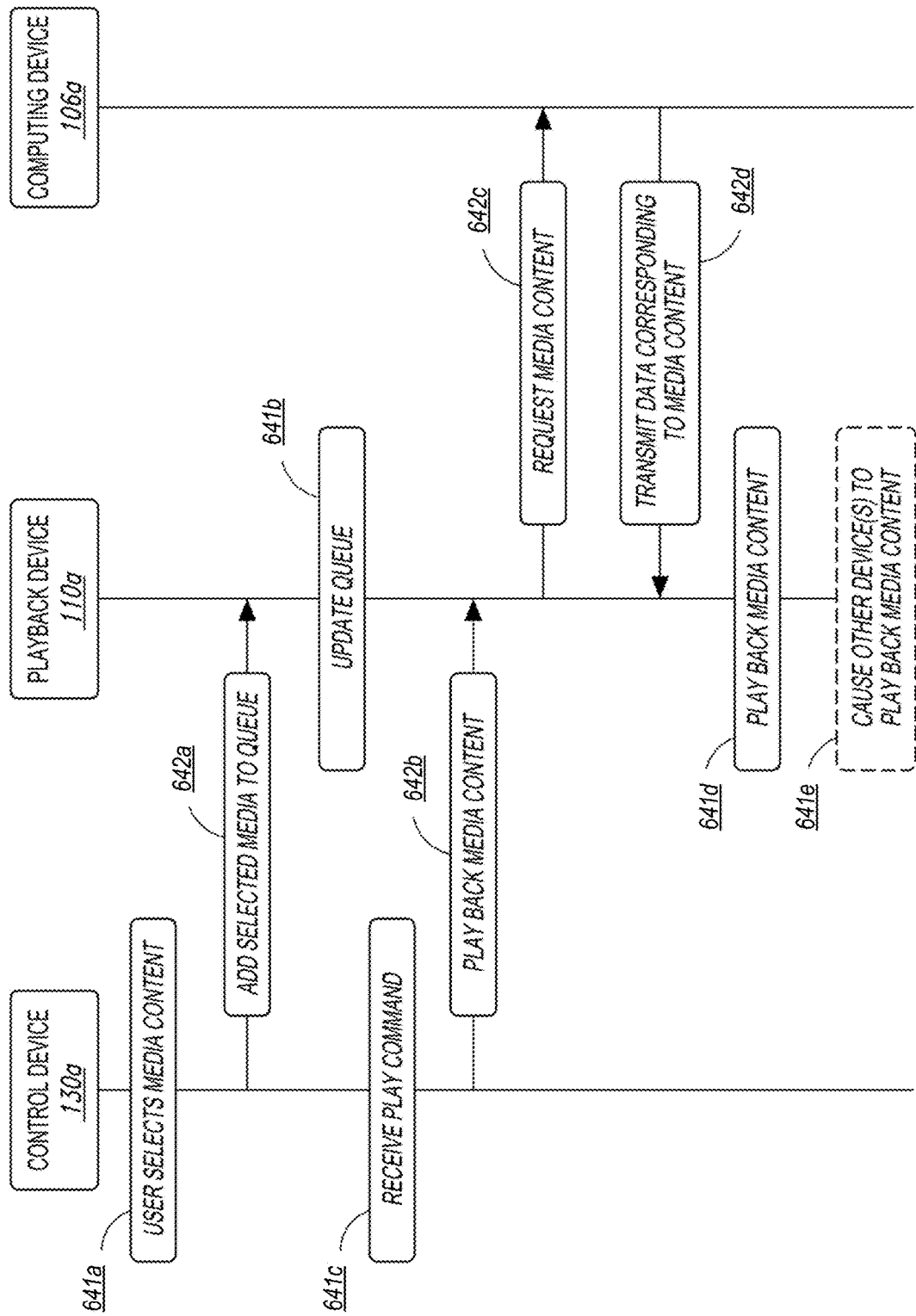
FIG. 6 is a message flow diagram of a media playback system.

FIG. 6 is a message flow diagram illustrating data exchanges between devices of the MPS 100. At step 641a, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 642a to the playback device 102 (FIGS. 1A-1C) to add the selected media content to a playback queue on the playback device 102.

At step 641b, the playback device 102 receives the message 642a and adds the selected media content to the playback queue for play back.

At step 641c, the control device 104 receives input corresponding to a command to play back the selected media content. In response to receiving the input corresponding to the command to play back the selected media content, the control device 104 transmits a message 642b to the playback device 102 causing the playback device 102 to play back the selected media content. In response to receiving the message 642b, the playback device 102 transmits a message 642c to the computing device 106 requesting the selected media content. The computing device 106, in response to receiving the message 642c, transmits a message 642d comprising data (e.g., audio data, video data, a URL, a URI) corresponding to the requested media content.

At step 641d, the playback device 102 receives the message 642d with the data corresponding to the requested media content and plays back the associated media content.

At step 641e, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

Within examples, such messages may conform to one or more protocols or interfaces (e.g., an Application Programming Interface). A platform API may support one or more namespaces that include controllable resources (e.g., the playback devices 102 and features thereof). Various functions may modify the resources and thereby control actions on the playback devices 102. For instance, HTTP request methods such as GET and POST may request and modify various resources in a namespace. Example namespaces in a platform API include playback (including controllable resources for playback), playbackMetadata (including metadata resources related to playback), volume (including resources for volume control), playlist (including resources for queue management), and groupVolume (including resources for volume control of a synchrony group), among other examples. Among other examples, such messages may conform to a standard, such as universal-plug-and-play (uPnP).

III. Example Spatial Audio

As noted in the Overview, example technologies described herein relate to spatial audio on wearable playback devices, such as headphones and earbuds. Such technologies may create or enhance an immersive listening experience which, to the listener, does not sound like you are listening on a wearable device, but are instead listening to a well-tuned, well-placed, three-dimensional audio system of loudspeakers in a particular listening environment, such as the listener's actual living room or other listening area. Spatial audio technology may be utilized with audio content streamed from a home theatre device connected to a television (e.g., a soundbar) as well as various other sources of audio content such as music, audio tracks of video, podcasts and the like streamed from a mobile device or from the cloud.

a. Measurement of Room Acoustic Characteristics

As noted above, example binaural rendering technologies may involve room adaptation based on room acoustic characteristics that are determined from measurements made in the actual listening environment. Within examples, during such measurements, such technologies may use a playback device in the room or other listening environment to play back stimulus tones. Then, such tones or other measurement audio are captured using microphones of the wearable device while the user is seated in one or more listening positions (e.g. on the sofa or in an armchair).

Within examples, particular stimulus tones may be used that facilitate the measurement and ultimately the binaural rendering. First, the measurement may use stimulus tones are uncorrelated to the background noise, which provides robustness against background noise. Second, the measurement may use stimulus tones where the auto cross correlation of the tones is similar to a Dirac Delta function, which facilitates deconvolution and promotes capturing a representative room impulse response.

Within examples, the measurement techniques may utilize a home theatre playback device connected to a television as the output device for the stimulus tones. Such a home theatre playback device is often positioned or mounted in close proximity with the television, such that sound being output from the home theatre playback device appears to come from the television. Such a device may be referred to as a home theatre primary. An example of a home theatre primary is shown in FIG. 3D in the playback device 102b along with the playback device 102a and the playback device 102j, which operate as secondary home theatre device in providing surround audio.

Figure 7:
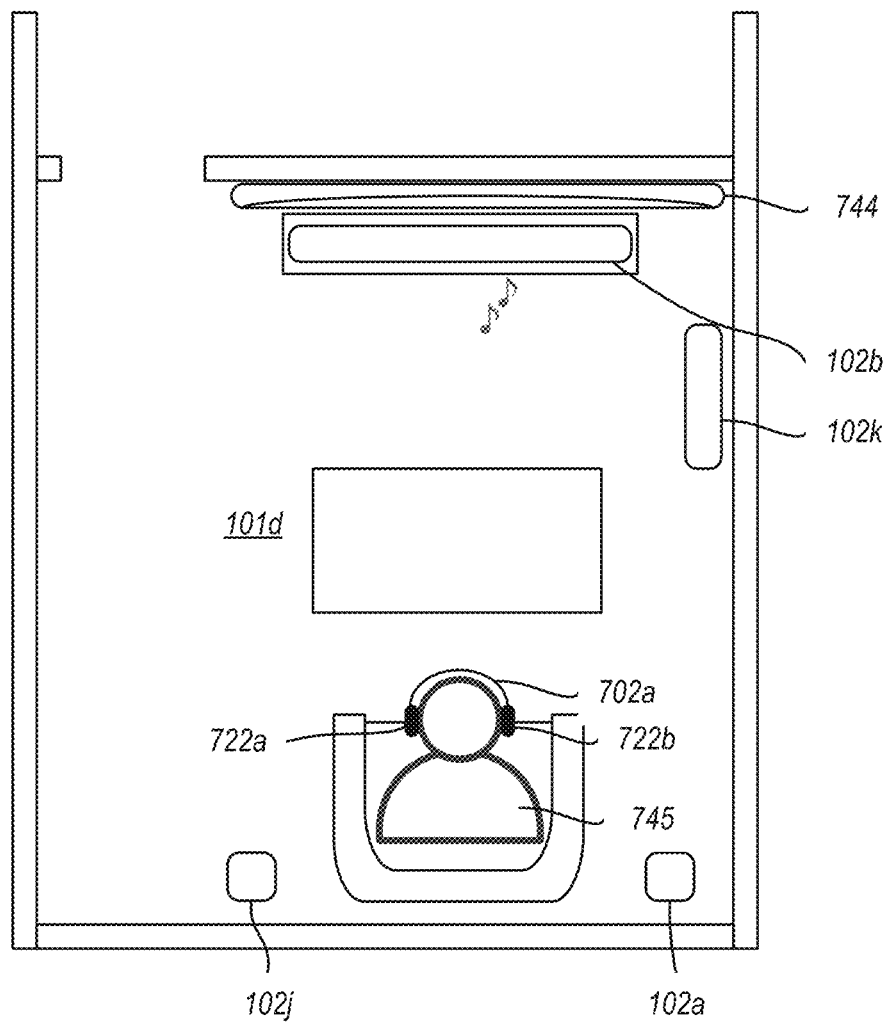
FIG. 7 is a diagram illustrating an example listening environment that includes devices to facilitate binaural rendering in accordance with aspects of the disclosed technology.

To further illustrate, FIG. 7 shows an example listening environment, which in this example is the den 101d (FIG. 1A). As discussed in connection with FIGS. 1A and 3D, the den 101d includes the playback device 102b, the playback device 102a, the playback device 102j, and the playback device 102k. In this example, the playback device 102b is operating as a home theatre primary and is connected to a television 744. A user 745 is wearing a headphone device 702a, which may include the same or similar components as the playback device 102 (FIG. 2A), but be configured into a headphone form.

During an example measurement process, the playback device 102b outputs stimulus tones or other audio content. This output is then captured by microphones 722 carried by a housing of the headphone device 702a, which may be the same as or similar to the microphones 222 of FIG. 2A. Within examples, at least one first microphone may be carried on the left earcup and at least one second microphone carried on the right earcup, as shown. Then, during the measurement, microphone data from each microphone(s) is captured. Such a configuration may facilitate determination of binaural impulse responses.

While the headphone device 702a is shown by way of example as performing the measurements, any suitable device in audible range of the playback device 102b could capture its output. For instance, the output may be captured additionally or alternatively using microphones of one or more satellite devices (e.g., the playback device 102a and/or the playback device 102j) to provide additional or alternative samples. As another example, the output may be captured additionally or alternatively using microphones of a control device 104 (e.g., the microphones 422 in FIG. 4). Other examples are possible as well.

For binaural rendering, measurements are often taken in-ear to more closely represent the audio as perceived by the user. When measurements are taken with on-cup microphones, coloration is introduced. This spectral coloration can be compensated for by inverting the frequency response of the on-cup microphones (e.g., the microphones 722) and introducing a filter to model the outer ear response. Further, measuring with on-cup microphones may also affect localization, which could be likewise be compensated for using a filter that models the differences in localization between on-cup measurements and in-ear measurements.

While being played back in the listening environment (in this example the den 101d), the played back stimulus tones reflect and reverberate in the listening environment. When captured by the microphones of the headphone device 702a, acoustic characteristics of the listening environment are reflected in the captured audio. These characteristics can be determined from the captured audio via processing. Processing the captured audio may involve determining an impulse response and then determining room acoustic parameters from the determined RIR that capture salient acoustic characteristics of the listening environment.

After capturing the measurements, the headphone device 702 may send the captured audio to the playback device 102b for processing (e.g., via a network, such as the LAN 111). Alternatively, the headphone device 702 may perform some or all of the processing, perhaps in cooperation with one or more additional devices connected to the LAN 111 (e.g., any suitable processing device such as the example devices shown in FIGS. 1A and 1B). Yet further, in some examples, a cloud service may perform some or all of the processing (e.g., via one or more computing devices 106 (FIG. 1B)).

Even though the measurements are ultimately intended to facilitate binaural rendering, example measurement procedures do not directly capture binaural room impulse responses (BRIRs) but rather a room impulse response. Directly-measured BRIRs have potential drawbacks in practical applications within a user's home or other listening environment. In particular, to directly use BRIRs, many binaural impulse responses at different source positions and listener orientations are captured. Capturing this large set of binaural impulse responses involves a lengthy measurement period (e.g., >30 seconds). This lengthy measurement period makes direct capture of binaural impulse responses more susceptible to measurement errors since noise or movement is more likely to occur at some point (or points) during the process.

By using a parametric analysis of a measured room impulse response, such issues can be avoided. Measuring a room impulse response involves fewer measurements (e.g., one, or several for redundancy or averaging) and so can be completed more quickly (e.g., <30 seconds, but typically <10 seconds). In this shorter measurement period, noise or movement is less likely to occur. Moreover, the parametric analysis is itself less sensitive to noise and movement over a direct BRIR measurement.

b. Room Adaptation for Binaural Rendering

As noted above, example binaural rendering is intended to give the perception of audio being played out-loud in a listening environment, rather than privately via a wearable device such as a headphone device. To facilitate this effect, the binaural renderer is adapted to the listening environment prior to binaural rendering. Such techniques, referred to herein as room adaptation, involve generating a set of binaural filters for use in real-time binaural rendering using impulse response (IR) measurements of a user's listening environment. Example IR measurements are described in the preceding section.

Example room adaptation, and ultimately rendering, operates on the basis of a parametric model of the room impulse response (RIR) of the listening environment. The parametric model is divided into sections corresponding to different portions of the RIR. These sections include direct sound (representing the direct path between the sound source and the listener's ears), early reflections (representing build-up of environmental acoustic reflections reaching the listener's point up to a point of perceptual diffuseness) and late reverberation (representing diffuse reverberation where echo density prevents perception of individual reflections). Segmenting the model into such portions facilitates generating and rendering these different sections using different techniques, which may reduce computational complexity and/or increase computational efficiency relative to other techniques (e.g., where such portions of the room impulse response are treated similarly, for instance).

As implied above, the segments of the parametric model are temporally divided. The direct sound arrives at the ear first. Within an example, the onset of the direct sound may be defined as a point in time when the absolute value of the RIR first exceeds a threshold. The early reflections arrive next and may be considered to occur at a frequency-dependent point in time after the onset of the direct sound. The late reverberation occurs last and is considered to occur at a "mixing time" when reflections are no longer perceptually distinguishable but instead amount to diffuse reverberation. In combination, the early reflections and late reverberation components represent the influence of the listening environment on the RIR. The direct sound component would be present in any listening environment, including anechoic environments.

Figure 8A:
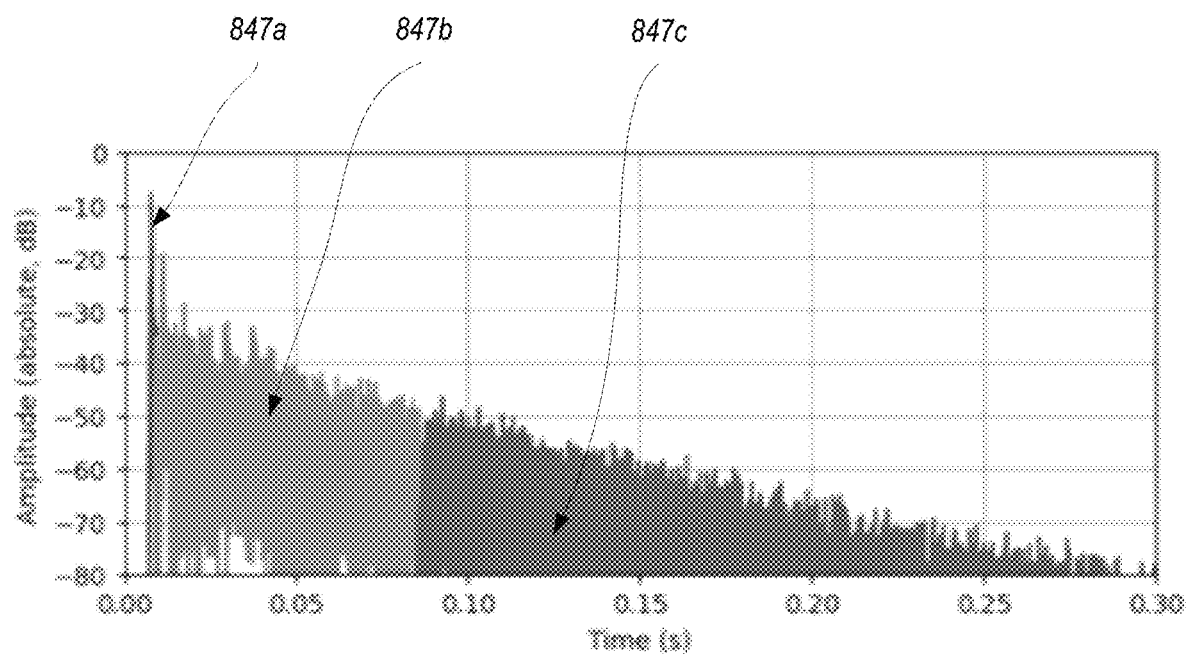
FIGS. 8A and 8B are diagrams illustrating examples of a segmentation model in accordance with aspects of the disclosed technology.
Figure 8B:
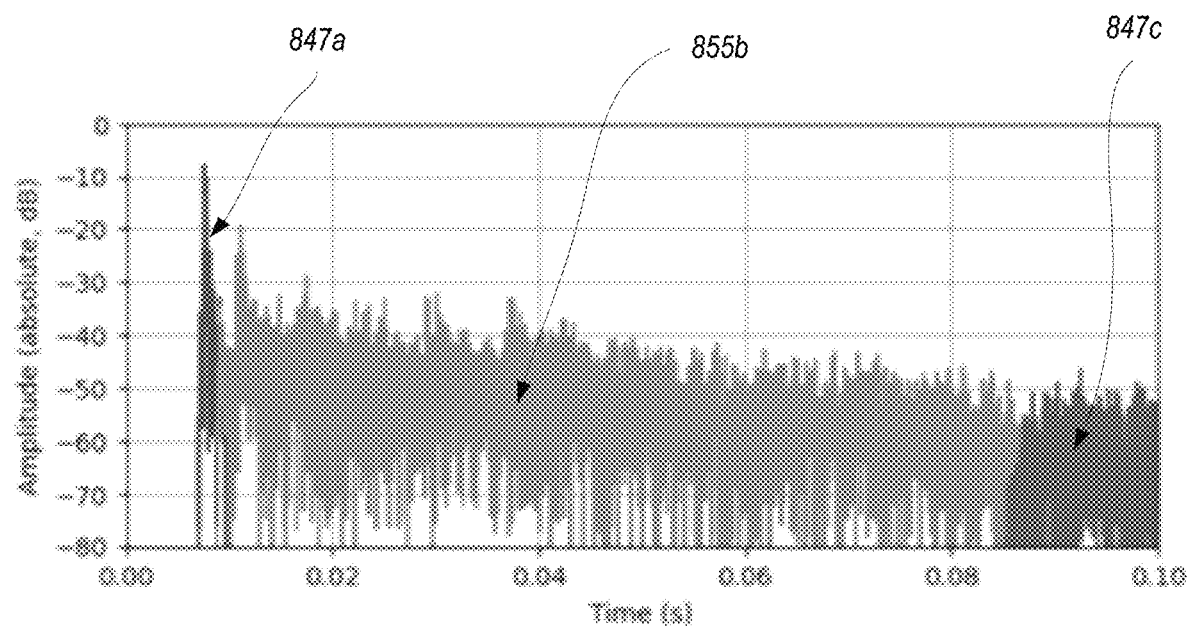

FIGS. 8A and 8B are diagrams illustrating examples of the RIR segmentation model. In the diagram, amplitude of captured audio 847 (e.g., from the example measurements described in connection with FIG. 7) is plotted over time. The captured audio 847 includes direct sound 847a, early reflections 847b, and late reverberation 847c. The late reverberation 847c is also referred to as the "long tail" given its relatively long duration compared to the early reflections 847b, as illustrated in FIG. 8A. FIG. 8B also illustrates the captured audio 847, albeit zoomed in on the sub 100 ms portion to better illustrate transitions between segments.

Within examples, the temporal segmentation of the parametric model is fixed to constant values. For instance, in an example, the threshold for onset of the direct sound may be defined as the point in time when the absolute value of the RIR first exceeds the value 20 dB below the maximum absolute value. Then, in this example, the transition from direct-to-early reflections may be defined as 2.5 milliseconds (ms) after this point, and further the transition from early reflections-to-late reverberation defined as 80 ms after the onset of the direct sound (i.e., the "mixing time"). To smooth transitions, the segments may include some temporal overlap, such as 0.5 ms for the direct-to-early reflections transition and 5 ms for the early reflections-to-late reverberation transition. The values for the temporal segmentation and the overlaps are representative and may be varied by implementation. Further, in some examples, the segmentation times may be varied for different frequencies.

In further examples, rather than fixing the temporal segmentation, the temporal segmentation may be dynamic. In such examples, the transitions points between the segments may be estimated from the measurements (FIG. 7) in the actual listening environment. Example signal-based estimators may use short-time statistics of the room impulse response captured the measurements to identify early reflections and also estimate the mixing time based on echo density.

Figure 8C:
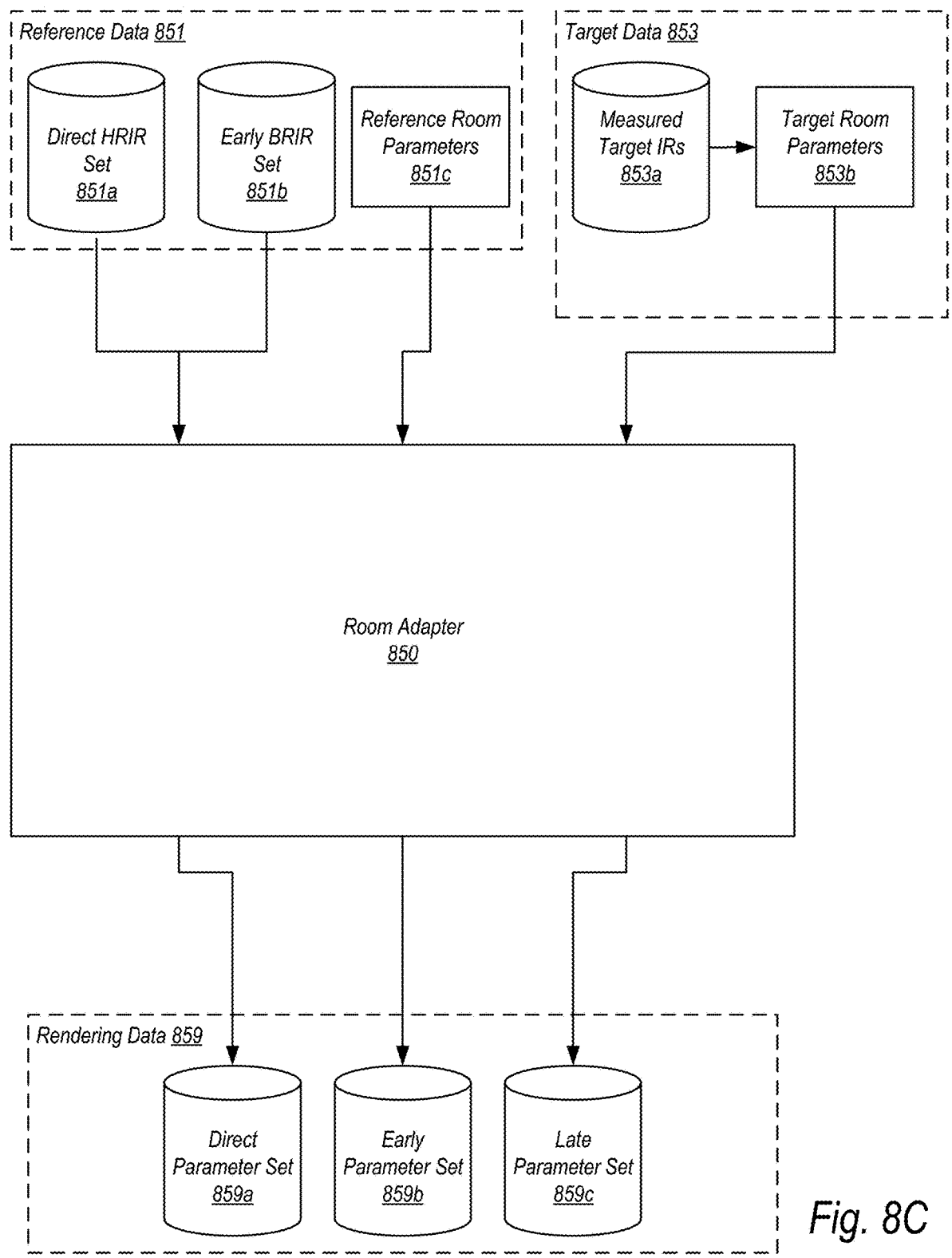
FIG. 8C is a block diagram illustrating an example room adapter in accordance with aspects of the disclosed technology.

As noted above, example room adaptation generating a set of binaural filters using impulse response (IR) measurements of a user's listening environment. To illustrate room adaptation, FIG. 8C is a block diagram illustrating an example room adapter 850. In operation, the room adapter 850 carries out a room adaptation process. As shown in FIG. 8C, the room adapter 850 utilizes both reference data 851 and target data 853 as input and produces rendering data 859. The rendering data 859 represents synthesized BRIRs for binaural rendering.

The room adapter 850 operates on the basis of the segmented parametric model. This is illustrated by the output rendering data 859, which shows an output filter set that is split into three sections. The sections include a direct parameter set 859a (corresponding to the direct sound), an early parameter set 859b (corresponding to the early reflections), and a late parameter set 859c (corresponding to the late reverberation). As indicated above, different techniques may be used to create each component, which may reduce computational complexity and/or increase computational efficiency, among other possible benefits.

Moreover, each section of the rendering data 859 may have different filter lengths (in time) and differing spatial resolution. The direct parameter set 859a may include a set of head-related impulse response (HRIR) data having dimensions $D_d R N_d$ where $D_d$ represents the listener directions for which a filter is available, R represents the number of receivers (i.e., output channels, which is generally two for binaural rendering), and $N_d$ represents the number of taps in the FIR filter or time-samples. In contrast, the early parameter set 859b (i.e., the early reflections e) may have dimensions $D_e R E N_e$ where $D_e$ represents the listener directions for which a filter is available, R represents the number of receivers, E represents the number of emitters (i.e., input channels or virtual loudspeakers, which would be for instance 11 for 7.1.4 sound excluding a subwoofer) and $N_e$ represents the number of taps in the FIR filter or time-samples. Other implementations are possible as well.

Room adaptation via the room adapter 850 is based on target data 853, which is in turn based on measurements made in the listening environment. For instance, as described in connection with FIG. 7, the target data 853 may be based on measurements made using the microphones 722 of the headphone device 702 in the den 101*d*. The target data 853 includes measured target IRs 853*a*, which represent the room impulse response of the listening environment (e.g., the den 101*d*). The target data 853 also includes target room parameters 853*b*, which are determined via analysis of the measured target IRs. The target data 853 is referred to as "target" because this data reflects the actual listening environment, and as such operates as a "target" for the room adaptation.

Figure 8D:
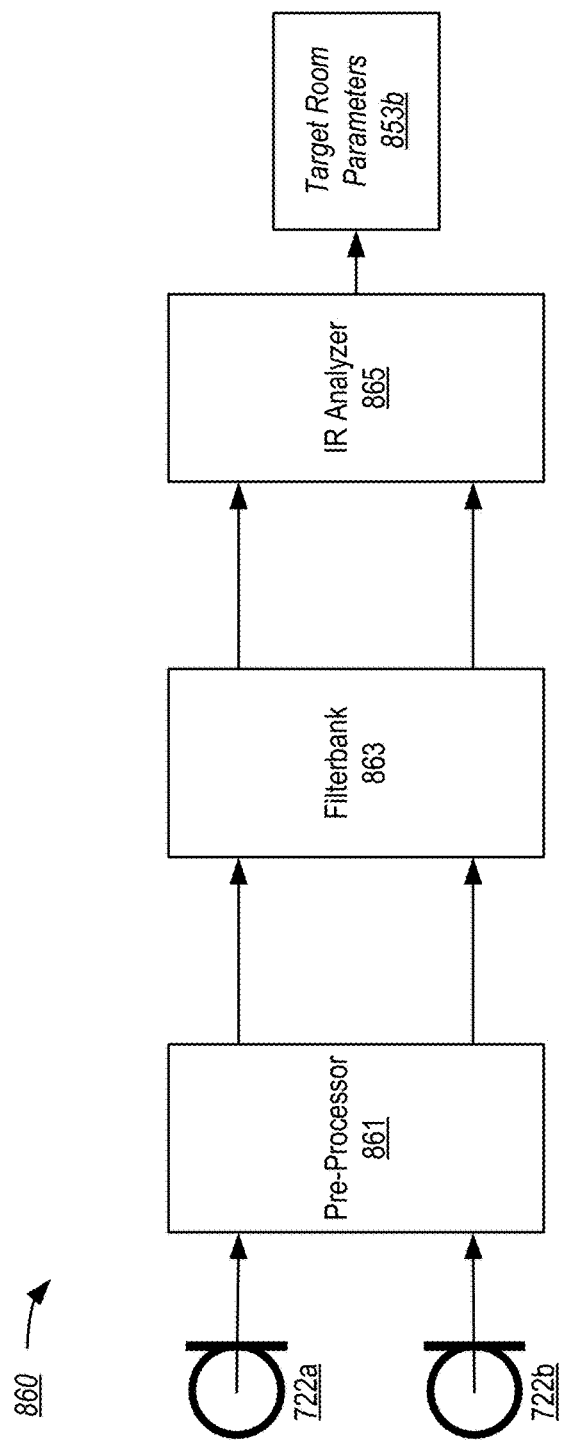
FIG. 8D is a block diagram illustrating example target data determination in accordance with aspects of the disclosed technology.

To illustrate determination of the target data 853, FIG. 8D is a block diagram illustrating an example measurement processor 860 configured to process measurements made in the listening environment for binaural rendering. As discussed in connection with FIG. 7, such processing may be performed by the headphone device 702, the playback device 102*b*, or by any other suitable device or combination of devices in the media playback system 100 (FIGS. 1A-1B), such as another playback device 102 or the computing device(s) 106.

FIG. 8D shows a microphone 722*a* and a microphone 722*b*, which are referred to together as the microphones 722. As discussed in connection with FIG. 7, the microphones 722 may be carried on respective earcups of the headphone device 702. For instance, the microphone 722*a* may be carried on a left earcup of the headphone device 702 and the microphone 722*b* carried on a right earcup of the headphone device 702. The microphone 722*a* may be representative of multiple microphones (e.g., a microphone array) carried on the left earcup. Similarly, the microphone 722*b* may be representative of multiple microphones (e.g., a microphone array) carried on the right earcup.

Including microphones 722 on each earcup may improve measurement quality. For instance, such an arrangement allows the measurements to account for the influence of the user's head, which could negatively impact features estimation (e.g., if the user turns their head during the measurement). Further, performing measurements using microphones 722 on each earcup also provides redundancy, which facilitates a more robust measurement. Within examples, the microphones 722 are mounted to direct their transducers away from the user, so as to facilitate audio capture in the listening environment.

After capturing microphone data from the microphones 722, a pre-processor 861 conditions the microphone data for further analysis. Such pre-processing may include determining impulse responses representing the listening environment from the captured microphone data. For example, the pre-processor 861 may determine the measured target IRs 853*a* or a pre-cursor thereof (i.e., IRs that are further processed into the measured target IRs 853*a*). These IRs may be considered binaural impulse responses, as they correspond to microphone data from the left and right ears.

To determine the target room parameters 853*b*, the playback device 102*b* analyzes the measured target IRs 853*a* in subbands (e.g., ⅓-octave subbands). To facilitate such subband analysis and re-synthesis (after later modification within subbands), the measurement processor 860 may apply a filterbank 863 that divides each binaural impulse response into multiple IRs representing respective subbands of the RIR of the listening environment. The filterbank 863 may be implemented as a near-perfect-reconstruction filterbank (e.g., a near-perfect-reconstruction fractional-octave filter bank). Such a filterbank may utilize linear-phase finite impulse response (FIR) filters with matched cutoff frequencies. After reconstruction, signals that have been filtered by such a filterbank have an inherent delay of half the filter length (e.g., 2048 samples, given a FIR filter length of 4096), which is compensated for by the playback device 102*b*.

The IR analyzer 865 is configured to determine the target room parameters 853*b* from the measured target IRs. The target room parameters 853*b* include a variety of parameters that capture perceptually-important acoustic characteristics of the listening environment. Within examples, the room parameters include early decay time (EDT), late reverberation time (LRT), direct-to-reverberant ratio (DRR) and mixing-time energy level (MTE). The target room parameters 853*b* may also include meta-parameters defining the parametric model, which set the frequency and temporal segmentation of the RIR.

The early decay time (EDT) may be defined as the time required for the energy of the measured target IRs 853*a* to decay by 60 dB from its point at the start of the early response. The EDT may be estimated by estimating the energy decay rate and converting this rate to the duration required for 60 dB attenuation. Other examples are possible as well. While this definition is given by way of example, some examples may include earlier portions of the measured target IRs 853*a* in the analysis of the reverberation time.

The late reverberation time (LRT) may be defined as the time required for the energy to decay by 60 dB from its point at the mixing time. The LRT may be estimated by linear modeling of the energy decay in the measured target IRs 853*a* after the mixing time. Other examples are possible as well.

More particularly, the EDT and the LRT may be estimated from the energy decay curve (EDC) of the measured target IRs 853*a*. The energy decay curve is the tail integral of the squared impulse response at time t. This can be expressed mathematically as:

$$EDC(t) \triangleq 10\log_{10}\int_t^N h^2(\tau)d\tau,$$

where h is the impulse response and N is arbitrarily large. In practice, for a discrete time signal, this can be achieved with a cumulative sum along the reversed impulse response. Given respective IRs for each subband, the energy decay curve may be calculated for each subband impulse response, which in combination can be referred to as the energy decay relief.

Given respective EDCs for each subband, the EDT may be estimated from the EDC in each subband independently. A least-squares fit of a linear model to the EDC in the region of the early response gives a gradient and an intercept, which can be represented mathematically as:

$$E\hat{D}C_e(t) = \theta_1 t + \theta_0$$

where $t_e \le t \le (t_m + t_e)$. Here, $t_e$ is a frequency-dependent segmentation time based on the subband center frequency (three periods of the subband center frequency, $2.5\ \text{ms} \le t_e \le 10\ \text{ms}$) and $t_m$ is the mixing time, set in this example as 50 ms.

Figure 8E:
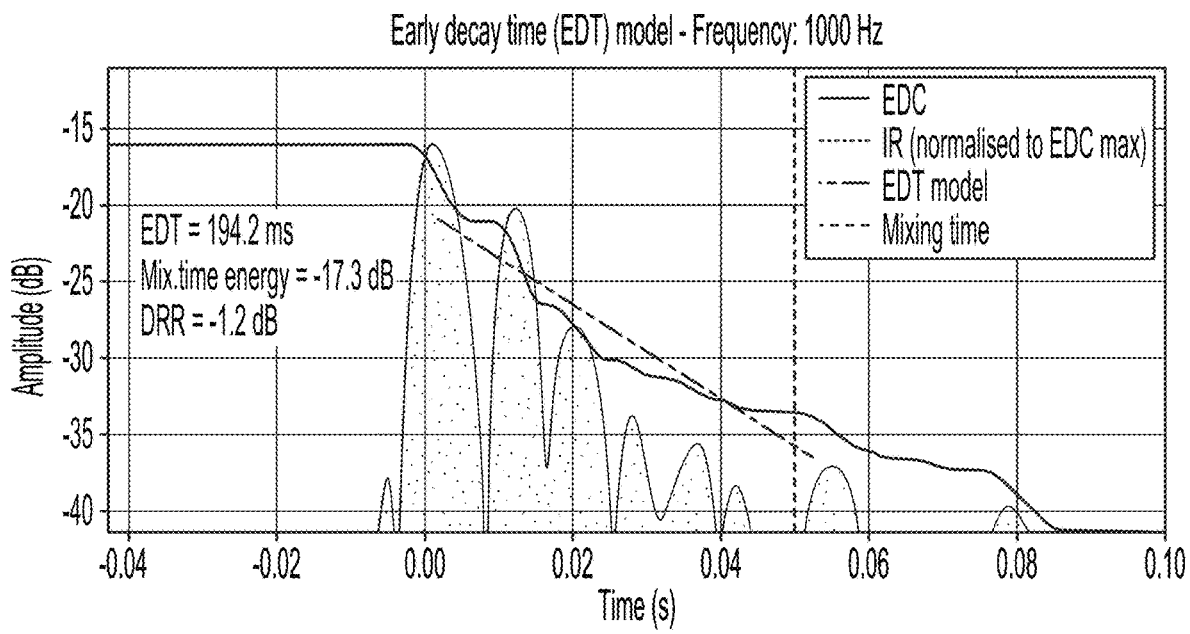
FIG. 8E is a diagram illustrating example estimation of early decay time in accordance with aspects of the disclosed technology.

The gradient $\theta_1$ is used to provide the EDT ε:

$$\varepsilon = -60/\theta_1$$

by way of example. The slope of the EDC is converted to an amplitude envelope based on the assumption of an exponentially-decaying Gaussian noise. FIG. 8E is a diagram illustrating this estimation graphically.

To estimate late reverberation time, a straight line is fitted to the EDC (in dB) using linear least squares, starting the mixing time onwards, up to 5 dB from the noise floor. The time taken by the line to decay by −60 dB gives the late reverberation time. Mathematically, this calculation can be shown as:

$$EDC_l(t) = \gamma_1 t + \gamma_0$$

where $t_m \leq t \leq \infty$, $t_m = 80$ ms and $$l = \frac{-60}{\gamma}.$$

Figure 8F:
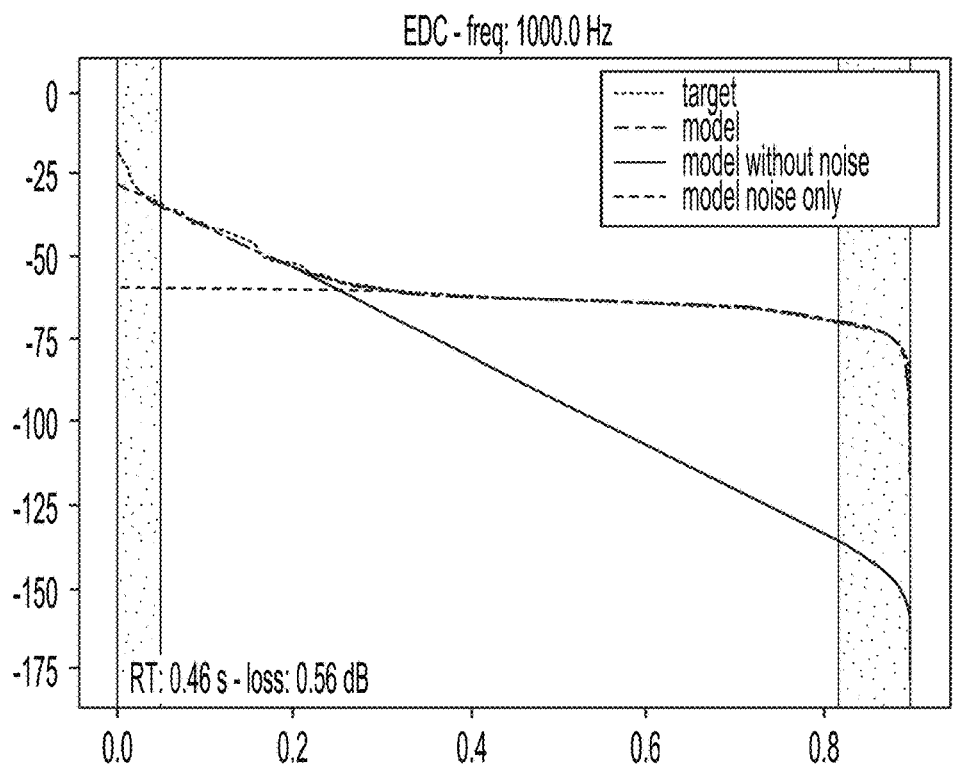
FIG. 8F is a diagram illustrating example estimation of late reverberation time in accordance with aspects of the disclosed technology.

FIG. 8F is a diagram illustrating this estimation graphically.

The EDC can be used to derive additional parameters used in further estimations. For instance, a and b are parameters derived from the EDC (in dB) via linear model parameters $_0$ and $_1$:

$$b = -\ln(10)\frac{\gamma_0}{20}$$

$$a = \sqrt{2b10\frac{\gamma_1}{10}}$$

The direct-to-reverberant ratio (DRR) may be defined as the ratio of direct sound to reverberant energy.

The DRR may be estimated in dB from the EDC. Mathematically, the DRR calculation can be shown as:

$$DRR = 10\log_{10}\left(\frac{EDC(t_0)}{EDC(t_d)} - 1\right)$$

The segmentation point $t_d$ at which the direct sound portion ends and the room response starts is frequency-dependent and defined by the subband center frequency (two periods of the subband center frequency $2\text{ ms} \leq t_d \leq 15\text{ ms}$). An example tmax integration time is 150 ms. The DRR calculation is equivalent to summation of the discrete-time impulse response. Mathematically, this can be calculated as:

$$DER = 10\log_{10}\frac{\sum_{t=0}^{t_e} h^2(t)}{\sum_{t=t_e}^{t_m} h^2(t)}$$

by way of illustration.

One potential issue of the above hard segmentation technique for calculating DRR is that it is sensitive to early reflections that fall on one side or the other of the segmentation point. Instead of the hard segmentation technique above, an alternate technique uses a crossfade around the boundary to reduce large discontinuities between repeated measurements, where a reflection falls in/out of the boundary. By default, such a technique may use a crossfade length of 50% of the subband segmentation time (two periods of the subband center frequency, min=2 ms, max=15 ms).

The mixing-time short-time energy spectrum (MTE) may be defined as the energy in each subband within a time window centered on the mixing time. The short-time RIR envelope at the mixing time can be estimated using the EDC. Assuming that the RIR behaves like an exponentially-decaying Gaussian noise in each subband, the amplitude envelope can be derived from the late reverb model parameters according to:

$$MTE = 20\log_{10} ae^{-bt_m}$$

where $t_m$ is the mixing time in seconds and a and b are parameters derived from the EDC (in dB) via linear model parameters $_0$ and $_1$ as noted above.

As an alternative, the short-time spectral energy around the mixing time can be estimated by windowing the squared RIR, which is shown mathematically as:

$$MTE = 10\log_{10}\sum_{n=-N}^{N} \omega(n)h^2(t+n)$$

where w(n) is a L1-normalized Hann window:

$$\omega'(n) = \cos^2\left(\frac{n\pi}{2N}\right) \text{ and } \omega(n) = \frac{\omega'(n)}{\|\omega'(n)\|_1}$$

for purposes of illustration. The choice of window size influences the effectiveness of this estimation technique. If the window is too short, gain adjustments in the room adaptation process using the MTE will be susceptible to fluctuations in the signal envelope. Continuing the representative values given, an appropriate window size may be 50 ms. This value is representative and may vary by implementation. In some implementations, the window size may be frequency-dependent (e.g., as a multiple of the period of the subband center frequency).

Figure 8G:
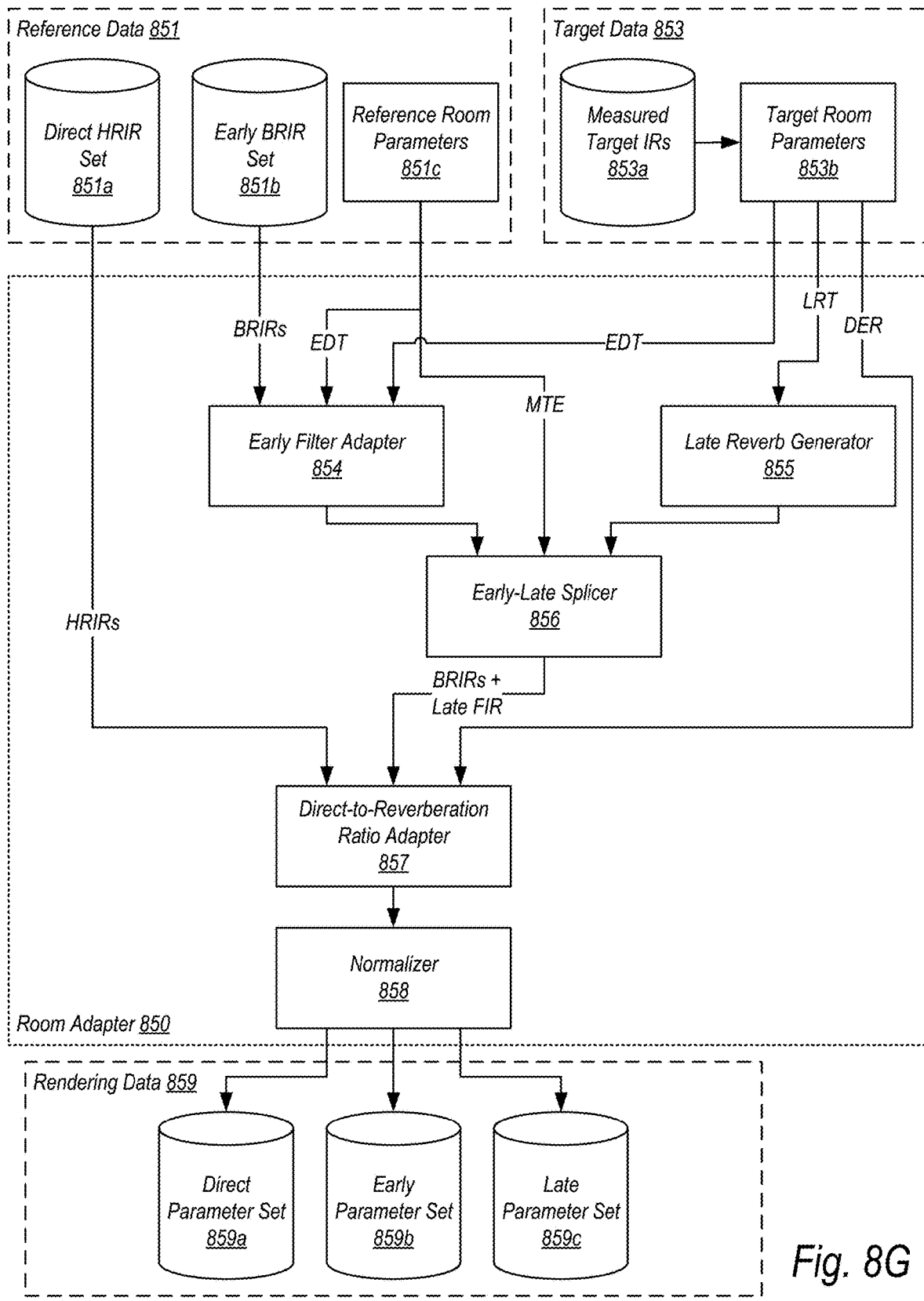
FIG. 8G is a block diagram further illustrating the example room adapter in accordance with aspects of the disclosed technology.

After estimation of the target room parameters 853b, these parameters may be utilized in room adaptation. To further illustrate room adaptation, FIG. 8G is a block diagram showing the example room adapter 850 in greater detail. In particular, FIG. 8G shows example components of the room adapter 850 used in creating each component of the parametric model, as well as in tuning the components to cooperate with one another as the rendering data 859 during binaural rendering.

As mentioned above, the room adapter 850 may use different techniques to generate each segment of the parametric model. To facilitate generation of the early reflections and late reverberation components, respectively, the room adapter 850 includes an early filter adapter 854 and a late reverb generator 855. Further, to facilitate conditioning the segments to cooperate with one another, the room adapter 850 also includes an early-late splicer 856, a direct-to-reverberation ratio adapter 857, and a normalizer 858.

The room adapter 850 does not need to necessarily modify the direct HRIR set 851a. Since the direct sound is the same among different listening environments, even anechoic environments, the direct HRIR set 851a can include a fixed reference data set. In some implementations, the room adapter 850 may balance energy levels of direct sound (e.g., via the direct-to-reverberation ratio adapter 857) and/or apply normalization (e.g., via the normalizer 858).

The early filter adapter 854 is configured to adapt a reference set of BRIRs corresponding to the early reflections portion of the parametric model shown in FIG. 8C as the early BRIR set 851. Recall that the early reflections portion of the parametric model may start from a first temporal point after the onset of the direct sound (e.g., 2.5 ms) and extend to a second temporal point (e.g., the mixing time, which may be for example 80 ms after the onset of the direct sound). Ultimately, after room adaptation, the early BRIR set 851 is adapted and formed into the early parameter set 859b of the rendering data 859.

The early BRIR set 851b may be adapted from any suitable technique such as direct BRIR measurements under controlled conditions (e.g., low noise and movement during the measurement). Being a reference set, the early BRIR set 851b is intended to represent a generic listening environment (e.g., a typically living room or den) and, as such, may be derived by combining (e.g., by averaging magnitude spectrum or generating a set based on an average of the extracted parameters) multiple BRIR measurements of representative listening environments. Moreover, since the early BRIR set 851b is pre-determined, the early BRIR set 851b can be tuned prior to room adaptation (e.g., by the manufacturer or its partners) to obtain satisfactory results across a wide range of listening environments.

In further examples, rather than a fixed reference listening environment, the early BRIR set 851b may include multiple reference sets corresponding to respective reference listening environments. In such examples, the room adapter 850 may select a particular reference set among the multiple reference sets. For instance, the room adapter 850 may select the reference set having temporal and/or spatial acoustic characteristics that most closely resemble the actual listening environment. In operation, the room adapter 850 may compare the reference room parameters 851c (e.g., EDT, LRT, echo density, lateral energy ratio, short-time inter-aural level difference and/or inter-aural coherence variance) of each reference set to the target room parameters 853b to find the closest match (or matches). In this manner, the room adaptor 850 may start room adaptation from a reference set that more closely resembles the actual listening environment in certain perceptually-important characteristics.

By way of example, adaptation by the early filter adapter 854 involves modifying the early BRIR set 851b by a particular gain envelope that converts a reference early decay time (EDT) in the reference room parameters 851c to the target EDT. As described above, the target room parameters 853b may include a target EDT, which is determined from the measured target IRs 853a. Similarly, the reference room parameters 851c include a reference EDT representing the EDT of the reference data 853. By modifying the early BRIR set 851b by the particular gain envelope, the early BRIR set 851b is adapted to match the EDT of the room.

Within examples, the early filter adapter 854 adjusts the overall early decay envelope while retaining variations in early decay across each individual IR in each subband. This is expressed mathematically as:

$$\hat{H}_T^f(t) = H_R^f(t) e^{-t(k_T^f - k_R^f)}$$

where $H_R^f$ is the reference IR in the early BRIR set 851b and $\hat{H}_T^f$ is the approximated target IR. The superscript f indicates the frequency subband index. This process is performed across the dimensions DRE (where D is the listener direction for which a filter is available, R is the number of receivers (e.g., two for two ears), and E is the number of emitters (i.e., input channels or virtual loudspeakers). The exponents k are defined according to:

$$k_T^f = \frac{\ln 10^6}{2\varepsilon_T^f} \quad k_R^f = \frac{\ln 10^6}{2\varepsilon_R^f},$$

or, simplified $$k = \frac{3 \ln 10}{\varepsilon}$$

where $\varepsilon_T^f$ and $\varepsilon_R^f$ are the EDT in subband f for the target data 853 and the reference data 851 respectively. The time vector t is defined such that t=0 at the mixing time $t_m$ and so is negative at the start of the early BRIR set 851b. This definition ensures that the envelope gain is zero at the mixing time $t_m$.

The late reverb generator 855 is configured to generate the late reverberation segment of the model. The late reverberation segment is ultimately represented by the late parameter set 859c of the rendering data 859 shown in FIG. 8G. Recall that the late reverberation portion of the parametric model starts after the mixing time, which may be for example 80 ms after the onset of the direct sound.

The late reverberation is also referred to as the "long tail" given its relatively long duration compared to the early reflections portion. The length of the long tail depends on the reverberation time of the room, which is longer for more reverberant rooms. Given this relatively longer duration, the late reverberation would be computationally expensive to render in real-time during binaural rendering. As such, example techniques to generate the late reverberation are designed to reduce this computational complexity.

Figure 8H:
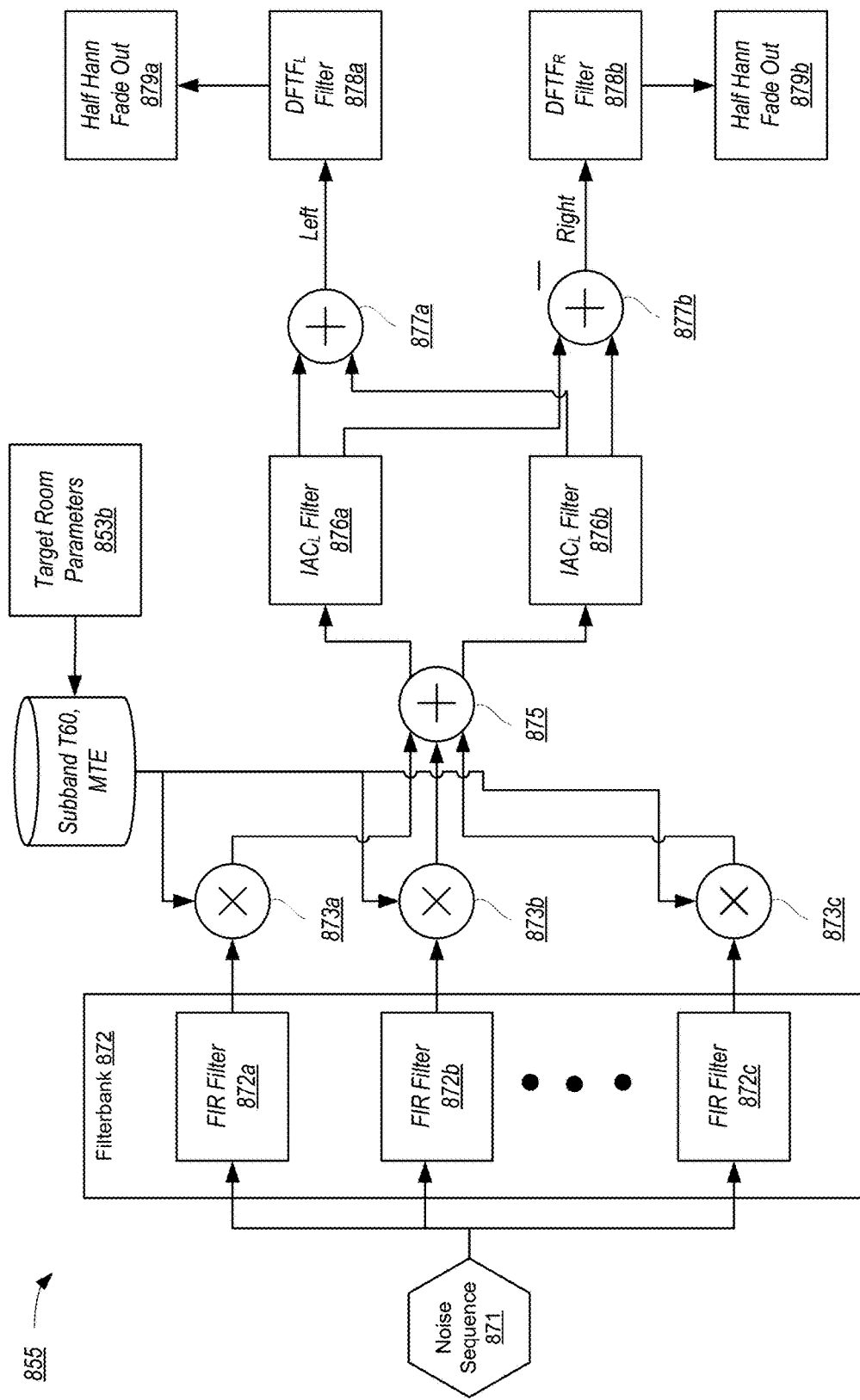
FIG. 8H is a block diagram illustrating example late reverberation generation in accordance with aspects of the disclosed technology.

In some examples, the room adapter generates the late reverberation portion of the model by shaping a noise sequence in subbands, which is then rendered in real-time with convolution. To illustrate, FIG. 8H is a block diagram showing example components of the late reverb generator 855. In operations, such components generate the late reverb portion of the parametric model from a noise sequence 871, which may be for example a two-channel decorrelated white noise sequence. In such examples, the reference data 851 may include one or more noise sequences as additional reference data 851.

As shown in FIG. 8H, the noise sequence 871 is filtered into subbands (e.g., third-octave bands) using a filterbank 873, which may be for example implemented as a perfect reconstruction filterbank. The filterbank 873 includes a plurality of finite impulse response (FIR) filters, which are illustrated as FIR filter 873a, FIR filter 873b, and FIR filter 873c. Example FIR filterbanks generally will include additional filters 873 (as illustrated by the ellipsis) corresponding to the number of subbands. As another example, a time-frequency transform representation, such as a short-time Fourier transform, may be implemented.

Each filtered noise sequence is multiplied with a decaying exponential with the correct subband mixing time gain to achieve the target late reverberation time (T60) using the multipliers 873. The multipliers 873 are represented in FIG. 8H as a multiplier 873*a*, a multiplier 873*b*, and a multiplier 873*c*. As noted above, an estimation of mixing time energy level (MTE) and a target late reverberation time may be determined when calculating the target room parameters 853*b*, as described in connection with FIG. 8D. The decaying exponential can be represented mathematically as:

$$A_N \exp\left(-t\frac{3*\ln(10)}{T_{60}(f_N)}\right)$$

Then, the filtered noise sequences in each subband are added back together using the adder 875. Note that in FIG. 8H, the signal lines prior to the adder 875 represent two channel signals, and the signal lines following the adder 875 represent signal channels (i.e., left and right).

To form the filtered noise sequences into a BRIR, interaural coherence (IAC) and power spectral density (PSD) matching filters derived from a head related transfer function dataset are applied to the two de-correlated noise tails. The IAC filters are shown in FIG. 8H as the $IAC_L$ filters 876. The output of the $IAC_L$ filters 876 is summed (via the added 877*a*) and differenced (via the adder 877*b*). The PSD filters are shown in FIG. 8H as the diffuse field transfer function (DFTF) filters 878. To avoid abrupt truncation, a Hann fade-out window (e.g., of length 20 ms) is applied to each noise tail, as represented by the half Hann fade out 879*a* and the half Hann fade out 879*b*.

Alternatively, the late reverberation segment may be rendered using a parametric reverberator. In such examples, the late reverb generator 855 is configured to tune a parametric reverberator, such as a feedback delay network or scattering delay network, with the target room parameters 853*b* to generate late reverberation matching the listening environment when stimulated by the input channels during binaural rendering. Relative to convolution, a parametric reverberator may be more computationally efficient, especially for longer reverberation times since the computational complexity is independent of the reverberation time.

FIG. 8I (8-I) shows an example feedback delay network (FDN) 880. During rendering, the input audio channels are provided as input to the FDN 880 which adds artificial reverberation. In particular, the FDN 880 produces discrete echoes that have decreasing amplitude and increasing density with time, which mimic a room impulse response (particularly the late reverberation portion). Within examples, the late reverb generator 855 may implement the FDN 880 as an alternative to the late reverb generated using noise.

As part of room adaptation, certain parameters of the FDN 880 are tuned so that the FDN 880 produces a late reverb tail with the perceptual characteristics of the listening area (e.g., the den 101*d* in FIG. 7). By tuning these parameters to match the target room parameters 853*b*, these perceptually-important characteristics of the listening area can be captured. A perfect match to the target data 853 is not considered necessary since the resolution that humans can perceive changes in reverberation time is approximately 5%.

The FDN 880 includes delay line filters 883 (illustrated as the delay line filters 883*a-d*), biquad cascade filters 884 (illustrated as the biquad cascade filters 884*a-d*), and a feedback matrix 885. The multipliers 882*a-d* multiply the input signals with an input gain vector with randomized gains to reduce correlation. The input signals are then sent to the delay lines 883, which have co-prime length to avoid coloration and comb-filtering artifacts. The outputs of the delay lines are set to the biquad cascade filters 884. The output of the biquad cascade filters 884 is sent to the feedback matrix 885. The output of the feedback matrix is summed with the incoming signal using the adders 881*b-c*. This architecture provides a MIMO system with feedback.

Following the FDN 880 are additional filters for interaural coherence and gain matching, which are shown as the IAC filter 886, the DFTF filters 887 and the MTSE filters 888. The multipliers 882*c-i* multiply the output of the biquad cascade filters 884 with two sets of orthogonal gain vectors, which further decorrelate the signals. The two decorrelated signals are filters with the IAC filter 886, the DFTF filters 887 and the MTSE filters 888, as shown.

During room adaptation, certain of these filters are tuned using the target room parameters 853*b*. In particular, the biquad cascade filters 884 are tuned to match a target late reverberation time. Such tuning may involve setting the attenuation of each biquad cascade filters 884 according to the length of the corresponding delay line such that the desired frequency-dependent decay rate is obtained. The feedback matrix 885 can be tuned to enhance build-up of echo density and/or to provide appropriate echo density at the mixing time. The IAC filter 886 and DFTF filters 887 are tuned for interaural coherence matching. In addition, the MTE filters 888 are tuned to match the subband gains the mixing time with the gains of the early response. The targets for tuning are represented in the target room parameters 853*b* (FIG. 8G).

As noted above, the biquad cascade filters 884 are tuned to match a target late reverberation time. As discussed in connection with FIG. 8D, the subband estimate of the late reverberation time can be estimated by fitting a straight line to the energy decay curve and extrapolating the straight line. As shown in FIG. 8I, the biquad cascade filters 884 derived from the late reverberation time (T60) are placed at the end of each delay line (represented in FIG. 8I by the delay line filters 883). In general, for a FDN corresponding to a target frequency-dependent T60, the delay line filters have an attenuation given by:

$$\gamma(\omega) = \frac{-60}{T_{60}(\omega)f_s}, \Gamma_i = 10^{-3m_i f_s/T}$$

by way of example. Here, $m_i$ is the length of the ith delay line in samples and $\Gamma_i$ is the associated attenuation filter in the delay line. $\Gamma_i$ is typically represented with FIR or IIR filters. With the subband reverberation time estimated from the one-shot RIR measurement (FIG. 7), a biquad fitter is used to fit the delay line filters 883 in the FDN 880.

The feedback matrix 885 is composed of velvet noise sequences to produce smooth reverberation with a short mixing time. The feedback matrix 885 is designed with FIR filters to be paraunitary so as to be lossless. To design paraunitary FIR feedback matrices, a dense unitary matrix is iteratively multiplied with delay feedback matrices in multiple stages. If the order of the feedback matrix 885 is N, and K cascading stages are applied, then the degree of the dense feedback matrix is $N^K$. This is shown mathematically as:

$$F_0 = U_0 \text{ (unitary)}$$

-continued
$$F_1(z) = U_1 D_{m_1}(z) F_0, \ldots, F_K(z) = U_K D_{m_k}(z) F_{K-1}(z)$$

Here, each U represents a dense scalar matrix and each D represents a diagonal matrix of integer delays such that $m_1=0, 1, \ldots N-1$ and $m_k=L_{k-1}m_1L_k$ is the length of the filter after the kth stage with $L_1=N$.

Velvet feedback matrices exploit the fact that reverberation tails do not need to be fully dense. A few pulses per milliseconds are sufficient to increase the perceptual echo density. A sparsity coefficient can be specified which controls the average number of pulses per sample (where 1 gives a fully dense feedback matrix). The previous step of cascading can be followed to create a velvet feedback matrix with $m_1=[0, N-1/\delta]$ and $L_k=N^k/\delta$.

Similar to the example given in FIG. 8H, an IAC filter 886 may be pre-calculated from an HRTF dataset, which is applied to maintain binaural cues and provide sufficient externalization. The left and right HRTFs are denoted as $L_i(\ )$, $R_i(\ )$, where $i=\{1, 2, \ldots I\}$ is the direction index and I represents the number of HRTFs in the set. Given the foregoing, the IAC filter 886 can be calculated as:

$$\Phi(\omega) = \frac{\left|\sum_i L_i(\omega) R_i^*(\omega)\right|}{\sqrt{\left|\sum_i L_i(\omega)^2\right|\left|\sum_i LR_i(\omega)^2\right|}}$$

The following left and right IAC filters are then applied to the two output channels of the FDN 880.

$$\Phi_L(\omega) = \sqrt{0.5(1 + \Phi(\omega))},$$
$$\Phi_R(\omega) = \sqrt{0.5(1 - \Phi(\omega))}$$

by way of illustration. These frequency responses are approximated with an FIR filter.

The adders 881h and 881i feed the sum and difference of the output of the IAC filters to the DFTF filters 887. The DFTF filters 887 are applied to the coherence matched signals for power spectrum matching. Here, $r_1$ and $r_2$ are the two decorrelated output channels from the FDN 880, $_{L,R}$ are the impulse response of the IAC filters 886, and $h_{L,R}$ are the impulse response of the diffuse field transfer functions of the HRTF dataset. This is given mathematically by:

$$b_L(n) = h_L(n) * (\Phi_L(n) * r_1(n) + \Phi_R(n) * r_2(n))$$
$$b_R(n) = h_R(n) * (\Phi_L(n) * r_1(n) + \Phi_R(n) * r_2(n))$$

As noted above, the MTSE filters are applied to the output of the FDN 880 for subband gain matching of the early reflections and the late reverb. The subband gains of the early reflections and the late reverb tail are matched to avoid discontinuity in the impulse response, and to provide the appropriate equalization. This gain-matching is performed by matching the respective short time energy at the mixing time with the MTSE filters 888, which include biquad cascade filters.

To tune these filters, the subband energy of the FDN 880 at mixing time is calculated without the MTE filters 888. Then, the subband energy of the FDN 880 is subtracted from the target subband energy to design the gain-matching filters. To avoid lower frequency amplification, the MTE is smoothed below 200 Hz. This can be represented mathematically as:

$$MTE_{target}(\omega) = MTE_{early}(\omega) - MTE_{FDN}(\omega)$$

by way of illustration.

Although four delay lines are shown by way of illustration, the example FDN 880 may implement a delay line for each input channel n (rounded up to the nearest multiple of 2). For instance, assuming a 7.1.4 input (i.e., 11 input channels, excluding the subwoofer), the FDN 880 may implement 12 delay lines. In this example, the feedback matrix 885 would have dimension M×M×K, where M is the number of delay lines and K is the FIR order for the feedback matrix filters. The biquad cascade filters 884 would have dimension M×6×P where P is the number of biquad filters.

Since the FDN 880 is stimulated with the input signals during binaural rendering, the FDN 880 produces output signals that include early reflections. Even with tuning during room adaptation, these early reflections will generally not reflect the listening environment. As such, the early reflections produced by the FDN 880 may be discarded or otherwise corrected for.

In further examples, the room adapter 850 may generate the late reverberation portion of the model by adapting a reference late reverberation BRIR set with the reference room parameters 851c. In contrast to the early reflections, the late reverberation can be assumed to be static over different head orientations and translations. As such, the early reflections and the late reverberation can be rendered separately during binaural rendering.

That is, during rendering, the early reflections are interpolated and convolved as the listener's head rotates, whereas only one (rotation and translation-independent) static late reverb tail is convolved with each channel's input. This generates significant computation savings compared with dynamic treatment of the late reverberation. Further, the same late reverb tail (e.g., the center channel) may be used for all incoming channels. For instance, for a 7.1.4 setup, each incoming channel may be summed (with decorrelation) and then convolved with the center channels' long tail, which reduces the number of convolutions from 22 to 2 (one for each ear) (in this example, excluding the low frequency channel). Since the adaptation process may be implemented similarly as the early reflections, the mathematical representations are not repeated.

Referring back to FIG. 8G, the room adapter 850 includes an early-late splicer 856. The early-late splicer 856 performs gain matching of the early reflections and late reverberation portions of the parametric model. Given the estimated mixing time energy (MTE) as described above in the target room parameters 853b and a reference MTE in the reference room parameters 851c, a per-subband gain adjustment can be applied to the early reflections and late reverberation to reach the target spectrum. Examples of the early-late splicer 856 are shown in FIG. 8I (i.e., the MTE filters 888).

For the early reflections, the gain adjustment per-sub band is determined from the difference between the target MTE and reference MTE on a per-subband basis. Since the MTE parameters represent an ensemble average across subbands, applying the gain adjustment retains variation between individual subband IRs (i.e., across the dimensions DRE, including orientation, receivers (number of ears), and emitters). Since the adjustment of the early reflections is based on an average, this can create some discontinuities around the mixing time depending on the short-time energy for each specific combination of the D, R, and E dimensions. In practice, such discontinuities do not typically create audible artefacts (at least with the example overlap (i.e., cross-fade) time of 5 ms in the early reflections-to-late reverberation transition.

For the late reverberation, the MTE can be calculated for the late reverberation portion of the RIR generated by the FDN. From this MTE, the appropriate subband gain to reach the target MTE spectrum can be determined. Then, the gain can be applied to each subband of the late reverberation portion.

The room adapter 850 also include a direct-to-reverberation ratio adapter 857. The direct-to-reverberation ratio adapter 865 is configured to tune the relative energy levels of the direct sound and the late reverberation. Such tuning may use any suitable technique, such as the following examples.

As one example, the direct-to-reverberation ratio adapter 857 may apply a broadband adjustment of the direct-to-early energy ratio (DER). The target DER is estimated in a per-subband manner from the room impulse response as an energy ratio between the direct and early reflections temporal segments of the room impulse response. An intermediate DER is estimated as a ratio of the mean direct energy and the mean energy in the early reflections portion. The difference between the target and intermediate DERs produces a broadband gain to apply to the early reflections and late reverberation temporal segments of the model so as to achieve the target DER. This technique assumes that the ratio of early-to-late energy is correct from the early-late splicer.

In another example, the center time of the RIR is used as a proxy for the direct-to-reverberant ratio. Given a target center-time and the direct HRIR set 851b and early BRIR set 851b, the direct-to-reverberation ratio adapter 857 may calculate a gain to apply to the early BRIR set 851b to achieve the target center time. This approach may avoid potential sensitivity of the DER/DRR parameters to the temporal segmentation between the direct portion and the other portions of the model.

As noted above, some implementations may use a default time of the early reflections portion following the onset of the direction sound (e.g., 2.5 ms). In some circumstances, the DER/DRR parameters may be less useful, such as when there is an early reflection that rapidly follows the direct sound or when the loudspeaker has group delay or frequency-dependent phase delay causing the low frequency response of the direct sound to fall outside the window. In each case, the frequency-dependent DER estimation may be inaccurate. Using the center time of the RIR as a proxy for the direct-to-reverberant ratio may avoid such issues.

The room adapter 850 also includes a normalizer 858. The normalizer 858 is configured to perform normalization on the output, which may reduce any artifacts that would be created by the rendering data 859 during binaural rendering. Any suitable technique may be used for normalization, such as the following examples.

In one example, the normalizer 858 may calculate the spectral energy of the RIRs across ears, speakers, and head orientations. This spectral energy may then be weighted by the EBU R128 loudness frequency-weighting, which creates a Loudness Units relative to Full Scale (LUFS)-based value for normalization (e.g., to a broadcast standard of −23 LUFS).

In another example, the normalizer 858 may use a noise sequence representing the average spectrum of music (e.g., chart music) and/or movie content. Each channel is then convolved with this sequence and then the RMS level of the output binaural signal is normalized. In some examples, different noise sequences may be used for different configurations or content (e.g., a music-based noise sequence for a stereo configuration or content and a movie-based noise sequence for a surround sound configuration or content).

As noted above and shown in FIG. 8C, the room adapter 850 produces rendering data 859, which is used in binaural rendering. The rendering data 859 includes a direct parameter set 859a, an early parameter set 859b, and a late parameter set 859c, which together comprise synthesized BRIR filters for binaural rendering. As discussed above, the BRIR filters are not directly measured, but rather synthesized from a room impulse response measurement and parameters derived therefrom, which informs a segmented parametric model of the RIR.

c. Binaural Rendering

Figure 9A:
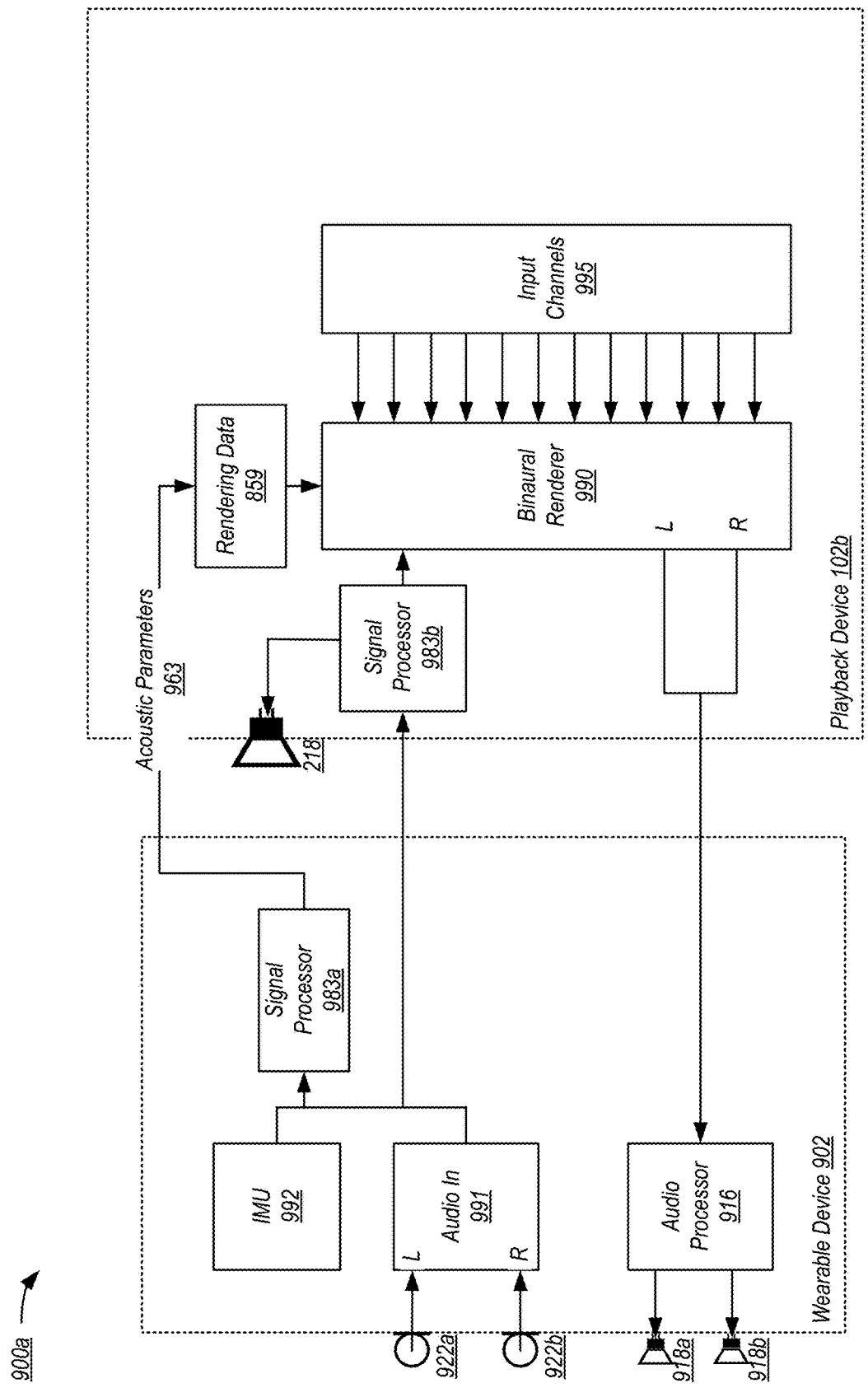
FIG. 9A is a block diagram illustrating a system to facilitate room-adapted binaural rendering in accordance with aspects of the disclosed technology.

As noted above, the preceding examples of room adaptation are intended to generate rendering data 859 that can be used to configure a binaural renderer. To illustrate, FIG. 9A is a block diagram of an example system 900a that implements binaural rendering with room adaptation. The system 900a includes a wearable playback device 902 and a playback device 102b (FIG. 7), which are representative of example devices that may perform binaural rendering. The wearable playback device 902 may include the same or similar components as the playback devices 102 albeit configured into a wearable form such as headphones or earbuds. In this way, the wearable playback device 902 may be the same as or similar to the headphone device 702 (FIG. 7).

The system 900a includes components to facilitate a room impulse response (RIR) measurement, as described in connection with FIG. 7. In particular, the playback device 102b includes one or more speakers 218, which outputs first audio in a listening environment (e.g., the den 101d). Further, the wearable device 902 includes the microphones 922, which are excited by the first audio. The microphones 922 include a microphone 922a and a microphone 922b, which may be mounted on respective sides of the wearable device 902 to facilitate capture of binaural cues during the measurement. During a measurement, an audio in 991 captures second audio representing playback of the first audio in a listening environment (e.g., the den 101d in FIG. 7, among other examples).

The system 900a also includes components to facilitate head tracking and anchoring during binaural rendering. In particular, the wearable playback device 902 includes an IMU 992 that generates sensor data representing head position. Sensor data from the IMU 992 is sent over a data link (e.g., a wireless local area network or personal area network) to facilitate position-aware binaural rendering.

Further, the playback device 102b includes a signal processor 983a, which, inter alia, generates signals to be played. For instance, the signal processor may generate ultrasonic (or near ultrasonic) signals to be played by the speaker(s) 218. In operation, differences in the ultrasonic signals as captured by the microphone 922a and the microphone 922b indicate a relative angle of the wearable device 902 to the playback device 102b. The IMU 992 can be re-anchored to the playback device 102b based on this determination, which can prevent position measurement errors caused by IMU drift. In further examples, the signal processor 983a may analyze different types of signals (e.g., ultra-wideband)

from different types of sensors, which may be used to determine relative positioning of the wearable device 902 to the playback device 102b.

The system 900a further includes components to facilitate binaural rendering. In particular, the playback device includes a binaural renderer 990. The binaural renderer 990 is configured with the rendering data 859, which can be generated using the example techniques described in the preceding section. Within examples, the binaural renderer 990 is configured with the rendering data 859 at start-up (i.e., at a point prior to rendering).

The wearable device 902 may include a signal processor 983b, which may implement all or part of the measurement processor 860 (FIG. 8D). As shown, after being determined, the acoustic parameters 963 are sent to the playback device 102b. The acoustic parameters 963 may include some or all of the target data 953. Target data 953 not determined by the wearable playback device 902 may be determined by the playback device 102b or another suitable device in communication with the playback device 102 and/or the wearable playback device 902.

During rendering, the binaural renderer 990 performs binaural rendering on multiple input channels 995. The input channels 995 may take the form of a multi-channel pulse code modulation (PCM) audio signal. The playback device 102b may receive such a signal via an input interface such as an HDMI port or via a network interface (e.g., the network interface 224), among other examples.

The binaural renderer 990 outputs a two-channel output signal (e.g., a two-channel PCM signal). This output signal may be sent to the wearable device 902 over a wireless data link (e.g., a wireless local area network or personal area network). An audio processor 916 (e.g., a DSP) may decode or otherwise process this output signal and use it to drive the speakers 918. Within examples, the speaker 918a and the speaker 918b are carried on the left and right earcups or earbuds of the wearable playback device 902.

In some examples, some or all of the determination of the acoustic parameters 963 may be performed by another device. To illustrate, FIG. 9B is a block diagram of an example system 900b that implements binaural rendering with room adaptation like the system 900a, but where some processing is offloaded to the control device 104. In an example, the wearable device 902 may send measurement data to the control device 104, which uses such data to determine some or all of the acoustic parameters 963 using the signal processor 983c.

This arrangement may have several possible advantages. For one, the control device 104 may have more resources (e.g., a faster processor or more battery life) relative to the wearable device 902, which allows the processing to be performed more quickly or while conserving the battery life of the wearable device 902. Secondly, the control device 104 and the wearable device 102 may have already established a communications channel for audio from the microphones 922 for other purposes (e.g., telephony or voice control). By offloading the processing to the control device 104, the system 900b may take advantage of this existing communications channel (and potentially forego establishing communications for audio between the wearable device 902 and the playback device 102b). While the offloading of processing to the control device 104 is shown for purposes of illustration in FIG. 8B, such processing may be performed by any suitable device, such as the devices with processors in the media playback system 100 (FIG. 1B).

Figure 9C:
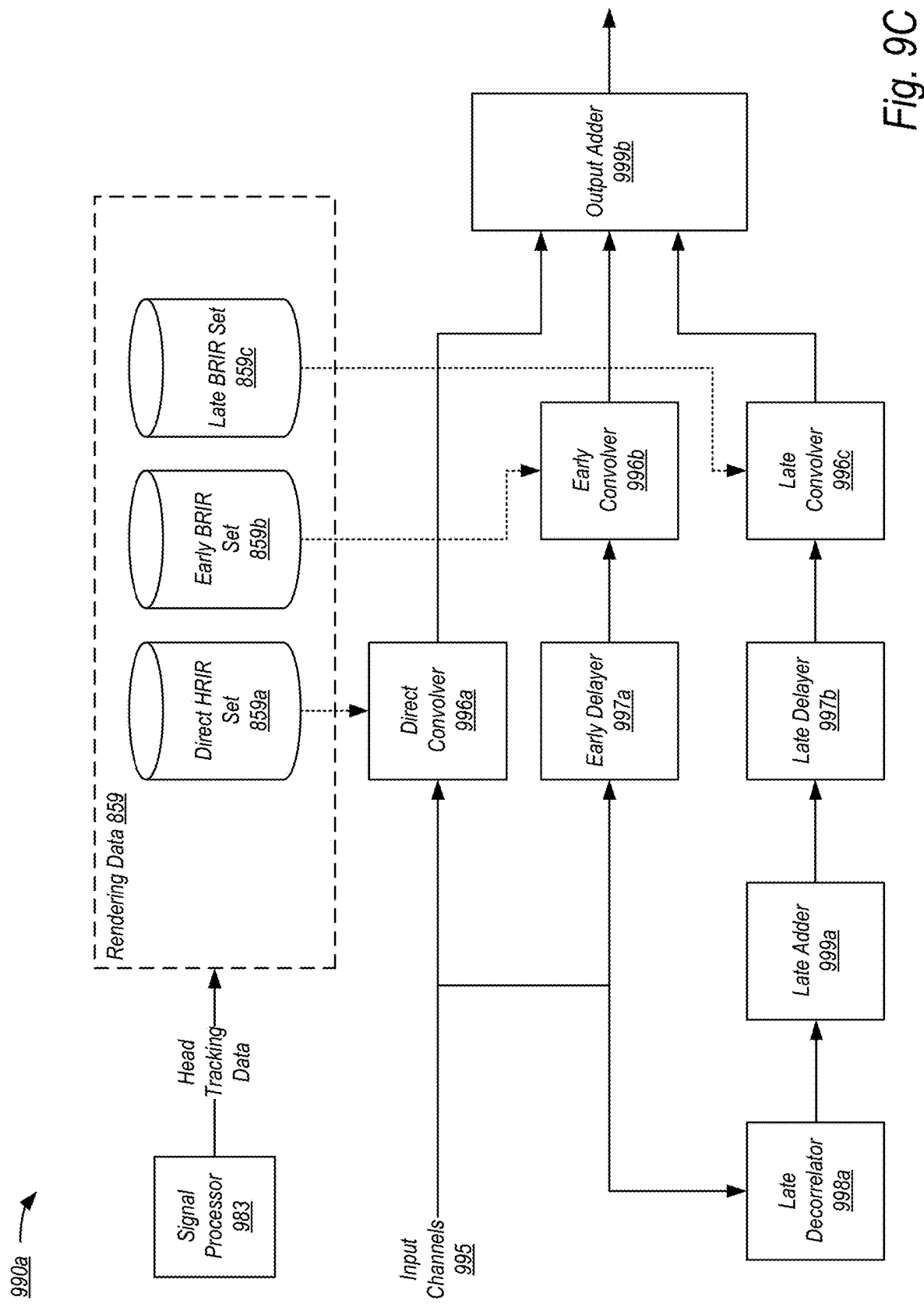
FIGS. 9C and 9D are block diagrams illustrating example room-adapted binaural rendering in accordance with aspects of the disclosed technology.

To further illustrate example operation of the binaural renderer 990, FIG. 9C is a block diagram showing example components of a binaural renderer 990a. As shown, the binaural renderer 990a takes the input channels 995 from the signal processor 983 (referring to one or more of the signal processor 983a, the signal processor 983b, and/or the signal processor 983c) as input to three signal paths corresponding to the direct sound, the early reflections, and the late reverberation, respectively. Further, the binaural renderer 990a uses the rendering data 859 as control data for the rendering. In this example, the binaural renderer operates on buffers of a fixed block size b.

The sound paths include respective convolvers 996. Each convolver may convolve the input channels 995 with a respective convolution matrix. During convolution, the convolution matrices apply FIR filters using a low-delay uniform-partitioned overlap-save convolution algorithm. Other examples of possible convolution algorithms include non-uniform partitioning or overlap-add, among other examples The direct sound path includes a direct convolver 996a, which convolves the input channels 995 with a convolution matrix corresponding to the direct parameter set 859a. The direct convolver 996a implements a crossfading convolution matrix since the filters are assumed to change frequently with listener head rotation. The filters are updated for each block b based on head tracking data from the signal processor 983. For each block of output, a convolution is performed with the current and previous set of FIR coefficients. A cross-fade is performed across the duration of the block to smoothly transition from one filter to the other (the outputs of the two convolutions).

Example implementations might not perform cross-fade convolution for each block. Instead, a cross-fade convolution may be performed when a filter update is necessary (e.g., due to new head tracking data). In this example, the rate is dependent on the frequency of head tracking updates and block size. For instance, using 100 Hz head tracking updates and 2.5 ms block size, a cross-fade would be performed every fourth block.

The early reflections sound path includes an early delayer 997a. The early delayer 997a accounts for the propagation delay through the direct convolver 996a. The early reflection BRIRs are intended to start at the end of the direct sound HRIRs in the direct parameter set 859a. A short overlap (e.g., 0.5 ms) is used, with a fade-in on the early parameter set 859b.

The early reflections sound path also includes an early convolver 996b, which convolves the input channels 995 with a convolution matrix corresponding to the early parameter set 859b. The early convolver 996b implements a crossfading convolution matrix since these filters are also assumed to change constantly with listener head rotation. The filters are updated for each block b based on head tracking data from the signal processor 983. For each block of output, a convolution is performed with the current and previous set of FIR coefficients. A cross-fade is performed across the duration of the block to smoothly transition from one filter to the other (the outputs of the two convolutions). Given the relative temporal length of the early reflections to the direct sound (as shown in FIGS. 8A-8B), the early convolver 996b uses much longer FIR filters than the direct convolver 996a and so is relatively more computationally expensive.

The late reverberation sound path includes a late decorrelator 998. The late decorrelator decorrelates the input channels 995 before the late adder 999a to prevent coherent summing of the late reverberation tail after downmixing.

Example techniques for decorrelation may involve gain scaling, frequency-depending filtering, or adding delays, among other examples.

By way of illustration, as an example of gain-scaling, the late decorrelator 998 may implement a static gain matrix, which ensures mixing of the input channels 995 and also scales their gains. This scaling prevents a late tail boost. The late decorrelator 998 has twice the input channels as output channels as there are channels for each ear. For instance, if there are 12 input channels in the input channels 995, the late decorrelator 998 has 24 output channels or 12 channels for each ear. Alternatively, the late decorrelator 998 may use the same gains for the left and right ears. In this case, the late decorrelator 998 would have an equal number of input and output channels.

The late adder 999a mixes the input channels (which are the output channels of the late decorrelator 998, as shown) down to a two-channel representation. The mixing may include summing each of the twelve channels corresponding to the left and right ears. As such, continuing the example above, the late adder 999a may take in as input 12×2 channels and output 2 channels.

The late delayer 997b adds delay to account for the propagation delay of the input channels 995 through the direct sound path (i.e., the direct convolver 996a) and the early reflections path (i.e., the early delayer 997a and the early convolver 996b). Like the early delayer 997a, a short overlap may be used with fade-in on the late parameter set 859c and fade-out on the early parameter set 859b. This overlap may be approximately 5 ms for example.

The late convolver 996c applies the binaural reverb represented in the late parameter set 859c to the input channels 995. The late parameter set 859c includes a representation of the late reverb portion of the parametric model generated from a noise sequence (FIG. 8H). In contrast to the direct convolver 996a and the early convolver 996b, the late convolver 996c implements a static convolution matrix. A static convolution vector is possible because the late reverberation is assumed to be static for all head positions.

Figure 9D:
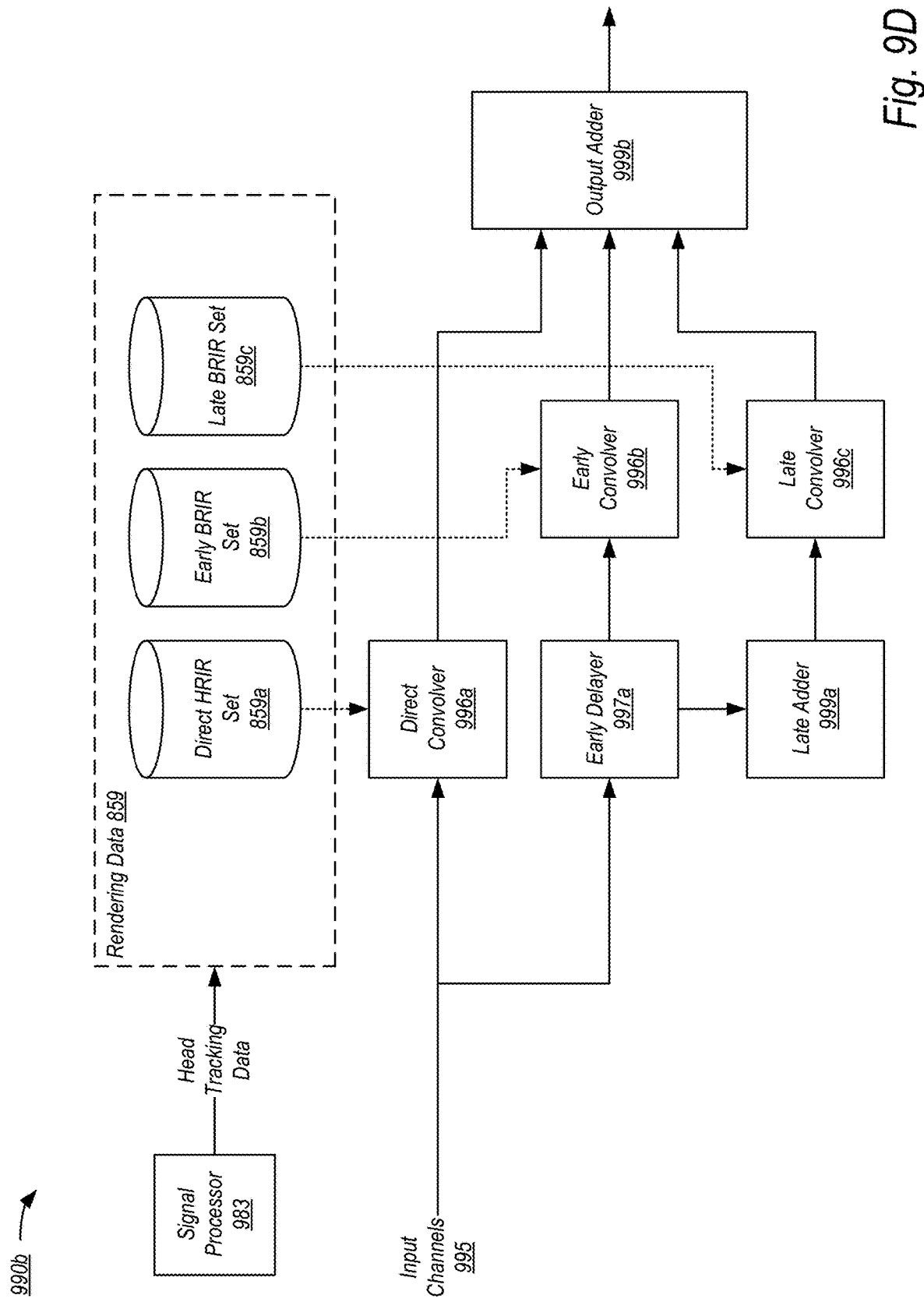

FIG. 9D is a block diagram showing example components of a binaural renderer 990b, which illustrates example binaural rendering when a parametric reverberator is used to generate the late reverberation. In this example, the late adder 999a downmixes the delayed input channels from the early delayer 997a and then the late convolver 996c adds the late reverb. Here, the static convolution matrix of the late convolver 996c implements a parametric reverberator to generate the late reverb. An example is the FDN 880 in FIG. 8I.

In some examples, the binaural renderer 990b may perform some initial decorrelation. For instance, a direct delay vector may be applied before the direct convolver 996a. The late adder 999a may then be fed this decorrelated signal.

d. Head Tracker

As noted above, example spatial audio rendering may utilize head tracking, which brings auditory externalization and increased realism to the spatial audio user experience. Typical wearable headphones that have spatial audio features suffer from two major shortcomings of the inertial measurement units (IMUs) that support nearly all head tracking implementations: first, the IMUs possess no directional reference to the television or content, and second, the IMU's sensor fusion algorithm (SFA) is subject to drift, which causes even an aligned scene to eventually fall out of alignment without regular correction. Moreover, an alignment of the wearable with the content is only good for the user's current viewing position—at a new position, objects in the immersive spatial audio sound field will appear to come from the wrong direction (barring a correction).

Various solutions have been developed to mitigate these shortcomings. A first technique involves manual alignment wherein at donning time or when otherwise necessary, the user is prompted to "re-zero" the head tracker by pressing a button on the headphone or app controller while looking at the content. In other techniques, an assumption is made as to the direction of the content based on the user's gaze direction. For instance, in a second technique, the content is defined as being in front of the user at the time they don the headphone, and/or the bearing is zeroed when content is started. Alternatively, in a third technique, based on an assumption that the content is wherever the user has recently been facing, the mean, median, or otherwise averaged yaw (bearing) of the user's head over a preceding window (e.g., 7-9 seconds) is compared to a previously stored average and the new yaw is stored as zero if the difference exceeds a threshold.

Less commonly, some techniques provide absolute bearing. For example, as a fourth technique, in gaming applications, external active markers and cameras provide absolute bearing, subject to tight range and angular constraints, line of sight, and lighting conditions. A fifth technique involves a camera or LIDAR directed at the user to perform gaze and/or skeleton tracking, which is similar to the fourth technique but does not involve active markers.

Each of these techniques has drawbacks. The first, fourth, and fifth techniques are more accurate than the second and third techniques, but either burden the user with repeatedly performing a manual calibration or with setting up and maintaining external markers and/or sensors. For usability, most commercially-available spatial audio headphones use one of the second and third techniques. This choice acknowledges that certain usage scenarios, such as dual-screening i.e., looking away from the television and at a phone or tablet), will result in misalignment. As such, users are typically offered the option of disabling head tracking when its downsides become annoying.

Example head tracking technologies described herein attempt to avoid such shortcomings through automatic alignment. As opposed to specialized markers and cameras, such technologies use playback devices that are already present in a user's listening environment. In particular, user head bearing is estimated using angle-of-arrival measurements from a playback device (e.g., a soundbar) to the wearable device.

During a measurement, the playback device emits sound (e.g., inaudible ultrasonic chirps), which is picked up by respective microphones on each side of the user's head (e.g., on each earcup of headphones). Differences in the respective times-of-flight indicate the user's head bearing relative to the soundbar. In typical usage, the soundbar is co-located with the television, such that it can be used as a proxy for the direction of the content. The user's head bearing at this point is then used to inform subsequent orientations derived from the IMU.

Figure 10A:
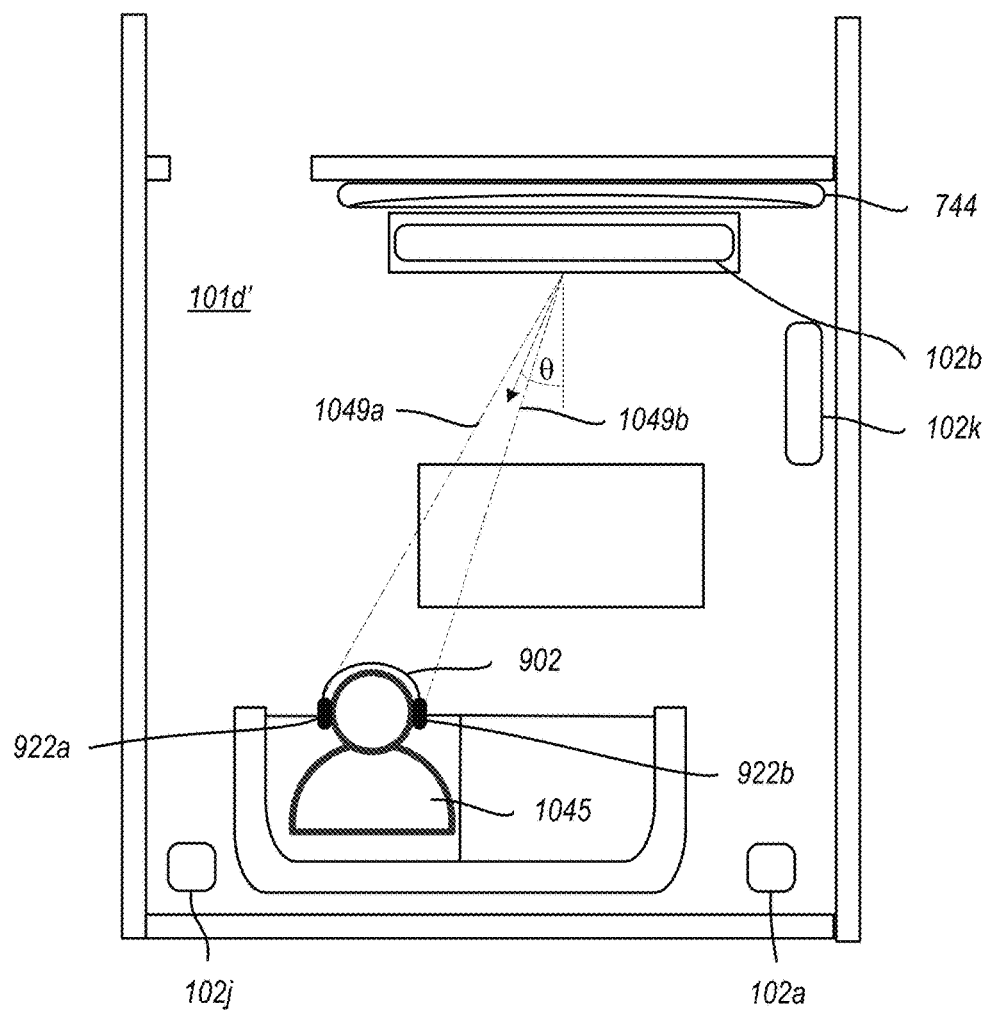
FIG. 10A is a diagram illustrating example head tracking in accordance with aspects of the disclosed technology.

To illustrate, FIG. 10A shows an example listening environment, which in this example is a variation on the den 101d (FIG. 7) and is designated as the den 101d'. In contrast to the den 101d shown in FIG. 7, the den 101d' in FIG. 10A includes additional seating options, such that the user 1045 may sit off-center of the television 744, as shown. As discussed in connection with FIG. 7, the den 101d includes the playback device 102b, the playback device 102a, the playback device 102j, and the playback device 102k. In this example, the playback device 102b is operating as a home theatre primary and is connected to a television 744. A user 1045 is wearing the wearable device 902, which may be the same or similar to the headphone device described in FIG. 7 as including the same or similar components as the playback device 102 (FIG. 2A) but configured into a headphone form.

During an example head tracking measurement, the playback device 102b emits a signal, which travels along a path 1049a and a path 1049b to the microphone(s) 922a and the microphone(s) 922b, respectively. The times-of-arrival of the signal along the path 1049a and the path 1049b may be compared to estimate the bearing of the wearable device 902 relative to the playback device 102b, which is represented in FIG. 10A using the symbol θ. The playback device 102b is co-located with the television 744 (e.g., mounted above or below), such that the direction of the playback device 102b can be used as a proxy for the direction of the television 744 relative to the wearable device 902.

Within examples, the signal emitted by the playback device 102b may be an audio signal. As noted above, in some examples, an inaudible ultrasonic chirp or other waveform may be used as the signal, as such a signal might not be noticeable by the typical user. Moreover, the playback device 102b is already equipped with audio transducers (e.g., the speakers 218 (FIG. 2A)) that are capable of outputting such signals.

While audio signals are described by way of illustration, example technologies are not limited to acoustic signals. In other examples, the signal may be implemented as an electromagnetic signal, such as a radio waveform (e.g., an ultra-wideband signal) that is emitted using one or more antennas. Other example electromagnetic signal types include infrared or visible light, among other examples.

In typical listening environments, such measurements are practical only in a limited range of conditions. Direct paths from the playback device 102b to the wearable device 902 (e.g., the paths 1049) must exist, and the user must be within range of the propagation of the emitted signal. Moreover, as the angle between the playback device 102b and the wearable device 902 increase, so does measurement error.

Figure 10B:
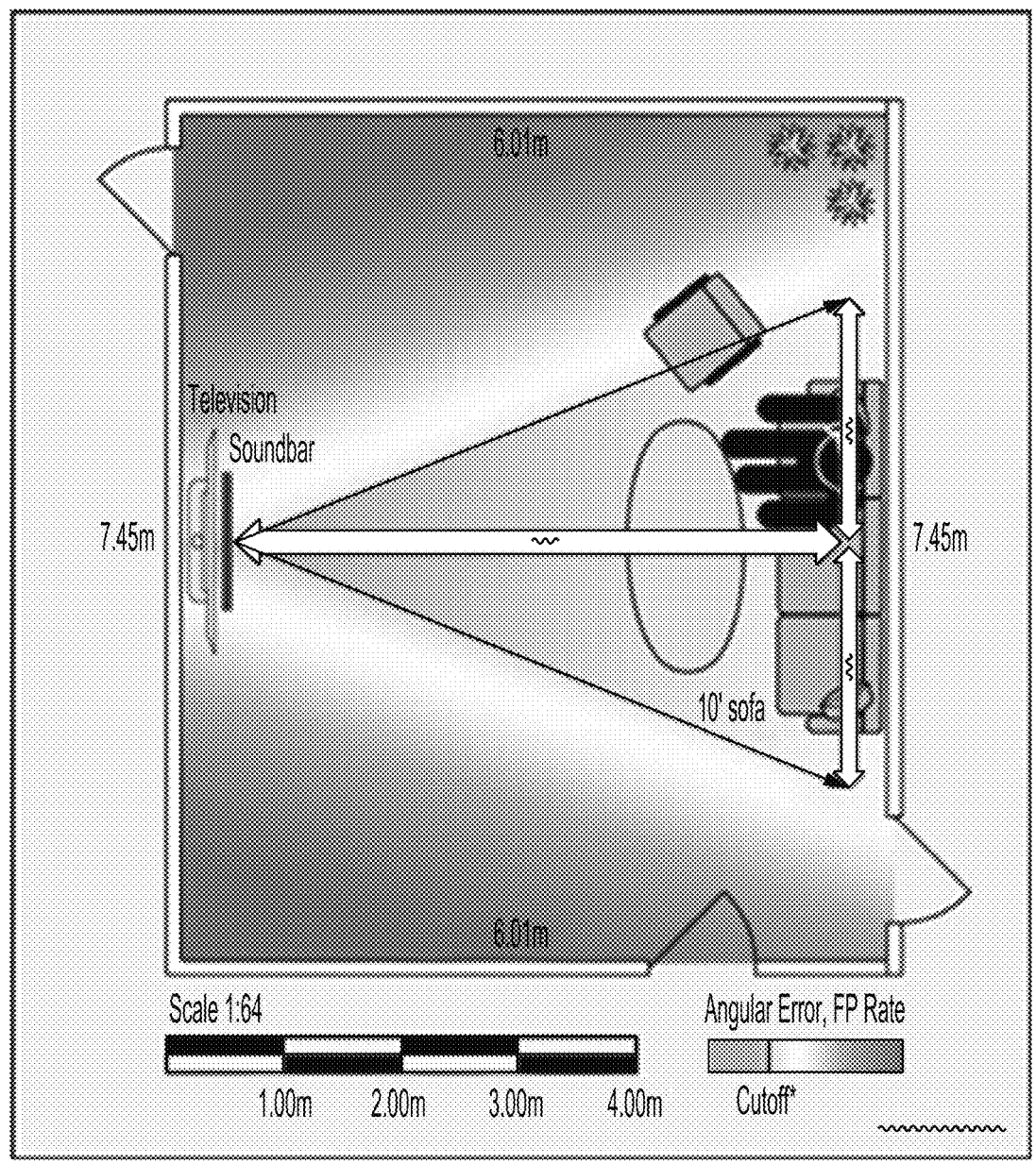
FIG. 10B is a diagram illustrating example coverage of an example head tracker in accordance with aspects of the disclosed technology.

To illustrate, FIG. 10B is a diagram illustrating example coverage of the example head tracking measurements. As shown, extreme angles to the left or right are not expected to produce reliable measurements. However, the expected user seating positions for watching the television are expected to be within the working area of the measurement system.

Figure 10C:
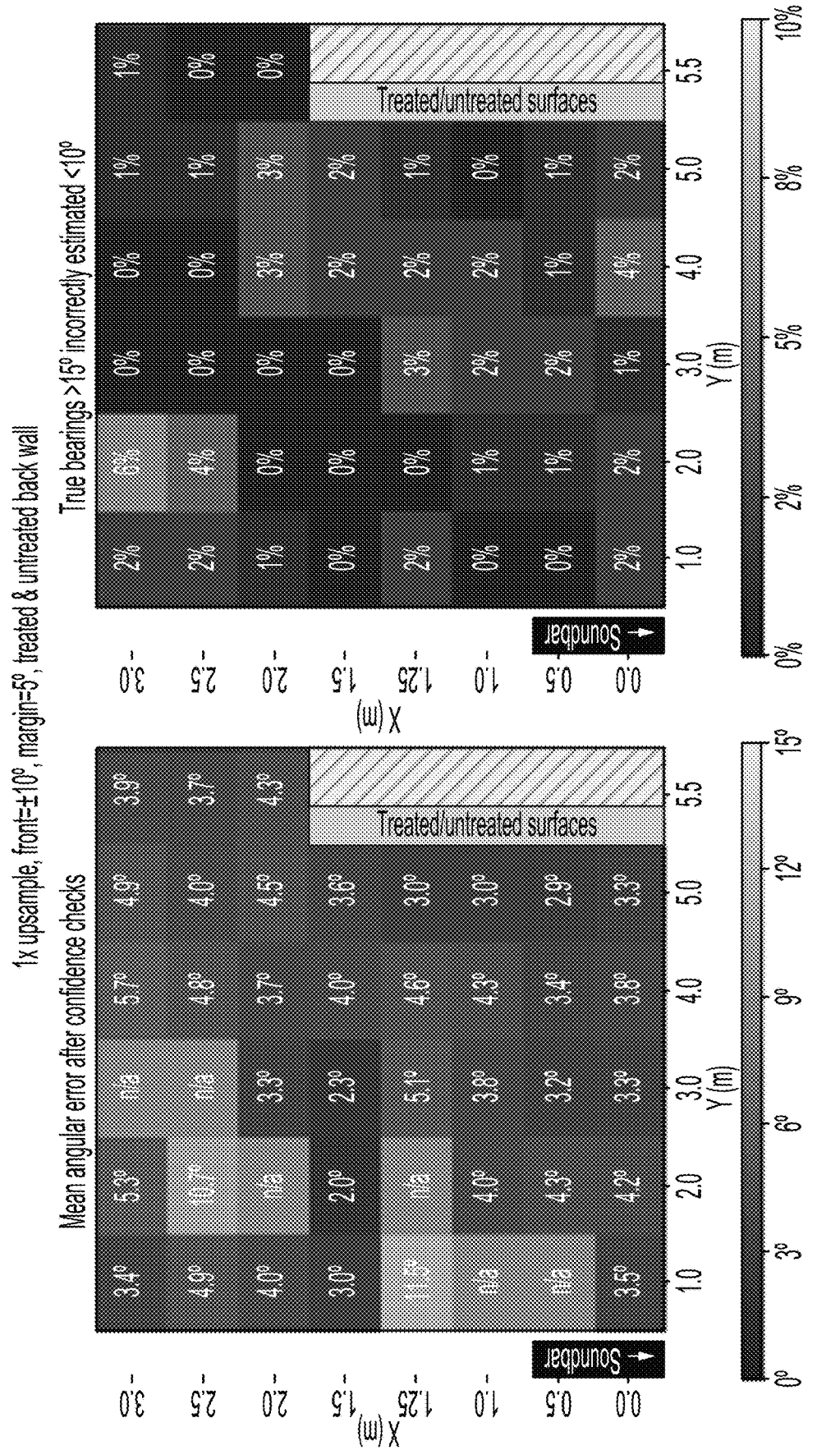
FIGS. 10C and 10D are diagrams showing test results of example head tracking in accordance with aspects of the disclosed technology.
Figure 10D:
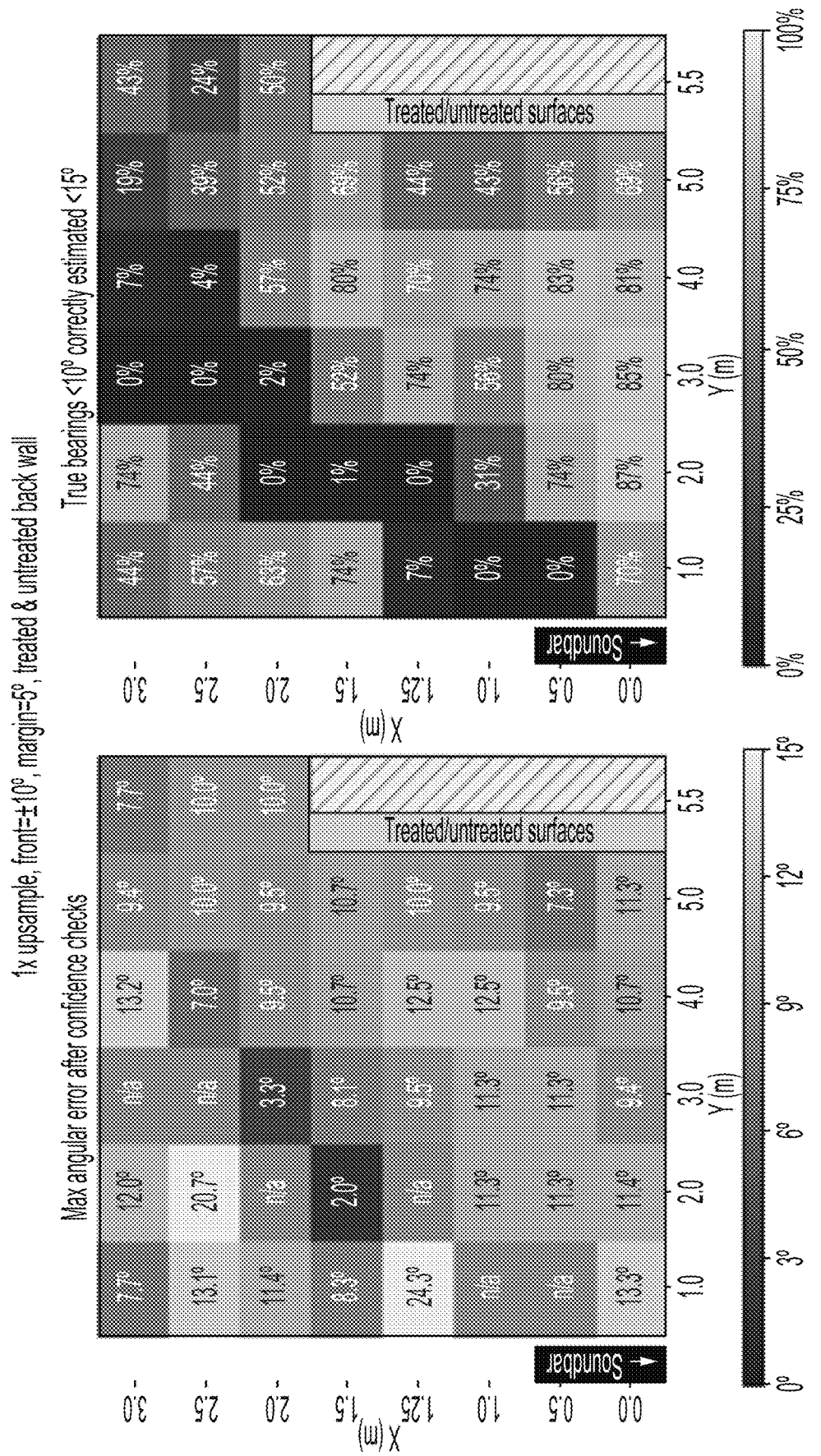

These expectations are confirmed by measurement data. FIGS. 10C and 10D represent measurement data collected during testing of a soundbar and headphone. As shown, error is generally lower when the angle between the soundbar and headphone is smaller. The error increases when the angle between the soundbar and headphone is larger, or at extreme distances.

Given the working area for such measurements, example head trackers may implement a secondary (or fallback) head tracking technology. For instance, when the user is detected as being out-of-range (e.g., outside of the den 101d' (FIG. 10A)), the head tracker may fall back to on-device head tracking. Such on-device head tracking may take any suitable form, such as the example techniques described above in which the audio scene is oriented based on an assumption is made as to the direction of the content based on the user's gaze direction.

To illustrate, an example secondary head tracking technology may involve a combination of the second and third techniques described above. In such an example, the content is defined as being in front of the user at the time they don the headphone, and/or the bearing is zeroed when content is started. As playback proceeds, the scene is re-zeroed based on the user's current gaze direction. For instance, based on an assumption that the content is wherever the user has recently been facing, the mean yaw (bearing) of the user's head over a preceding window (e.g., 7-9 seconds) is compared to a previously stored mean and the new yaw is stored as zero if the difference exceeds a threshold.

Figure 11A:
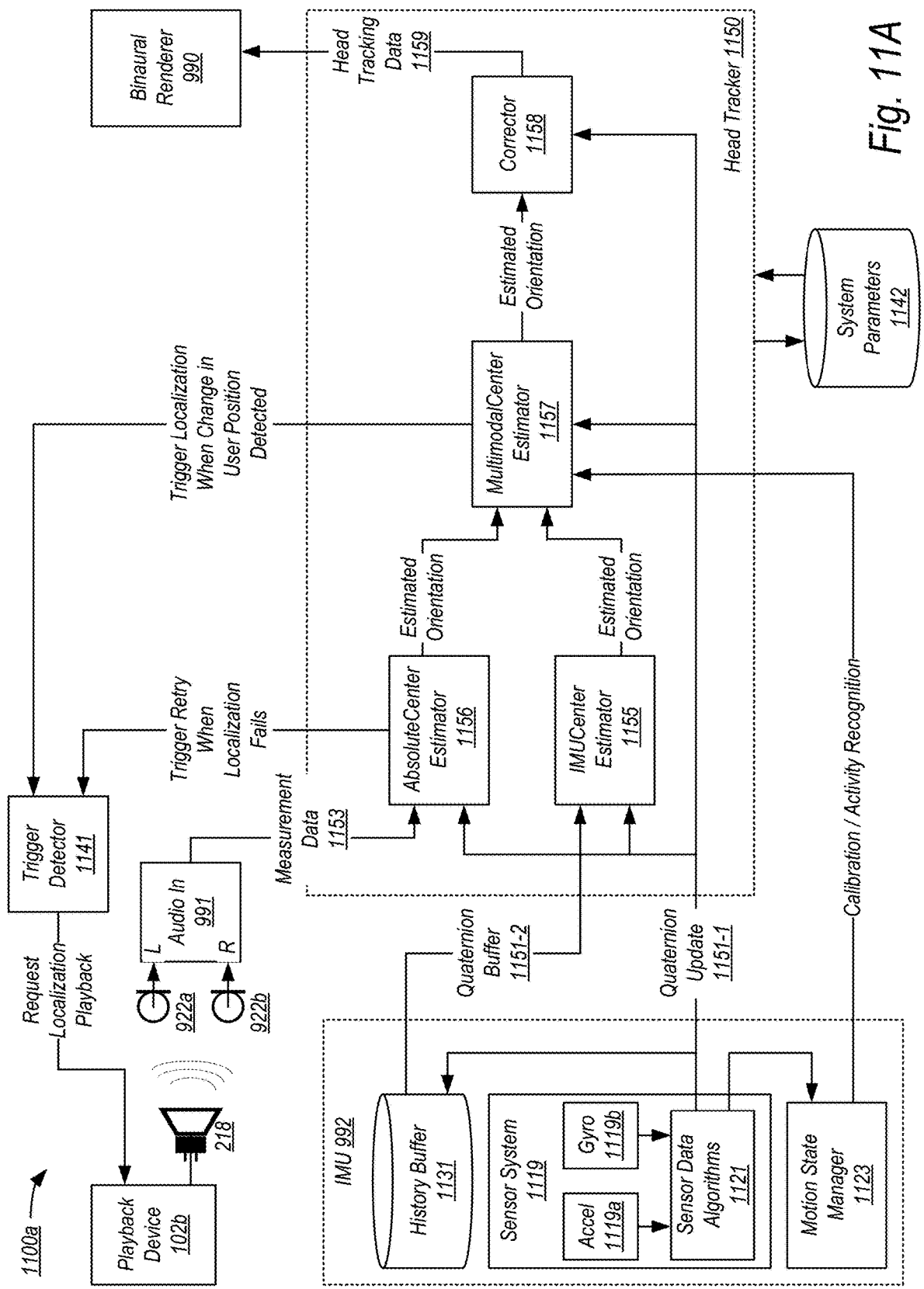
FIGS. 11A, 11B, 11C, and 11D are block diagrams illustrating example head tracking in accordance with aspects of the disclosed technology.

To further illustrate example head tracking technologies, FIG. 11A is a block diagram illustrating an example system 1100a that includes a head tracker 1150. Within examples, the head tracker 1150 may implemented in a system that includes a wearable playback device, such as the wearable playback device 902 (FIGS. 9A and 10A). Yet further, certain features of the head tracker 1150 may involve an external device that is used as a reference point, such as the playback device 102b (FIGS. 1A, 7, 9A and 10A).

In operation, the head tracker 1150 utilizes IMU data 1151 from the IMU 992 (shown as the quaternion update data 1151-1 and quaternion buffer 1151-2) to estimate a user head bearing (i.e., orientation) using the IMUCenter estimator 1155. The head tracker 1150 also utilizes measurement data 1153 (along with the IMU data 1151) to estimate orientation based on time-of-flight measurements using the Absolute-Center estimator 1156. The MultimodalCenter estimator 1157 uses sensor fusion to combine the IMU-based estimate and the time-of-flight-based estimate. The corrector 1158 rotates incoming IMU quaternions in the quaternion update data 1151-1 to a reference frame that is based on the estimated orientation(s) produced by the IMUCenter estimator 1155, the AbsoluteCenter estimator 1156, and/or the MultimodalCenter estimator 1157. The IMU quaternions are then sent to the binaural renderer 990 as head tracking data 1159 where it is used to inform binaural rendering as described in connection with FIGS. 9A-9D.

The IMUCenter estimator 1155 is the default bearing estimator for use on-the-go (e.g., outside the home) or outside of the range (i.e., working area) of a playback device 102, such as the playback device 102b, that supports time-of-flight measurements and/or binaural rendering. When inside the range of a playback device 102 that supports time-of-flight measurements, the IMUCenter estimator 1155 can operate as a fallback to the AbsoluteCenter estimator 1156.

In operation, the IMUCenter estimator 1155 computes the direction-of-center using averages and variances computed on a buffer of recent orientations provided by the IMU 992. The IMU 992 includes a sensor system 1119, which includes an accelerometer 1119a and gyroscope 1119b. These sensors produce raw data indicative of acceleration and angular velocity/orientation, respectively.

In operation, the IMU 992 executes one or more sensor data algorithms 1121. The sensor data algorithms may include a sensor fusion algorithm to combine data from the accelerometer 1119a and gyroscope 1119b to yield virtual sensors such as quaternions representing current orientation. These quaternions are both provided as input to the head tracker 1150 as the quaternion update data 1151-1 and stored in the history buffer 1131 to be read out as the quaternion buffer data 1151-2. Although the head tracker 1150 is shown by way of example as operating on the basis of quaternions, other coordinate systems (e.g., Eulerian) may alternatively be used.

The sensor data algorithms 1121 may also include one or more activity recognition algorithms that attempt to estimate activities from the accelerometer and gyroscope data and/or the virtual sensor data (e.g., quaternions). States corresponding to these activities are maintained in the motion state manager 1123 (e.g., as state variables). These states may inform operation of the head tracker 1150 (such as in determining how much confidence to attribute to either the IMU-based measurement and/or time-of-flight-based measurement). These states may also be used to change parameters of the IMUCenter estimator 1155 (e.g., update rate or buffer overlap), depending for example on whether the user is deemed to be moving or largely stationary. The sensor data algorithms may also include other algorithms, such as one or more calibration algorithms.

As noted above, the IMUCenter estimator 1155 computes the direction-of-center using averages and variances computed on a buffer of recent orientations provided by the IMU 992. These computations are based on the assumption that center (i.e., the intended reference point of the scene) is the direction towards which the user's head has been primarily oriented. This assumption holds when the user is actively watching screen content or otherwise remaining in place during spatial music listening. However, this assumption can break in a number of common cases, such as doing chores while moving around or other visual tasks (e.g., looking at a smartphone or table, a.k.a. dual-screening) while also watching television. This assumption can also produce errors in the television-watching use case if the screen field-of-view is large enough that the user fixates on some part of the screen other than the center for a long time.

As a result of these considerations with respect to the central assumption, the IMUCenter estimator 1155 may include a variable estimation update rate. For example, the IMUCenter estimator 1155 may implement a state machine that that models the scene direction using an ensemble of averages for a given seating position. When the user is believed to be relatively stationary, the estimates are low-pass filtered such that the estimate update rate is lower. Conversely, when the user is moving about, the estimates are updated more quickly. In some cases, head tracking may also be temporarily paused (e.g., by interpolating to and holding an identity quaternion at the output) if activity recognition algorithms detect that the user is moving in a way that precludes obtaining a stable IMUCenter estimate.

The AbsoluteCenter estimator 1156 is the default bearing estimator when a supported playback device 102 is within range (such as in the example home theatre listening areas illustrated by the den 101*d* (FIG. 10A). When in range, time-of-flight measurements may be carried out by the wearable device 902 and the playback device 102*b*. The playback device 102*b* emits ultrasonic (or near-ultrasonic) signals using the speaker(s) 218. When the playback device 102*b* is a soundbar, the particular speaker(s) that emit the signals may be the center channel, as such speaker(s) are typically most centrally located. These signals are captured by the microphones 922 of the wearable device 902. The microphone(s) 922*a* include one more microphones carried on a first earcup (e.g., left) of the wearable device 902 while the microphone(s) 922*b* include one or more microphones carried on a second earcup (e.g., right). The ultrasonic signals captured by the microphones 922 are digitized by the audio in 991 and provided to the AbsoluteCenter estimator 1156 as the measurement data 1153. While acoustic signals are described here by way of example, in alternative examples radio frequency signals (e.g., ultra-wideband transmissions) may be used instead in the time-of-flight measurements.

In operation, the AbsoluteCenter estimator 1156 estimates the time difference of arrival (TDOA) of the ultrasonic signals at the microphones 922. From the TDOA, the AbsoluteCenter estimator 1156 computes an estimated Angle of Arrival (AoA) between the user's head and the center channel of the sound bar. The AoA combined with the concurrent IMU heading provides a relatively more accurate (median absolute error of 2°) estimate of the up-to-date direction-of-center. Moreover, this measurement can be completed in as little as 1 second.

In the event the user changes seating positions, the AbsoluteCenter estimate becomes stale. Detection of a change in user position causes the system 900 to perform another time-of-flight measurement. This is illustrated in FIG. 11A by the trigger detector 1141, which requests localization playback (e.g., of the ultrasonic signals) when a change in user position is detected. This request may be sent to the playback device 102*b* wirelessly (e.g., via Bluetooth®). Following the subsequent time-of-flight measurement, a new AoA estimate is computed.

In the event the user remains seated in place, this estimate will become stale over time due to IMU drift. To maintain an accurate estimate, the AbsoluteCenter estimator 1156 may trigger time-of-flight measurements periodically (e.g., every 60 seconds). The trigger detector 1141 may operate a 60 second timer that triggers a new time-of-flight measurement when it expires. If a time-of-flight measurement is completed before the timer expires (e.g., because of a user change in position), the timer is reset. Such a scheme may balance the desire for up-to-date estimates with the resource usage (e.g., processor cycle and battery draw) that measurement involves.

The multimodal estimator 1157 is configured to fuse estimates from the IMUCenter estimator 1155 and the AbsoluteCenter estimator 1156. Since such fusion is based on confidence in each of the respective estimates, the multimodal estimator 1157 is also responsible for triggering re-measurement. Generally, the multimodal estimator 115 triggers a time-of-flight measurement when a new user position is detected, and switches between the estimate from the AbsoluteCenter estimator 1156 and the estimate from the IMUCenter estimator 1155 depending on how recently the former was made. Further, as the estimates are switched, the multimodal estimator 1157 smoothly interpolates between the two estimates to avoid artifacts that might be experienced by the user.

Further, the multimodal estimator 1157 can also fuse the two estimates as a weighted sum based on confidence in the estimates. Confidence in the estimate from the AbsoluteCenter estimator 1156 is highly influenced by the how recent the last time-of-flight measurement was performed, but other factors, such as measurement quality, may be considered as well. Confidence in the estimate from the IMUCenter estimator 1155 is influenced by the calibration state of the IMU 992.

The corrector 1158 is configured to rotate IMU data to a reference frame that is centered on a reference frame (i.e., the estimated gaze direction from the multimodal estimator 1157). As discussed above, the estimated gaze direction may be the gaze direction estimated by the AbsoluteCenter estimator 1156, gaze direction estimated by the IMUCenter estimator 1155, or a combination of the two. Rotating the IMU data generates head tracking data that is centered on the reference frame.

Ultimately, the head tracking data is used during binaural rendering to keep the spatial audio scene centered on the reference frame. To that end, binaural rendering filters (e.g., the rendering data 859) may be updated with the head tracking data, as described in connection with FIGS. 9C and 9D. As the head tracking data changes based on new IMU samples, the binaural rendering filters are updated as well.

Certain system parameters 1142 may influence operation of the head tracker 1150. The system parameters 1142 may include per-microphone gain coefficients, which may be used to offset differences in inherent microphone characteristics. Additionally, or alternatively, the system parameters 1142 may include a head size estimate. Using an estimate of the user's head size (instead of a fixed "typical" value) may improve the accuracy of the AoA estimation, especially for head sizes that are either exceptionally large or small.

Figure 11B:
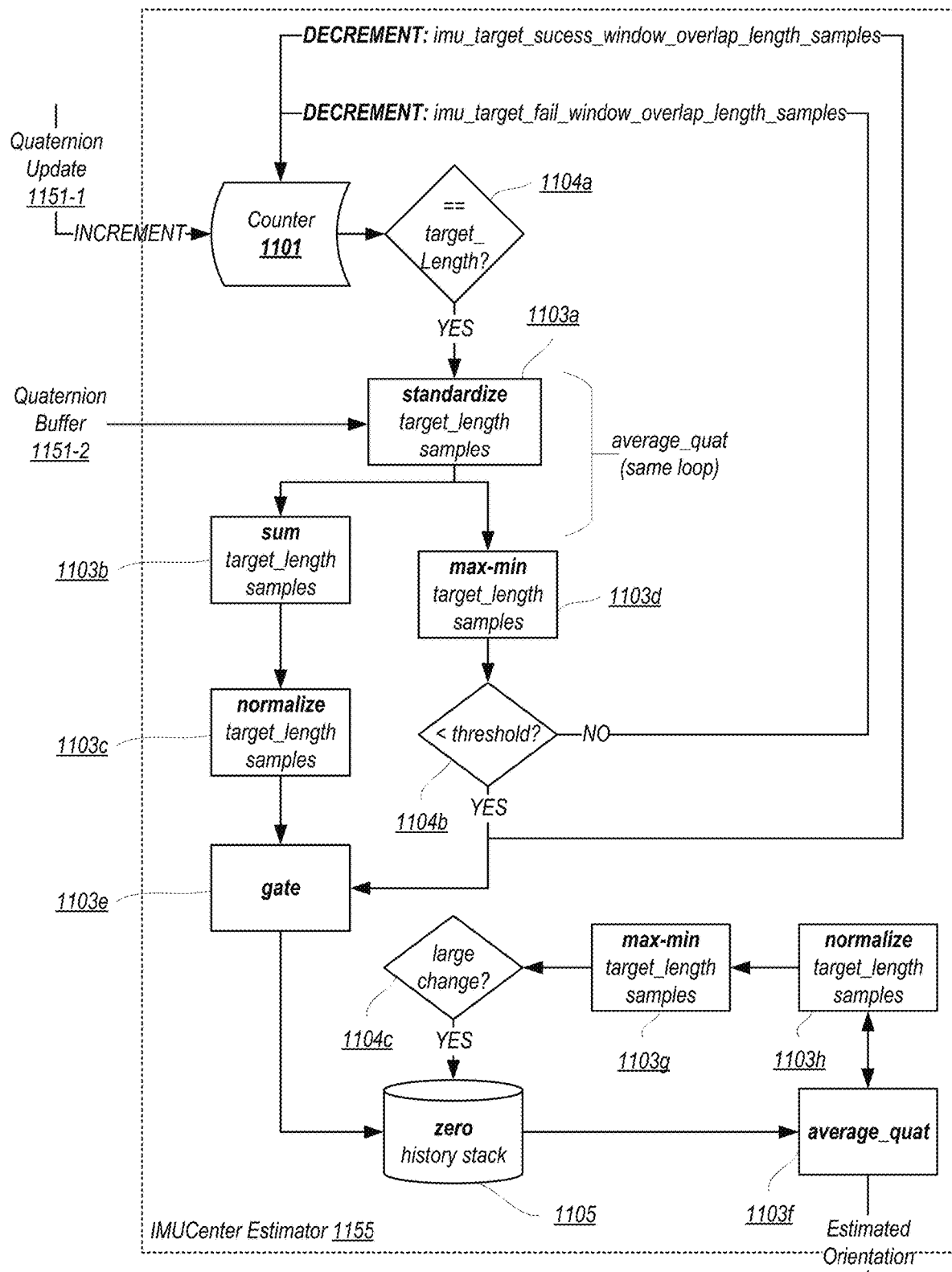

To provide further illustration, FIG. 11B is a block diagram showing further example details of the IMUCenter estimator 1155. As noted above, the IMUCenter estimator 1155 computes the direction-of-center using averages and variances computed on a buffer of recent orientations provided by the IMU 992, which is shown here at the quaternion buffer 1151-2. Although quaternions are used as the coordinate system by way of example, alternative examples may use 1D or 2D Euler angles, among other examples.

The IMUCenter estimator 1155 operates under the assumption that center is the direction towards which the user's head has been primarily oriented. To this end, the IMUCenter estimator 1155 is backward looking. To facilitate this, the IMUCenter estimator 1155 utilizes a counter 1101 which points to a location in the history buffer 1131 and allows for adjustment to the buffer step (FIG. 11A).

When new quaternion data 1151-1 provided, the counter 1101 is incremented. The counter 1101 continues to be incremented under the history buffer 1131 is determined to reach the target length at block 1104a. The length of the history buffer 1131 corresponds to the gaze duration that resets the user gaze direction estimate. An example range of values of the history buffer 1131 is 4-11 seconds with 7 seconds being tested as an appropriate value for home theatre mode. Alternate lengths may be used as well either in on-the-go mode or for home theatre mode.

When the history buffer 1131 is determined to reach the target length at block 1104a, the IMUCenter estimator 1155 proceeds to block 1103a. At block 1103a, the samples in the history buffer 1131 are standardized prior to averaging (summing and normalization). Given a series of quaternions representing a sequence of rotations, it is important to ensure that consecutive quaternions in the series are as close to each other as possible in the 4D quaternion space. Naively interpolating between a quaternion and its negation (an equivalent physical rotation) passes through the origin of the quaternion space, which does not represent a valid rotation. Standardizing a series of quaternions ensures that all quaternions in the series are consistent with each other in terms of their double cover property.

To standardize a series of quaternions, let the first quaternion in the series be the reference. For each subsequent quaternion, choose either the quaternion itself or its negation, depending on which is closer to the reference. The relative closeness of the pairs can be compared using the sign of the dot product between the reference and the quaternion under consideration. If the dot product is less than zero, negate it, and otherwise maintain as is.

Such standardization reduces the angular error introduced by element-wise summing followed by normalization. This technique of averaging the rotations is computationally efficient but can lead to inaccurate results if the quaternions are not close to each other in the 4D space, even when the quaternions represent rotations that are in fact close together. Standardization can dramatically reduce the angular error relative to summing and normalization alone.

In alternative examples, other averaging techniques may be used instead of standardization followed by element-wise summing followed by normalization. An eigenvalue-based technique involves constructing a 4×4 matrix from the quaternions, calculating its eigenvalues and eigenvectors, and returning the eigenvector corresponding to the largest eigenvalue as the average quaternion. This method can provide accurate results, but it is computationally expensive. Spherical linear interpolation (SLERP) involves interpolating between the quaternions on the 4D sphere. While this method can provide accurate results, it also can be computationally expensive, especially for large numbers of quaternions. Other examples include iterative methods, which involve iteratively refining an estimate of the average quaternion (e.g. gradient descent to minimize the sum of squared differences from the input quaternions). Depending on the number of iterations required for convergence, these methods can be more efficient than the eigenvalue-based method.

At blocks 1103b and 1103c, the samples are summed and normalized, respectively. However, the samples are not used to estimate gaze direction until certain conditions have been met. In the interim, the IMUCenter estimator 1155 uses the first donned orientation as the zero offset (or alternatively, disables head tracking until the conditions have been met).

The conditions may include various conditions that indicate that the estimate is likely to be an improvement on the donned orientation (or no head tracking) following a cold start. For instance, a first condition may be reaching the target length of accumulated history in the history buffer 1131. A second condition may be that the user is still.

At block 1103d, the IMUCenter estimator 1155 performs a validation step. The validation step may include, for example, ensuring that that the user's head is still and likely fixated on one location such as a display (e.g., a television screen). In some embodiments, this may include a min max algorithm on the cosine distances between the input quaternions and a constant reference quaternion. The min max algorithm is an efficient stillness test over quaternions used to determine whether to accept or reject the past buffer's mean gaze, based on gaze variability. When the stillness test threshold is met (and the target length of accumulated history in the history buffer 1131), the gate is opened for quaternions to be used for gaze estimation at block 1103e

As noted above, the dot product of each pair of quaternions can be used in standardization. Additionally, the dot product is an inexpensive way to get at the cosine distance between unit quaternions for the purposes of thresholding on small motion before averaging. As long as the quaternions are unit quaternions (i.e., they have been normalized so that their magnitude is 1), then the dot product is equal to the cosine of half the angle between the two quaternions.

As shown in FIG. 11B, the IMUCenter estimator 1155 uses different buffer steps (i.e., overlap) when the head is stable as compared to when the head is moving. That is, when the head is moving, the buffer step is relatively small. As such, the counter is decremented by a smaller number of samples (imu_target_fail_window_overlap_length_samples) when trying to get a fix on gaze direction. Conversely, when the head is stable, the buffer step is relatively large (imu_target_sucess_window_overlap_length_samples).

At block 1105, the quaternions passing the gate at block 1103e are added to an empty history stack at block 1105. Then at block 1105f, the quaternions are averaged using an averaging algorithm (e.g., summing followed by normalization, as the quaternions are already standardized). During averaging, the quaternions continue to be tested for stillness at block 1103g. When a large change is detected, the history stack is cleared so that the averaging can start anew.

While example gaze estimation has been illustrated using averaging of quaternions with averaging, additional examples of the IMUCenter estimator 1155 may implement alternative gaze estimation algorithms using quaternions or alternative coordinate systems.

Figure 11C:
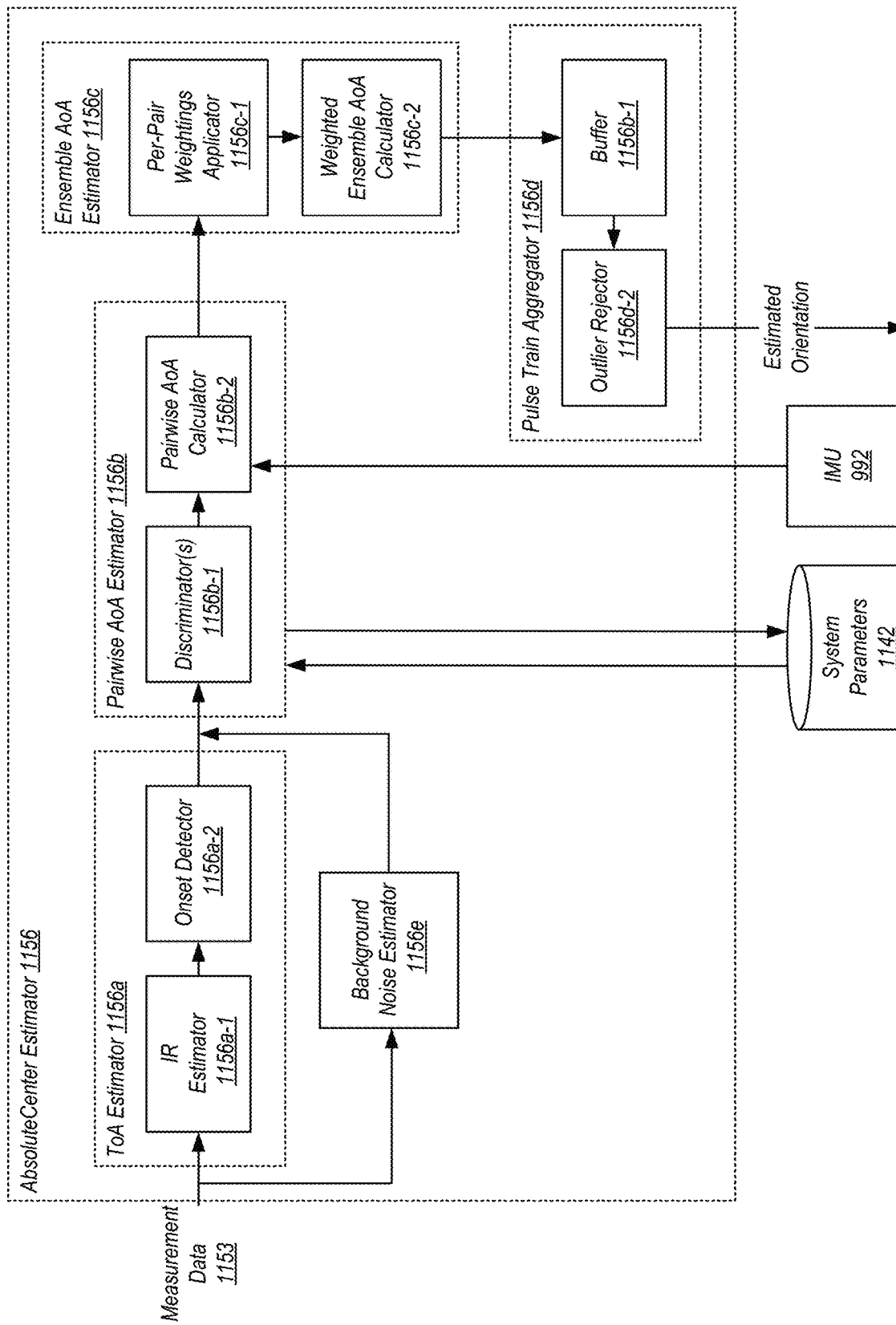

To provide additional illustration, FIG. 11C is a block diagram showing further example details of the AbsoluteCenter estimator 1156. The AbsoluteCenter estimator 1156 receives the measurement data 1153 originating from time-of-flight measurement captured via the microphones 922 (FIGS. 10A and 11A). In operation, the AbsoluteCenter estimator 1156 estimates angle-of-arrival (AoA) from the received measurement data 1153.

In this example, the measurement data is in the form of four-channel PCM (pulse-code modulated) audio. Each channel corresponds to a respective microphone 922. As such, this example assumes two microphones 922a on the first earcup and two microphones 922b on the second earcup. Other configurations of audio formats, channels, or number of microphones are possible as well.

The AbsoluteCenter estimator 1156 includes a ToA (time-of-arrival) estimator 1156a. The ToA estimator 1156a is configured to estimate time-of-arrival on a per-microphone basis. To this end, the ToA estimator 1156a includes an IR (impulse response) estimator 1156a-1 and an onset detector 1156a-2.

The IR estimator 1156a-1 is configured to estimate per-microphone impulse responses. Such estimation may involve applying a high-pass filter (such as a 4th order Butterworth filter at 18 kHz to filter out noise below the frequency of the ultrasonic or near-ultrasonic measurement signals. The IR estimator 1156a-1 may then (roughly) estimate the onset of the stimulus (i.e., the or near-ultrasonic measurement signals) in the time domain. The IR estimator 1156a-1 may then cross-correlate the measurement with the stimulus. Further, the IR estimator 1156a-1 then applies a transform (e.g, a Hilbert transform) and finds the magnitude.

The onset detector 1156a-2 is configured to more precisely detect the onset of the stimulus for each microphone channel. For each channel, this detection may involve finding the argmax of the cross-correlation (i.e., the points of the frequency domain at which the values are maximized). The onset detector 1156a-2 may then look backward in the data by some window (e.g., 25 ms), and then look forward from that point to the first sample exceeding the argmax $-12$ dB. The onset detector 1156a-2 then looks forward further in the data to find the maxima of the peak. After finding the peak, the onset detector 1156a-2 up-samples (e.g., 4×) around the peak to find the up-sampled maxima, which is considered the onset. After finding the onset, the onset detector 1156a-2 calculates the IR signal metrics around the onset, such as the RMS, leading energy, and leading edge derivative.

The IR signal metrics, along with an estimation of background noise from the background noise estimator 1156e, are provided to the pairwise AoA estimator 1156b. The pairwise AoA estimator 1156b is configured to produce AoA estimations on a per-microphone pair basis. Given four microphones, there are four microphones pairs and thus four pairwise estimations.

The pairwise AoA estimator 1156b includes one or more discriminators 1156b-1. The discriminator(s) 1156b-1 are configured to exclude certain measurements that are not expected to produce accurate gaze estimations. For instance, the discriminator(s) 1156b-1 may reject a measurement if the per-IR signal-to-noise ratio is below a threshold (indicating that the estimation may be affected by noise). As another example, the discriminator(s) 1156b-1 may reject if an inter-microphone amplitude difference is above an expected threshold (indicating that the user may have turned head too far or partially covered one of the microphones in the pair, among other conditions). Yet further, the discriminator(s) 1156b-1 may reject if a cross-correlation peak area ratio (e.g. the ratio between a peak height in the cross-correlation signal and the area under samples preceding the peak) is below a threshold. Other examples are possible as well.

After the discriminator(s) 1156b-1 are passed, the pairwise AoA calculator 1156b calculates time differences of arrival (TDoA) between each microphone pair. When TDoA is beyond a geometrical limit (according to the geometry of the wearable device 902), the calculation is rejected. If the TDoA is within the geometrical limit, the pairwise AoA calculator 1156b calculates the pairwise AoA based on each TDoA. System parameters, such as the microphone array geometry, may factor into this calculation, as this geometry changes the expected relative arrival times (and thus the resulting TDoA and pairwise AoA).

The per-pair AoAs are sent to an ensemble AoA estimator 1156c along with per-pair confidence metrics. The ensemble AoA estimator 1156c applies per-pair weightings based on the confidence metrics via a per-pair weightings applicator 1156c-1. A weighted ensemble AoA calculator 1156c-2 then calculates the weighted ensemble angle-of-arrival.

The AbsoluteCenter estimator 1156 also includes a pulse train aggregator 1156d. The pulse train aggregator 1156d includes a buffer 1156b-1. After being time-stamped, the weighted ensemble angle-of-arrival is stored in the buffer 1156-1. Within examples, the buffer 1156b-1 is a rolling buffer. Once the buffer 1156b-1 is full, the outlier rejector 1156d-2 rejects outliers in the estimates. Retained estimates are passed from the 1156b-1 as the estimated orientations.

Further to pulse train aggregation, the AbsoluteCenter estimator 1156 may process a train of pulses with a pre-known temporal structure. For example, there may be pulses transmitted with peaks at times: t, t-6 ms, t-9 ms, t-15 ms, and t-19 ms. The estimate of the true peak values calculated by the onset detector 1156-a2 may be further refined by minimizing the error between the detected onsets and therefore peaks of the received train, as compared to the sent pulse train, using an optimization routine.

Figure 11D:
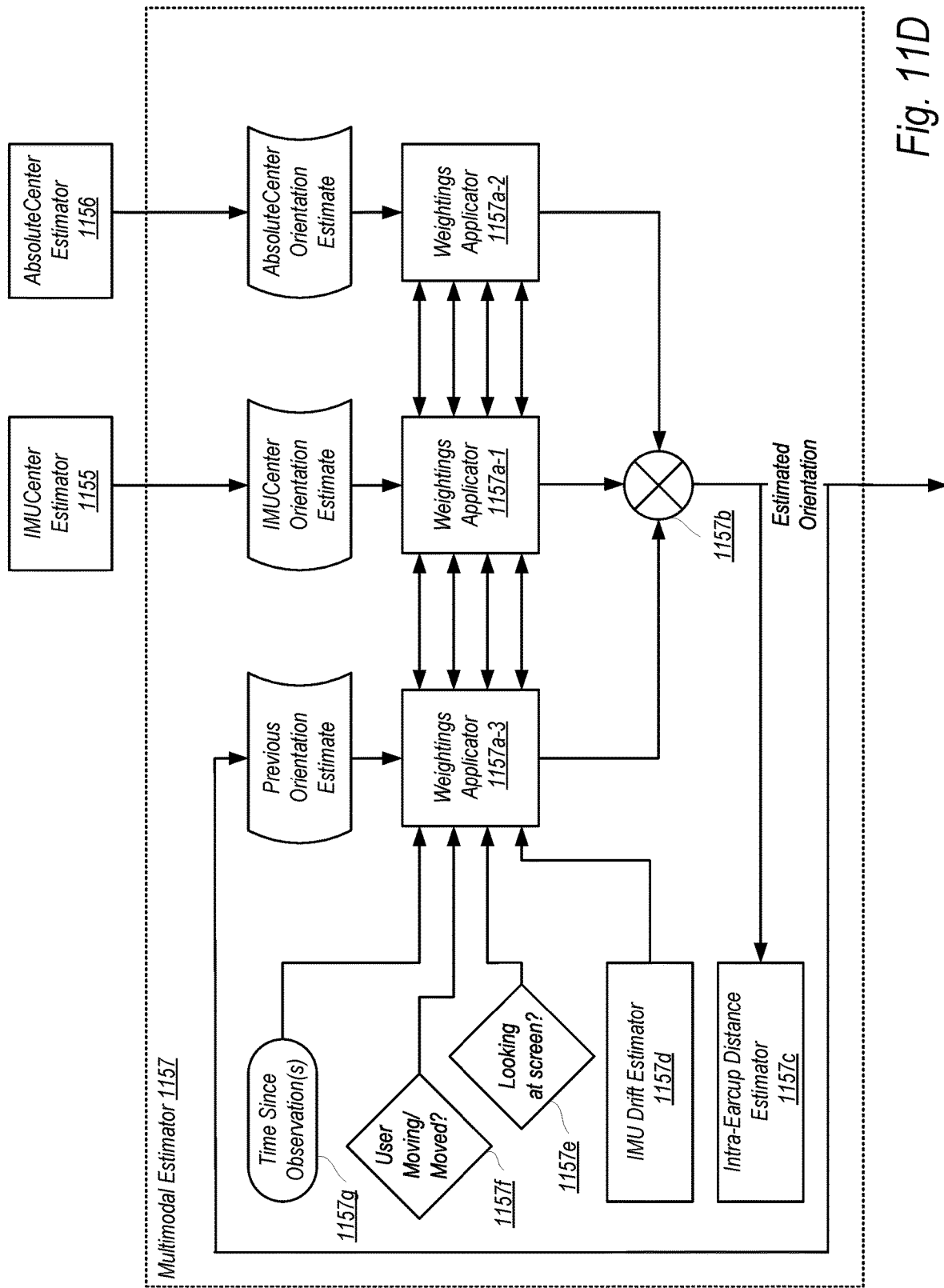

To provide further illustration, FIG. 11D is a block diagram showing additional example details of the multimodal estimator 1157. The multimodal estimator 1156 is configured to switch between the IMUCenter orientation estimate from the IMUCenter estimator 1155 and the AbsoluteCenter orientation estimate from the AbsoluteCenter estimator 1156 (with smooth interpolation between the two estimates). Switching is based on confidence in the respective measurements as well as on the motion states managed by the motion state manager 1123.

Primarily, confidence is based on the time since the last time-of-flight measurement (and accompanying orientation estimate from AbsoluteCenter estimator 1156). Given the high degree of accuracy produced by the AbsoluteCenter orientation estimate, a recent orientation estimate is a very high confidence estimate. This input is represented in FIG. 11D by block 1157g, which provides the time since last measurement to the weightings applicator 1157a-1, the weightings applicator 1157a-2, and the weightings applicator 1157a-3 (referred to collectively as the weightings applicators 1157a.

Within examples, switching between the IMUCenter orientation estimate from the IMUCenter estimator 1155 and the AbsoluteCenter orientation estimate from the AbsoluteCenter estimator 1156 can be performed by applying a 100% (i.e., full) weigh to one estimate or the other. For instance, to use the AbsoluteCenter orientation estimate, the weightings applicator 1157a-2 may apply a full weighting to the AbsoluteCenter orientation estimate from the AbsoluteCenter estimator 1156. Conversely, the weightings applicator 1157a-1 may apply no weight to the IMUCenter orientation estimate from the IMUCenter estimator 1155.

Further, the MultiModal estimator 1157 can also fuse the two estimates as a weighted sum based on confidence in the estimates. As shown in FIG. 11D, the output from the weightings applicators 1157 can be combined using a combination block 1157b. As noted above, confidence in the AbsoluteCenter estimate from the AbsoluteCenter estimator 1156 is highly influenced by the how recent the last time-of-flight measurement was performed, but other factors may be considered as well.

For instance, IMU drift may impact confidence in the IMUCenter orientation estimate. An IMU drift estimator 1157d may estimate IMU drift as a function of time since the last calibration. That is, after being zero'ed to a reference point, the IMU 992 will, over time, drift due to the accumulating effect of small errors in its measurements. As such, time since last calibration is indicative of the amount of IMU drift that can be expected.

As another example, whether (or not) the user is looking at the screen is indicative of confidence. As described above, the AbsoluteCenter estimate from the AbsoluteCenter estimator 1156 provides an estimate of the relative direction of the playback device 102b from the wearable device 902, which is used as a proxy for the location of the television. If it is determined as block 1157e that the user is looking in that direction based on the IMUCenter orientation estimate, there can be more confidence in the AbsoluteCenter estimate from the AbsoluteCenter estimator 1156.

In further examples, whether (or not) the user is moving or has moved since the last measurement is indicative of confidence, which is determined at block 1157f. A moving user indicates low confidence in both estimates. A user who has moved since the last estimate (either from IMUCenter estimator 1155 or the AbsoluteCenter estimator 1156) also indicates low confidence in that estimate.

The multimodal estimator 1157 can also estimate the distance between the microphones based on the estimated orientation. As shown in FIG. 11D, an inter-earcup distance estimator can estimate the inter-earcup distance (i.e., the distance between the microphone(s) 922a and the microphones 922(b) based on the estimated orientation from the multimodal estimator 1157. This estimator of inter-earcup distance can be fed back to the AbsoluteCenter estimator 1156 where it is used along with the current pitch estimate from the IMU 992 in calculating the pairwise AoA.

Figure 11E:
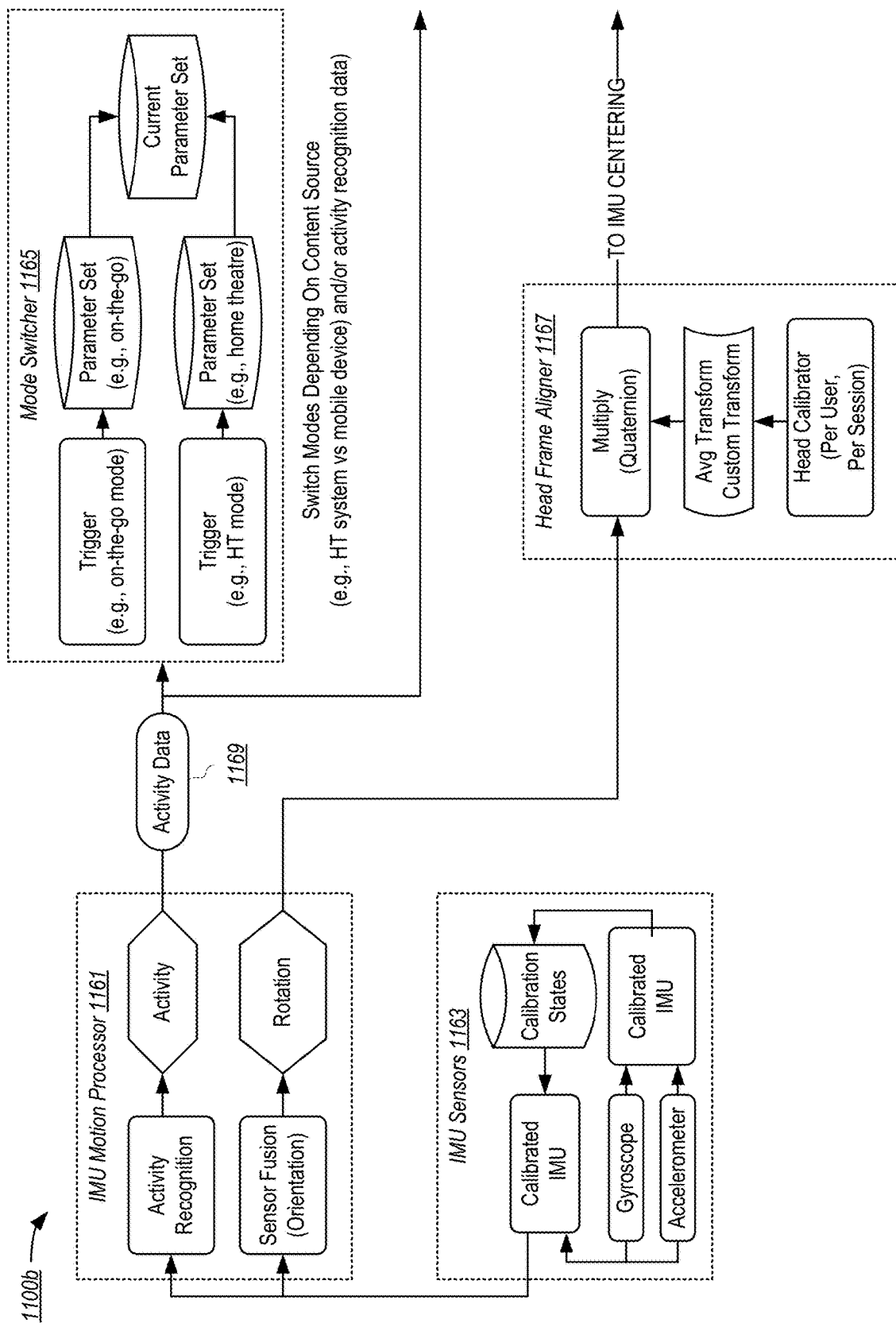
FIGS. 11E, 11F, and 11G are block diagrams showing respective portions of an example head tracker in accordance with aspects of the disclosed technology.
Figure 11F:
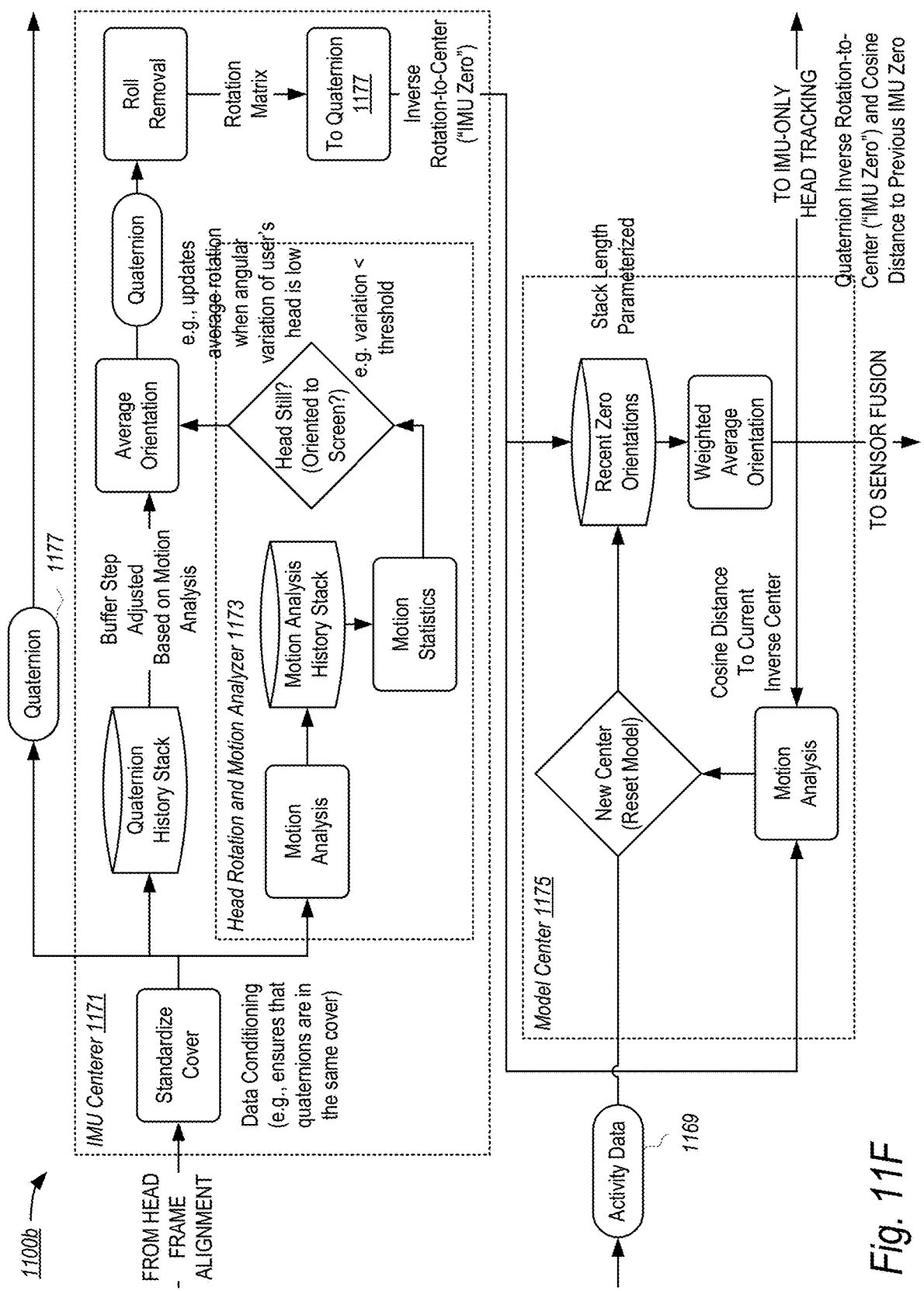
Figure 11G:
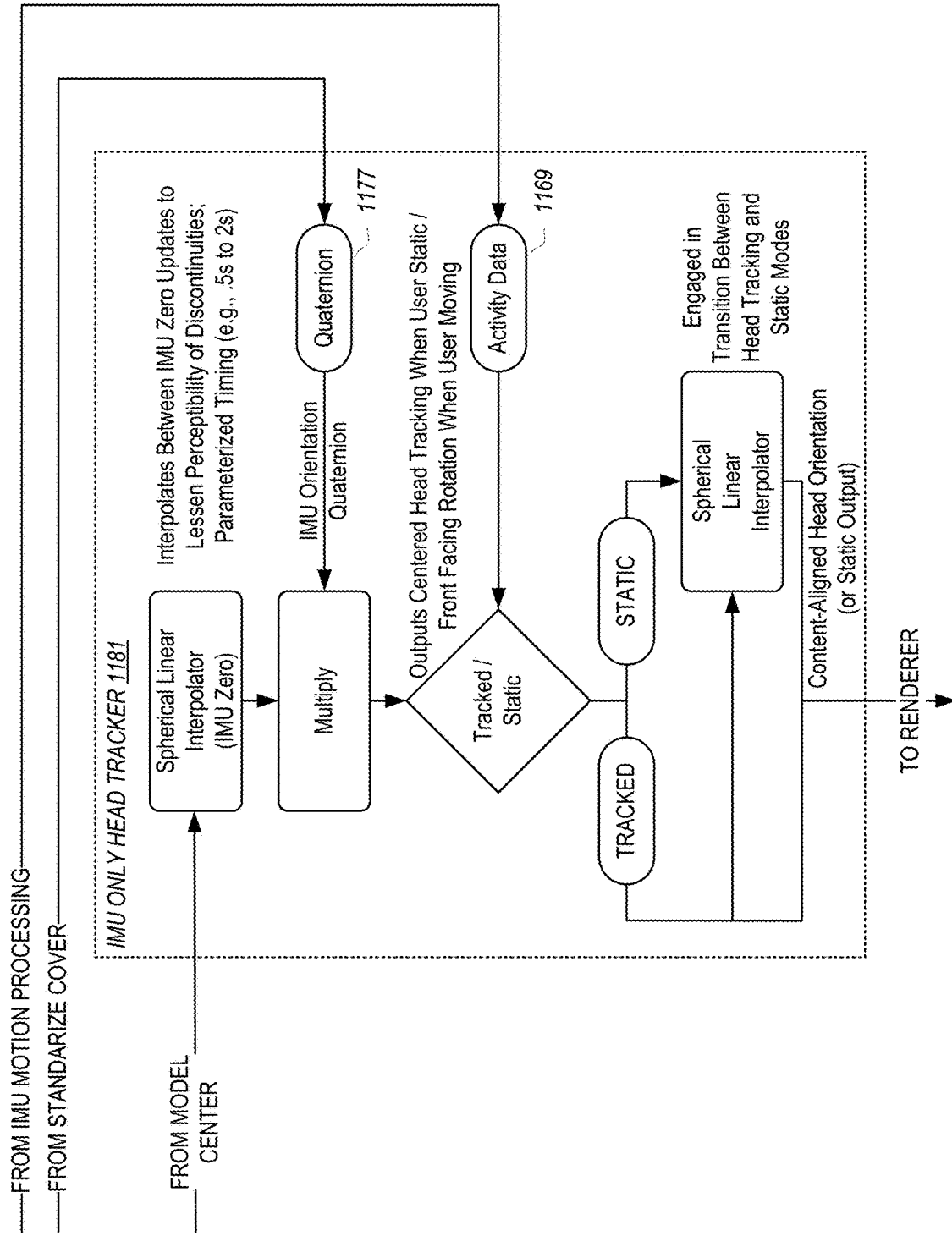

To provide further illustration of head tracking, FIGS. 11E, 11F, and 11G shows an example system 1100b to facilitate head tracking. In FIG. 11E, the model 1100b includes an IMU motion processor 1161, IMU sensors 1163, a mode switcher 1165, and a head frame aligner 1167. The IMU motion processor 1161 generates activity data 1169 from IMU data from the IMU sensors 1163. The mode switcher 1165 is configured to switch among a first mode (e.g., on-the-go) and a second mode (e.g., Home Theatre (HT) mode) based on the activity data 1169. The head frame aligner 1167 aligns IMU data to the user's head frame.

In FIG. 11F, the model 1100b includes an IMU centerer 1171 and a model center 1175. The IMU centerer 1171 produces standardized quaternions 1177. The IMU centerer 1171 also includes a head rotation and motion analyzer 1173. The IMU centerer 1171 sends rotation-to-center (re-zeroing) quaternions to the model center 1175.

In FIG. 11G, the system 1100b includes an IMU only head tracker 1181. The IMU only head tracker 1181 receives the activity data 1169 and the quaternions 1177 and the rotation-to-center (re-zeroing) quaternions from the model center 1175. The IMU only head tracker 1181 sends head tracking data to the renderer (e.g., the binaural renderer 990).

IV. Example Spatial Audio Techniques

Figure 12A:
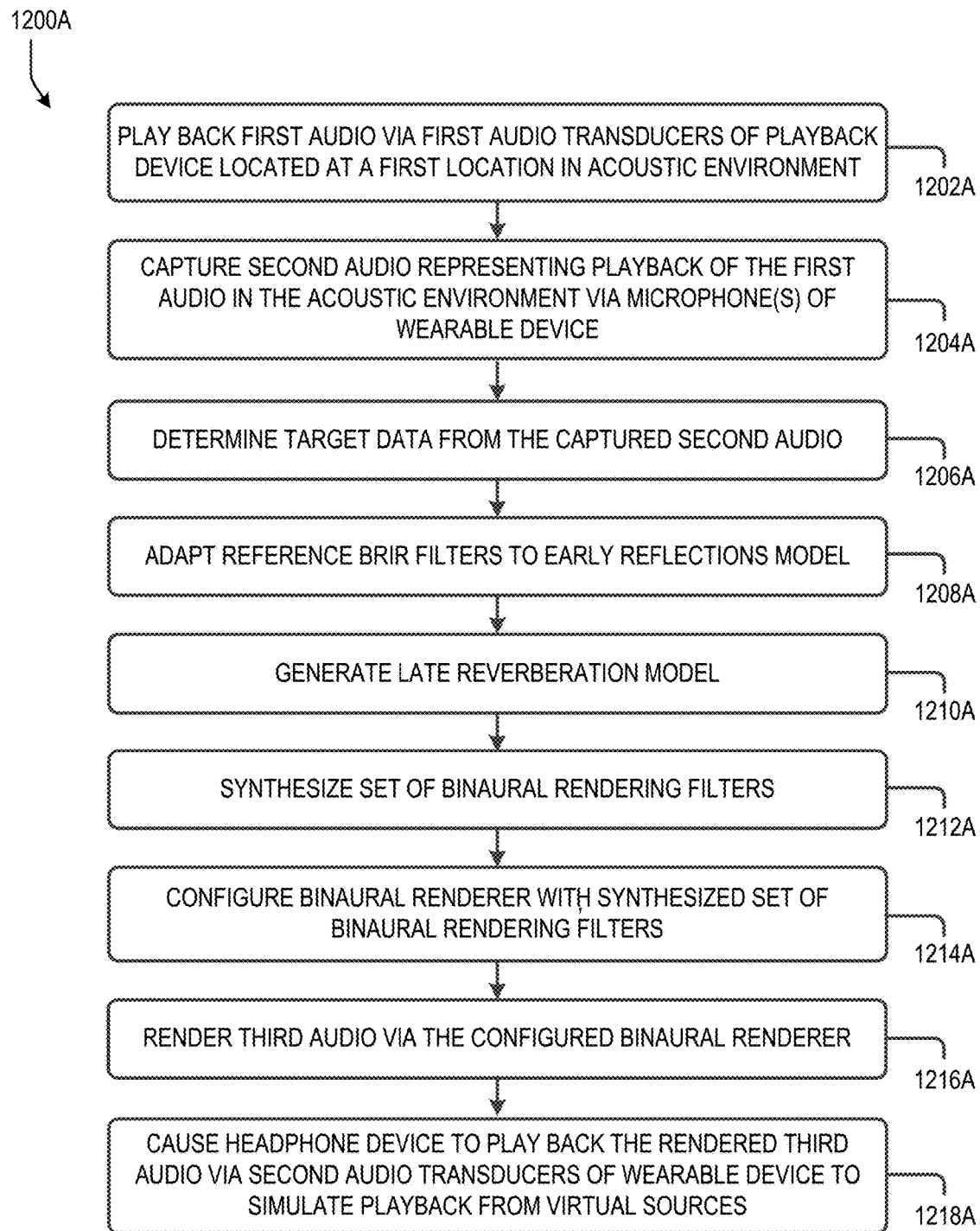
FIG. 12A is a flow diagram of an example method to facilitate binaural rendering in accordance with aspects of the disclosed technology.
Figure 12B:
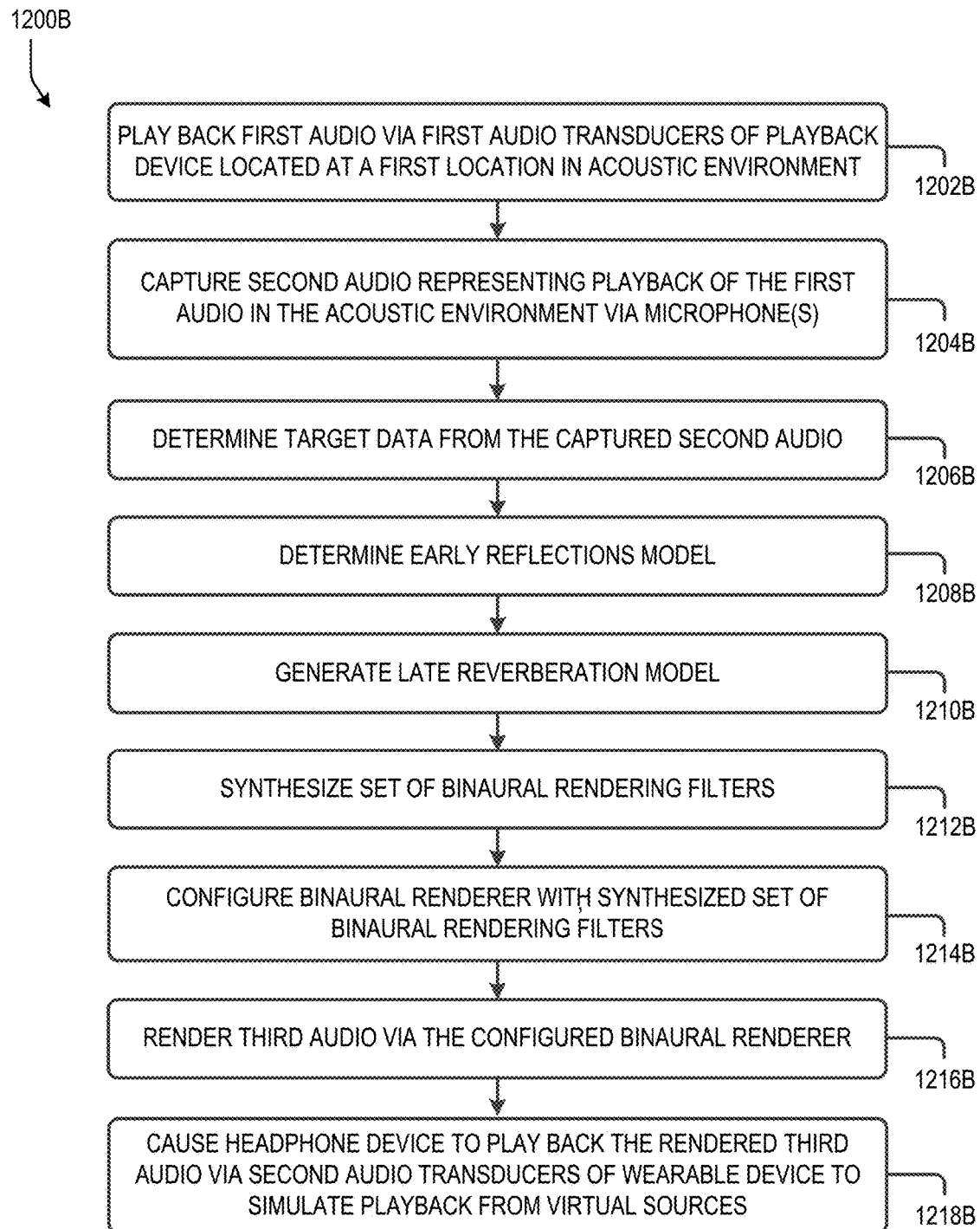
FIG. 12B is a flow diagram of an example method to facilitate binaural rendering in accordance with aspects of the disclosed technology.
Figure 12C:
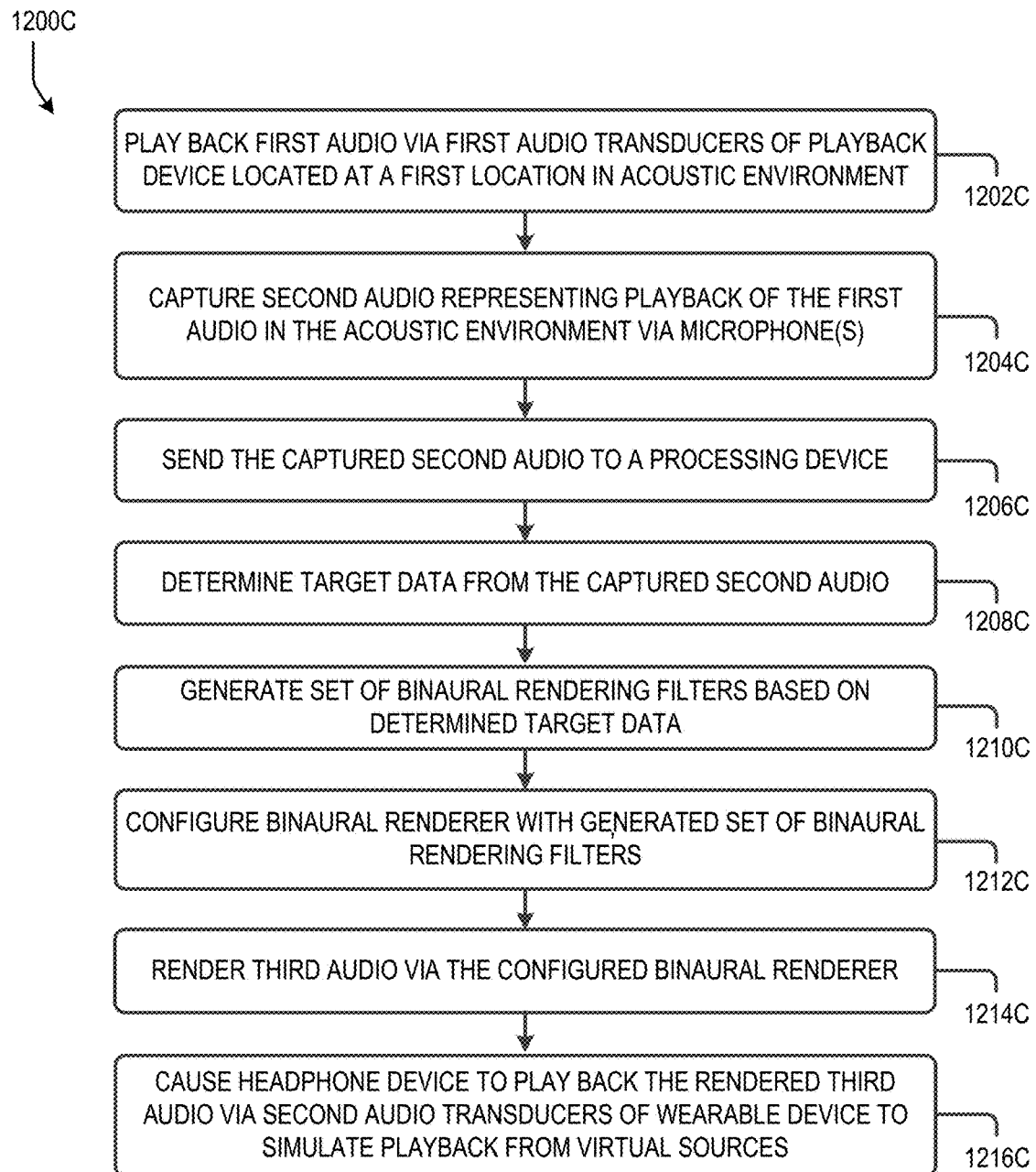
FIG. 12C is a flow diagram of an example method to facilitate binaural rendering in accordance with aspects of the disclosed technology.

FIGS. 12A, 12B, and 12C are flow diagrams showing an example method 1200A, an example method 1200B, and an example method 1200C (collectively referred to as the methods 1200) for binaural rendering in a media playback system. The methods 1200 may be performed by a playback device 102 (FIGS. 1A and 1B) and a headphone device 702 (FIG. 7), as well as a bonded zone of playback devices 102, or a group of playback devices 102. Alternatively, the methods 1200 may be performed by any suitable device or by a system of devices, such as any of the playback devices 102, NMDs 103, control devices 104, computing devices 105, and/or computing devices 106. For the purposes of illustration, the methods 1200 are described as being performed by a system 900a that includes the wearable device 902 and the playback device 102b (FIG. 9A) or a system 900b that includes the wearable device 902, the playback device 102b and the control device 103 (FIG. 9B). The system 900a and the system 900b are referred to collectively as the system 900.

At block 1202A, the method 1200A includes playing back first audio via first audio transducers of a playback device that is located at a first location in an acoustic environment. For instance, the playback device 102b may play back the first audio via the speakers 218 (FIG. 9A) in the den 101d from a first position near the television 744 (FIG. 7). The den 101d is one example of a listening environment from among many possible listening environments, such as any of the example rooms 101 or combinations thereof (e.g., when formed into groups), as well as other environments.

The first audio may include any suitable audio that includes content in each subband of a particular output frequency range (e.g., 20-20 kHz). Including such content in each subband facilitates determination of a room impulse response. In some examples, the first audio includes stimulus tones. Such tones may have a particular structure to aid processing, as discussed in connection with section III a. In other examples, the first audio is full-range music or home theatre audio, among other types of content that would typically include content in each subband of a particular output frequency range. Use of such content as the first audio may minimize impact of room adaptation on any users present, as the measurement is less or not noticeable when such content is used.

At block 1204A, the method 1200A includes capturing second audio representing playback of the first audio in the acoustic environment via one or more microphones of a wearable device. For instance, the wearable device 902 (FIG. 9A) may capture the second audio using the microphones 922 while the playback device 102b is playing back the first audio (FIG. 9A). Additionally or alternatively, one or more suitable devices equipped with microphones may capture the second audio. Examples of such suitable devices include the playback devices 102, the NMDS 103, and the control devices 104 (FIGS. 1A and 1B). For instance, the satellite playback devices 102*j* and 102*a* (FIG. 7) may capture the second audio.

Capturing the second audio may involve recording playback of the first audio with the microphones 922 and digitizing the recording as the second audio, among other functions that may be involved in capturing audio in a listening environment via microphones. Within examples, an audio processor may perform the capture, such as the audio processor 916 (FIG. 9A).

At block 1206A, the method 1200A includes determining target data from the captured second audio. For instance, the system 900 may determine the measured target IRs 853*a* and/or the target room parameters 853*b* of the target data 853 (FIG. 8C and FIG. 8G). Within examples, the system 900 may determine the target data 853 as described in connection with FIG. 8D. For instance, the pre-processor 861 may determine an impulse response, which is divided into IRs representing respective subbands by the filterbank 863. Further, the IR analyzer 865 may determine the target room parameters 853*b*, which may include parameters such as the early decay time, late reverberation time, mixing time spectral energy, and direct-to-early energy ratio, among other examples.

At block 1208A, the method 1200A includes adapting reference binaural rendering impulse response (BRIR) filters to an early reflections model. For example, the system 900 may implement the early filter adapter 854 (FIG. 8G), which in operation adapts an early BRIR set 851*b* of the reference data 851 using the target room parameters 853*b*, as described in connection with FIG. 8G. As further described in section III. b., the reference BRIR filters may be derived from one or more actual BRIR measurements in representative listening environments.

Further, in some examples, the early BRIR set 851*b* may include multiple reference BRIR filters. In such examples, the system 900 may select the reference binaural rendering impulse response filters to match the acoustic environment from among a plurality of filters representing different acoustic environments. Such matching may be based on a match of one or more room parameters corresponding to the early reflections portion, such as early decay time, among other examples.

At block 1210A, the method 1200A includes generating a late reverberation model. For instance, the system 900 may generate the late reverberation model using noise sequences as described in connection with FIG. 8H. Alternatively, the system 900 may generate the late reverberation model via a parametric reverberator as described in connection with FIG. 8-I, among other examples.

At block 1212A, the method 1200A includes synthesizing a set of binaural rendering filters. For example, the system 900 may implement the room adapter 850. As described in connection with FIGS. 8C and 8G, the room adapter 850 is configured to generate the rendering data 859, which includes the direct parameter set 859*a*, the early parameter set 859*b*, and the late parameter set 859*c*. Synthesizing the set of binaural rendering filters may include tuning the components to cooperate with one another as the rendering data 859 during binaural rendering. Examples of such tuning include the modifications performed by the early-late splicer 856, the direct-to-reverberation ratio adapter 857, and the normalizer 858. Additional and/or alternate tuning may be appropriate in various implementations.

At block 1214A, the method 1200A includes configuring a binaural renderer with the synthesized set of binaural rendering filters. For instance, the system 900 may configure the binaural renderer 990. Examples of configuring the binaural renderer 990 are described in connection with FIGS. 9A, 9B, 9C, and 9D.

At block 1216A, the method 1200A includes rendering third audio via the configured binaural renderer. For example, the binaural renderer 990 may render the input channels 995 into the third audio. Example rendering techniques are described in connection with FIGS. 9C and 9D. The binaural renderer 990 may configure the rendered third audio to simulate playback from virtual sources within the acoustic environment when played back via the headphone device. The virtual sources include a first virtual source at the first location (e.g., at or near the television) and one or more second virtual sources at respective second locations (e.g., at surround locations).

At block 1218A, the method 1200A includes causing the wearable device to play back the rendered third audio via second audio transducers of the wearable device to simulate playback from the virtual sources. For instance, the system 900 may cause the wearable device 902 to play back third audio rendered by the binaural renderer 990 via the speakers 918. Referring to the FIG. 7 example, as a result of the configuration of a binaural renderer and subsequent binaural rendering, third audio played back by the headphone device 702 would sound as it's coming from virtual sources within the listening environment (e.g., the playback device 102*b*, or the television 744 by proxy and co-location with the playback device 102*b* as well as one or more surround locations) rather than the audio transducers of the headphone device 702.

Turning now to FIG. 12B, at block 1202B, the method 1200B includes playing back first audio via first audio transducers of a playback device that is located at a first location in an acoustic environment. For instance, the playback device 102*b* may play back the first audio via the speakers 218 (FIG. 9A) in the den 101*d* from a first position near the television 744 (FIG. 7). The den 101*d* is one example of a listening environment from among many possible listening environments, such as any of the example rooms 101 or combinations thereof (e.g., when formed into groups), as well as other environments.

At block 1204B, the method 1200B includes capturing second audio representing playback of the first audio in the acoustic environment via one or more microphones. For instance, the wearable device 902 (FIG. 9A) may capture the second audio using the microphones 922 while the playback device 102*b* is playing back the first audio (FIG. 9A). Additionally or alternatively, one or more suitable devices equipped with microphones may capture the second audio. Examples of such suitable devices include the playback devices 102, the NMDS 103, and the control devices 104 (FIGS. 1A and 1B). For instance, the satellite playback devices 102*j* and 102*a* (FIG. 7) may capture the second audio.

Capturing the second audio may involve recording playback of the first audio with the microphones 922 and digitizing the recording as the second audio, among other functions that may be involved in capturing audio in a listening environment via microphones. Within examples, an audio processor may perform the capture, such as the audio processor 916 (FIG. 9A).

At block 1206B, the method 1200B includes determining target data from the captured second audio. For instance, the system 900 may determine the measured target IRs 853*a* and/or the target room parameters 853*b* of the target data 853 (FIG. 8C and FIG. 8G). Within examples, the system

900 may determine the target data 853 as described in connection with FIG. 8D. For instance, the pre-processor 861 may determine an impulse response, which is divided into IRs representing respective subbands by the filterbank 863. Further, the IR analyzer 865 may determine the target room parameters 853b, which may include parameters such as the early decay time, late reverberation time, mixing time spectral energy, and direct-to-early energy ratio, among other examples.

At block 1208B, the method 1200B includes determining an early reflections model. Determining the early reflections model may involve adapting reference data to an early reflections model. For example, the system 900 may implement the early filter adapter 854 (FIG. 8G), which in operation adapts an early BRIR set 851b of the reference data 851 using the target room parameters 853b, as described in connection with FIG. 8G. As further described in section III. b., the reference BRIR filters may be derived from one or more actual BRIR measurements in representative listening environments.

Further, in some examples, the early BRIR set 851b may include multiple reference BRIR filters. In such examples, the system 900 may select the reference binaural rendering impulse response filters to match the acoustic environment from among a plurality of filters representing different acoustic environments. Such matching may be based on a match of one or more room parameters corresponding to the early reflections portion, such as early decay time, among other examples.

At block 1210B, the method 1200B includes generating a late reverberation model. In some examples, generating the late reverberation model involves shaping noise sequences. For instance, the system 900 may generate the late reverberation model using shaped noise sequences as described in connection with FIG. 8H. In other examples, generating the late reverberation model involves tuning a parametric reverberator to generate signals representing the late reverberation. For example, the system 900 may generate the late reverberation model via a parametric reverberator as described in connection with FIG. 8-I, among other examples.

At block 1212B, the method 1200B includes synthesizing a set of binaural rendering filters. For example, the system 900 may implement the room adapter 850. As described in connection with FIGS. 8C and 8G, the room adapter 850 is configured to generate the rendering data 859, which includes the direct parameter set 859a, the early parameter set 859b, and the late parameter set 859c. Synthesizing the set of binaural rendering filters may include tuning the components to cooperate with one another as the rendering data 859 during binaural rendering. Examples of such tuning include the modifications performed by the early-late splicer 856, the direct-to-reverberation ratio adapter 857, and the normalizer 858. Additional and/or alternate tuning may be appropriate in various implementations.

At block 1214B, the method 1200B includes configuring a binaural renderer with the synthesized set of binaural rendering filters. For instance, the system 900 may configure the binaural renderer 990. Examples of configuring the binaural renderer 990 are described in connection with FIGS. 9A, 9B, 9C, and 9D.

At block 1216B, the method 1200B includes rendering third audio via the configured binaural renderer. For example, the binaural renderer 990 may render the input channels 995 into the third audio. Example rendering techniques are described in connection with FIGS. 9C and 9D. The binaural renderer 990 may configure the rendered third audio to simulate playback from virtual sources within the acoustic environment when played back via the headphone device. The virtual sources include a first virtual source at the first location (e.g., at or near the television) and one or more second virtual sources at respective second locations (e.g., at surround locations).

At block 1218B, the method 1200B includes causing the wearable device to play back the rendered third audio via second audio transducers of the wearable device to simulate playback from the virtual sources. For instance, the system 900 may cause the wearable device 902 to play back third audio rendered by the binaural renderer 990 via the speakers 918. Referring to the FIG. 7 example, as a result of the configuration of a binaural renderer and subsequent binaural rendering, third audio played back by the headphone device 702 would sound as it's coming from virtual sources within the listening environment (e.g., the playback device 102b, or the television 744 by proxy and co-location with the playback device 102b as well as one or more surround locations) rather than the audio transducers of the headphone device 702.

Turning now to FIG. 12C, at block 1202C, the method 1200C includes playing back first audio via first audio transducers of a playback device that is located at a first location in an acoustic environment. For instance, the playback device 102b may play back the first audio via the speakers 218 (FIG. 9A) in the den 101d from a first position near the television 744 (FIG. 7). The den 101d is one example of a listening environment from among many possible listening environments, such as any of the example rooms 101 or combinations thereof (e.g., when formed into groups), as well as other environments.

At block 1204C, the method 1200C includes capturing second audio representing playback of the first audio in the acoustic environment via one or more microphones. For instance, the wearable device 902 (FIG. 9A) may capture the second audio using the microphones 922 while the playback device 102b is playing back the first audio (FIG. 9A). Additionally or alternatively, one or more suitable devices equipped with microphones may capture the second audio. Examples of such suitable devices include the playback devices 102, the NMDS 103, and the control devices 104 (FIGS. 1A and 1B). For instance, the satellite playback devices 102j and 102a (FIG. 7) may capture the second audio.

Capturing the second audio may involve recording playback of the first audio with the microphones 922 and digitizing the recording as the second audio, among other functions that may be involved in capturing audio in a listening environment via microphones. Within examples, an audio processor may perform the capture, such as the audio processor 916 (FIG. 9A).

At block 1206C, the method 1200C includes sending the captured second audio to a processing device. For example, the wearable device 902 may send the captured second audio to the control device 104, as described in connection with FIG. 9B. As further described in connection with that example, the system 900 may utilize any suitable device as the processing device, such as the example devices in the media playback system 100 (FIGS. 1A and 1B). In other examples, the second audio may be captured by a device other than the control device 104, or by multiple devices, in which case the device(s) may send the captured second audio to one or more processing devices.

At block 1208C, the method 1200C includes determining target data from the captured second audio. For instance, a processing device (e.g., the control device 104) may determine the measured target IRs 853a and/or the target room parameters 853b of the target data 853 (FIG. 8C and FIG. 8G). Within examples, the processing device may determine the target data 853 as described in connection with FIG. 8D. For instance, the pre-processor 861 may determine an impulse response, which is divided into IRs representing respective subbands by the filterbank 863. Further, the IR analyzer 865 may determine the target room parameters 853b, which may include parameters such as the early decay time, late reverberation time, mixing time spectral energy, and direct-to-early energy ratio, among other examples.

At block 1210C, the method 1200C includes generating a set of binaural rendering filters based on the determined target data. For instance, the system 900 may generate a set of binaural rendering filters using the reference data 851 and the target data 853 as described in connection with FIGS. 8C-8I.

Within examples, generating the set of binaural rendering filters may involve adapting reference binaural rendering impulse response (BRIR) filters to an early reflections model. For example, the processing device may implement the early filter adapter 854 (FIG. 8G), which in operation adapts an early BRIR set 851b of the reference data 851 using the target room parameters 853b, as described in connection with FIG. 8G. As further described in section III. b., the reference BRIR filters may be derived from one or more actual BRIR measurements in representative listening environments.

Further, in some examples, the early BRIR set 851b may include multiple reference BRIR filters. In such examples, the system 900 may select the reference binaural rendering impulse response filters to match the acoustic environment from among a plurality of filters representing different acoustic environments. Such matching may be based on a match of one or more room parameters corresponding to the early reflections portion, such as early decay time, among other examples.

Generating the set of binaural rendering filters may involve generating a late reverberation model. For instance, the processing device may generate the late reverberation model using noise sequences as described in connection with FIG. 8H. Alternatively, the system 900 may generate the late reverberation model via a parametric reverberator as described in connection with FIG. 8-I, among other examples.

Generating the set of binaural rendering filters may involve synthesizing a set of binaural rendering filters. For example, the system 900 may implement the room adapter 850. As described in connection with FIGS. 8C and 8G, the room adapter 850 is configured to generate the rendering data 859, which includes the direct parameter set 859a, the early parameter set 859b, and the late parameter set 859c. Synthesizing the set of binaural rendering filters may include tuning the components to cooperate with one another as the rendering data 859 during binaural rendering. Examples of such tuning include the modifications performed by the early-late splicer 856, the direct-to-reverberation ratio adapter 857, and the normalizer 858. Additional and/or alternate tuning may be appropriate in various implementations.

At block 1212C, the method 1200C includes configuring a binaural renderer with the synthesized set of binaural rendering filters. For instance, the system 900 may configure the binaural renderer 990. Examples of configuring the binaural renderer 990 are described in connection with FIGS. 9A, 9B, 9C, and 9D.

At block 1214C, the method 1200C includes rendering third audio via the configured binaural renderer. For example, the binaural renderer 990 may render the input channels 995 into the third audio. Example rendering techniques are described in connection with FIGS. 9C and 9D. The binaural renderer 990 may configure the rendered third audio to simulate playback from virtual sources within the acoustic environment when played back via the headphone device. The virtual sources include a first virtual source at the first location (e.g., at or near the television) and one or more second virtual sources at respective second locations (e.g., at surround locations).

At block 1216C, the method 1200C includes causing the wearable device to play back the rendered third audio via second audio transducers of the wearable device to simulate playback from the virtual sources. For instance, the system 900 may cause the wearable device 902 to play back third audio rendered by the binaural renderer 990 via the speakers 918. Referring to the FIG. 7 example, as a result of the configuration of a binaural renderer and subsequent binaural rendering, third audio played back by the headphone device 702 would sound as it's coming from virtual sources within the listening environment (e.g., the playback device 102b, or the television 744 by proxy and co-location with the playback device 102b as well as one or more surround locations) rather than the audio transducers of the headphone device 702.

At block 1216C, the method 1200C includes causing the wearable device to play back the rendered third audio via second audio transducers of the wearable device to simulate playback from the virtual sources. For instance, the system 900 may cause the wearable device 902 to play back third audio rendered by the binaural renderer 990 via the speakers 918. Referring to the FIG. 7 example, as a result of the configuration of a binaural renderer and subsequent binaural rendering, third audio played back by the headphone device 702 would sound as it's coming from virtual sources within the listening environment (e.g., the playback device 102b, or the television 744 by proxy and co-location with the playback device 102b as well as one or more surround locations) rather than the audio transducers of the headphone device 702.

V. Example Head Tracking Techniques

Figure 13A:
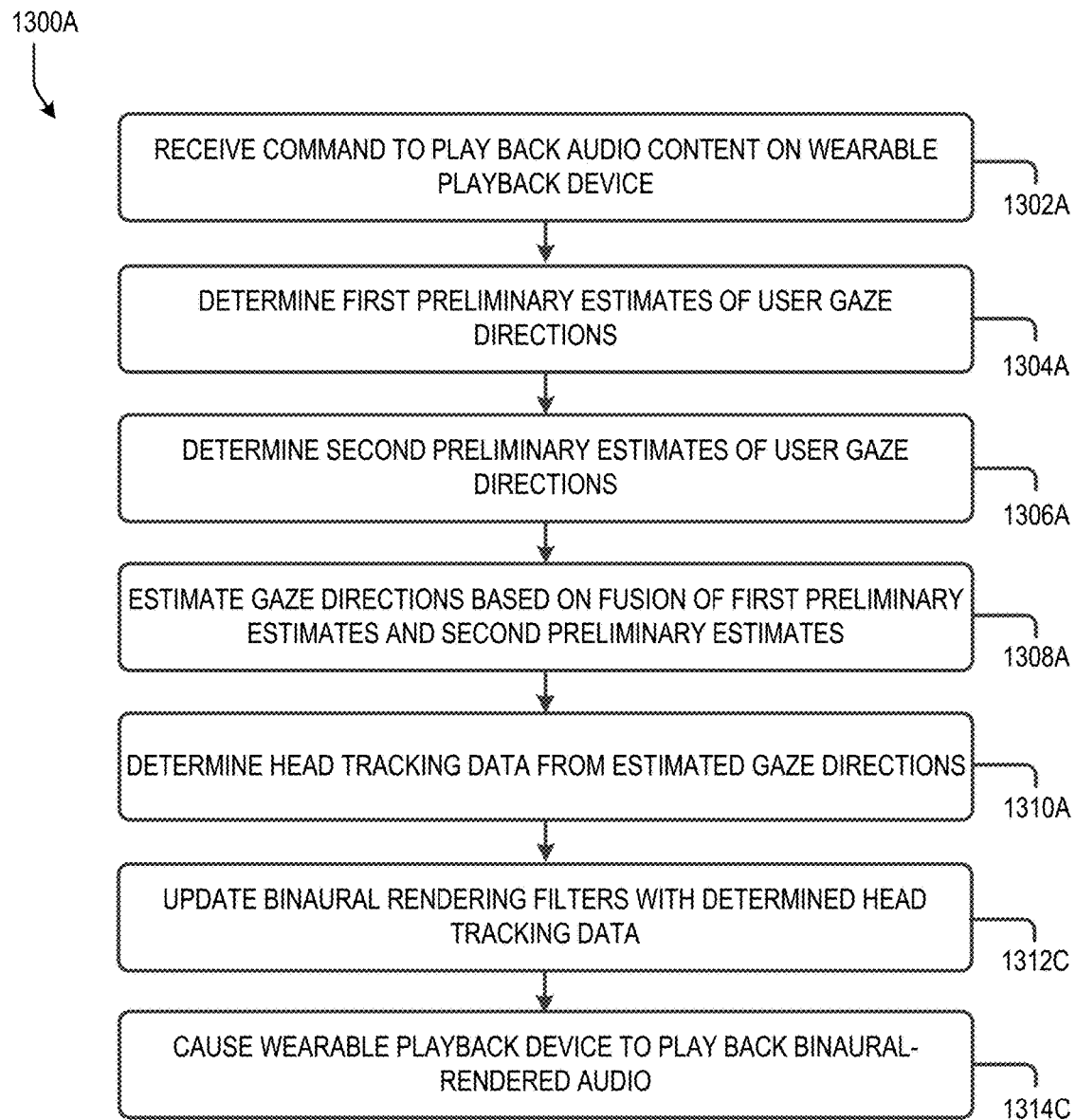
FIG. 13A is a flow diagram of an example method to facilitate head tracking in accordance with aspects of the disclosed technology.
Figure 13B:
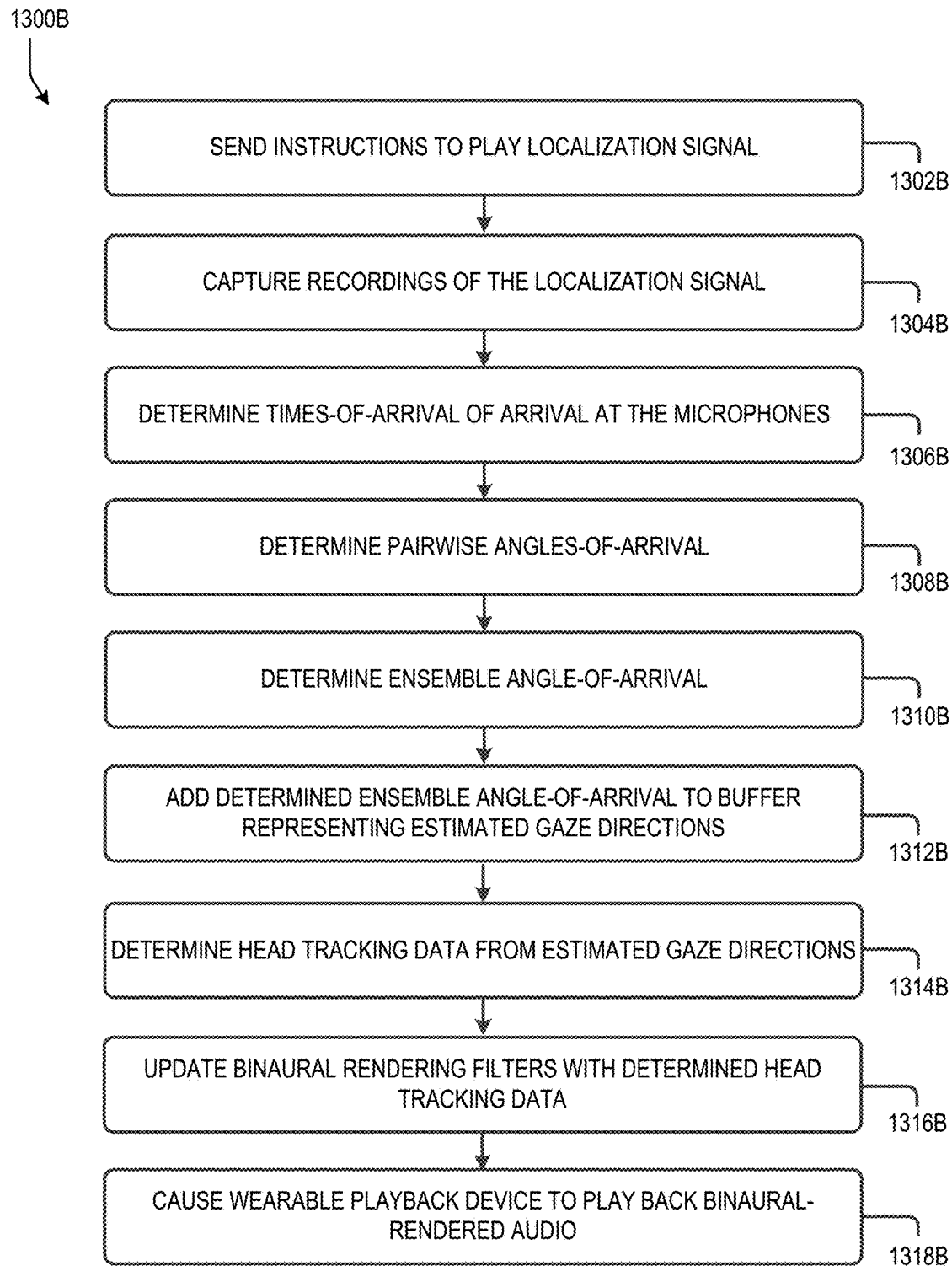
FIG. 13B is a flow diagram of an example method to facilitate spatial audio head tracking in accordance with aspects of the disclosed technology.

FIGS. 13A and 13B are flow diagrams showing an example method 1300A and an example method 1300B, respectively, (collectively referred to as the methods 1300) for head tracking in a media playback system. The methods 1300 may be performed by a playback device 102 (FIGS. 1A and 1B) and a headphone device 702 (FIG. 7), as well as a bonded zone of playback devices 102, or a group of playback devices 102. Alternatively, the methods 1300 may be performed by any suitable device or by a system of devices, such as any of the playback devices 102, NMDs 103, control devices 104, computing devices 105, and/or computing devices 106. For the purposes of illustration, the methods 1300 are described as being performed by the system 900 (FIGS. 9A and 9B) including the wearable device 902 and the playback device 102b.

Figure 14A:
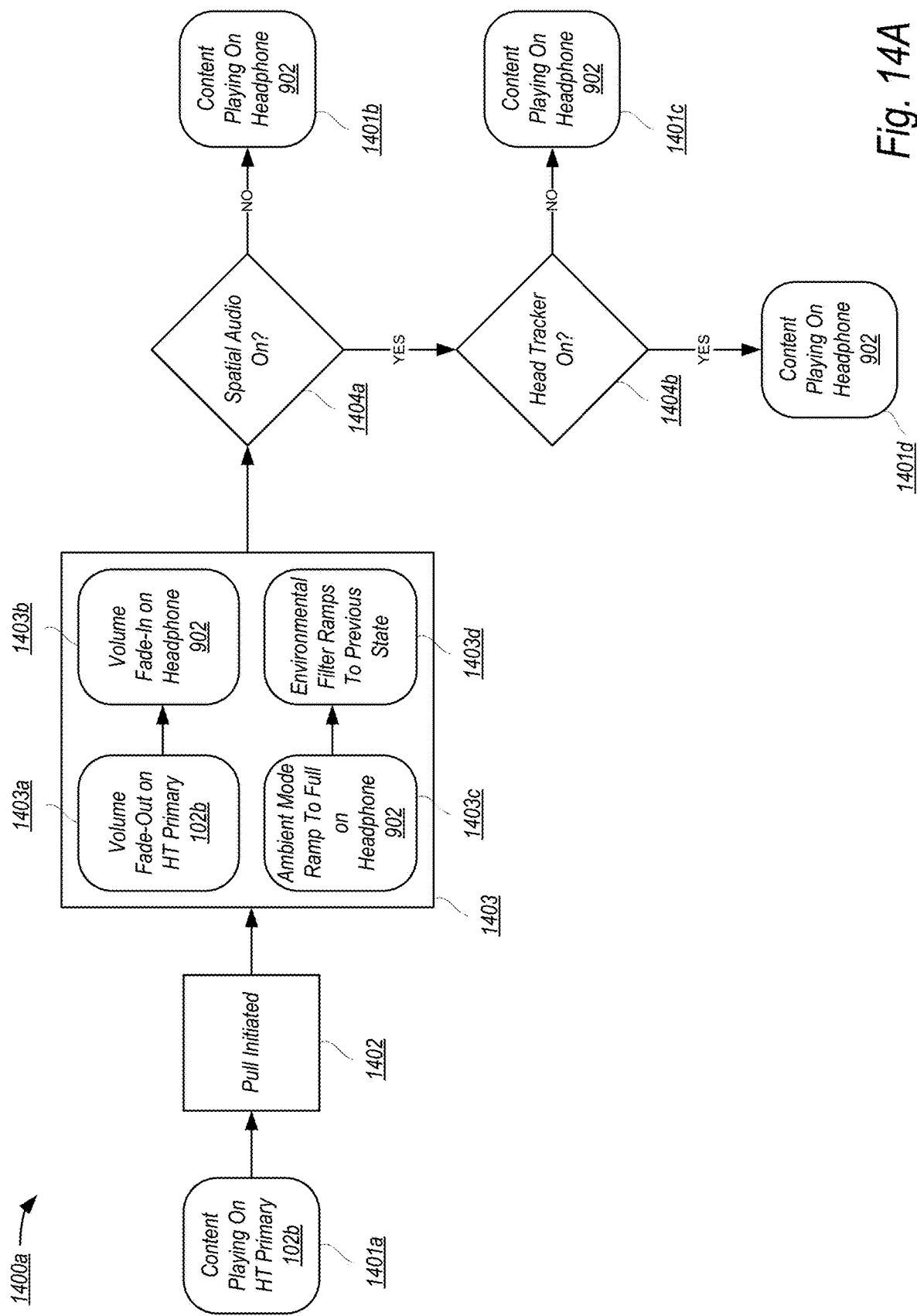
FIGS. 14A, 14B, 14C, and 14D are block diagrams illustrating example spatial audio interactions in accordance with aspects of the disclosed technology.

At block 1302A, the method 1300A includes receiving a command to play back audio on a wearable playback device. For instance, as shown in FIG. 14A, the system 900 may receive a pull command to initiate playback of spatial audio on a wearable device 902 (block 1402). As another example, the system 900 may receive a command to initiate playback of audio from a control device 104, such as the control device 104a (FIG. 1A). Other examples are possible as well.

At block 1304A, the method 1300a includes determining first preliminary estimates of a user gaze direction. For example, a first gaze direction estimator, such as the AbsoluteCenter estimator 1156 (FIGS. 11A and 11C) may determine estimates of user gaze direction. As described previously in connection with the example AbsoluteCenter estimator 1156, the estimates of user gaze direction may be based on one or more time-of-flight measurements of at least one signal propagating from a non-wearable playback device (e.g., the playback device 102b in FIG. 10A) at a first location in a listening environment (e.g., the den 101d) to the wearable playback device (e.g., the wearable device 902) at a second location in the listening environment.

Within examples, the time-of-flight measurements may involve capturing the propagating signals using one or more sensors after the wearable playback device is donned by a user. For example, the wearable playback device 902 may capture an ultrasonic (or near ultrasonic) signal emitted by the speaker(s) 218 of the playback device 102b. The wearable playback device 902 may capture such signals via at least one first microphone (e.g., the microphones 922a in FIG. 10A) and at least one second microphone (e.g., the microphones 922b in FIG. 10A).

As discussed in connection with FIG. 11C, determining the estimates of user gaze direction may involve estimating per-microphone times-of-arrival at the at least one first microphone and the at least one second microphone, as discussed in connection with the ToA estimator 1156a. Further, such determination may involve estimating pairwise angle-of-arrivals from the estimated times-of-arrival, as described in connection with the pairwise AoA estimator 1156. Yet further, such determination may also include calculating the first preliminary estimates from the estimated pairwise angle-of-arrivals, as illustrated in connection with the ensemble AoA estimator and/or the pulse train aggregator 1156d.

At block 1306A, the method 1300a includes determining second preliminary estimates of user gaze direction. For instance, a second gaze direction estimator, such as the IMUCenter estimator 1157 (FIGS. 11A and 11B) may determine estimates of user gaze direction. As described previously in connection with the example IMUCenter estimator 1155, the estimates of user gaze direction may be based on samples from an inertial measurement unit (IMU), such as the IMU 992 (FIG. 11A).

As described in connection with the example IMUCenter estimator 1155 illustrated in FIG. 11B, determining the second preliminary estimates of user gaze direction may involve receiving quaternion samples from the IMU, standardizing the quaternion samples, and averaging the standardized quaternion samples. Other aspects of the IMUCenter estimator 1155 may be involved as well.

At block 1308A, the method 1300a includes estimating gaze directions based on fusion of the first gaze direction estimates and the second preliminary estimates. For example, a third gaze direction estimator, such as the multimodal estimator 1157 (FIGS. 11A and 11D), may fuse estimates from the IMUCenter estimator 1155 and the AbsoluteCenter estimator 1156. Within alternative examples, fusing such estimates may involve selecting among the available estimates, or combining the estimates after applying weighting, as described in connection with FIG. 11D, among other examples of combining estimates.

For instance, estimating the gaze directions may involve selecting, based on at least one confidence metric, the estimated gaze directions from among (a) the first preliminary gaze estimates and (b) the second preliminary gaze estimates. The confidence metric may include a length of time elapsed since a previous time of flight measurement (i.e., a measure of how stale the most current measurement is). In such examples, selecting the estimated gaze directions may involve selecting the first preliminary gaze estimates as the estimated gaze directions when the length of time elapsed since the previous time of flight measurement is less than a threshold. Conversely, when the length of time elapsed since the previous time of flight measurement is greater than the threshold, the second preliminary gaze estimates are selected as the estimated gaze directions.

In further examples, estimating the gaze directions may involve applying weightings to at least one of the first preliminary gaze estimates and the second preliminary gaze estimates based on at least one confidence metric. Example confidence metrics and weightings are described in connection with FIG. 11D. The multimodal estimator may then combine the weighted first preliminary gaze estimates and the second preliminary gaze estimates into the estimated gaze directions.

By way of example, the at least one confidence metric may include a length of time elapsed since a previous time of flight measurement. In such examples, applying the weightings may involve applying a relatively higher weighting to the first preliminary gaze estimates than the second preliminary gaze estimates when the length of time elapsed since the previous time of flight measurement is less than a threshold length of time. Then, when the length of time elapsed since the previous time of flight measurement is less than a threshold length of time, a relatively lower weighting to the first preliminary gaze estimates than the second preliminary gaze estimates is applied.

In an additional example, the at least one confidence metric may include a condition that the user has moved since a previous time of flight measurement. Here, applying the weightings may involve applying a relatively lower weighting to the first preliminary gaze estimates than the second preliminary gaze estimates when the condition that the user has moved since the previous time of flight measurement is present. Conversely, a relatively higher weighting is applied to the first preliminary gaze estimates than the second preliminary gaze estimates when the condition that the user has moved since the previous time of flight measurement is not present.

In a further example, the at least one confidence metric may include an IMU drift estimate. Among such examples, applying the weightings may involve applying a relatively lower weighting to the second preliminary gaze estimates than the first preliminary gaze estimates when the IMU drift estimate is greater than an IMU drift threshold. Then, when the IMU drift estimate is less than the IMU drift threshold, a relatively higher weighting is applied to the second preliminary gaze estimates than the first preliminary gaze estimates.

At block 1310A, the method 1300A includes determining head tracking data from the estimated gaze directions. For example, the corrector 1158 may rotate incoming IMU samples from the IMU 992 to a reference frame centered on the current estimated gaze direction. This operation yields head tracking data centered on the playback device 102b, which is used a proxy for the location of the television 1044 (FIG. 10A). As such, when spatial audio is rendered using such head tracking data, the sound appears to come from a virtual source at the location of the playback device 102b (as well as possibly additional virtual sources in the listening environment, such as the locations of the playback device 102a and the playback device 102j in the den 101d' (FIG. 10A).

At block 1312A, the method 1300A includes updating binaural rendering filters with the determined head tracking data. For instance, the system 900 may update filters (e.g., the rendering data 859) used by the binaural renderer 990, as described in connection with FIGS. 9C and 9D. The head tracking data may be repeatedly updated as new IMU samples are available. The binaural rendering filters may also be updated as well so as to keep the filters up to date with user head position centered on the reference frame.

At block 1314A, the method 1300A includes causing the wearable playback device to play back the binaural-rendered audio. For instance, the playback device 102b may send a data stream representing the binaural-rendered audio to the wearable playback device 902 (perhaps with instructions), which causes the wearable playback device 902 to play back the binaural-rendered audio. Given the input from the head tracking data, as the user moves their head, the binaural-rendered audio remains centered to the external reference frame (e.g., the virtual source at the location of the playback device 102b).

Turning now to FIG. 13B, at block 1302B, the method 1300B includes sending instructions to play a localization signal. For example, the wearable playback device 902 (FIG. 10A) may send the instructions to play a localization signal to the playback device 102b, as described in connection with FIG. 11A. The wearable playback device may send the instructions via a wireless network interface, such as an 802.11 (Wi-Fi®) or 802.15 (Bluetooth) compatible network interface, among other examples. The playback device 102b may play the localization signal while at at a first location in a listening environment, such as the location of the playback device 102b in the den 101d' (FIG. 10A).

Within examples, the wearable playback device may send the instructions to play a localization signal to the playback device 102b based on detection of a trigger. As illustrated in FIG. 11A, example triggers include detecting that a threshold period of time has elapsed since user gaze direction was last estimated (e.g., expiration of a polling period) and detecting that the user has changed position. Other example triggers may cause sending of the instructions as well.

At block 1304B, the method 1300B includes capturing recordings of the localization signal. For instance, the wearable playback device 902 may capture recordings of an ultrasonic or near-ultrasonic signal using the microphones 922. As shown in FIG. 10A, the microphones 922 may include first microphones carried on a first earcup (e.g., the microphones 922a) and second microphones carried on a second earcup (e.g., the microphones 922b). The wearable playback device 902 may capture the recordings while the wearable playback device 902 is donned by a user at a second location in the listening environment, such as the location of the wearable device 902 in the den 101d' when worn by the user 1045.

At block 1306B, the method 1300B includes determining times-of-arrival of the localization signal at the microphones. For example, the ToA estimator 1156a may determine respective times-of-arrival of the localization signal at the microphones 922 (FIG. 11C). Determining the respective times-of-arrival may involve estimating impulse responses for each recording of the localization signal, as described in connection with the IR estimator 1156a-1 (FIG. 11C). Further, determining the respective times-of-arrival may include detecting respective onsets of the localization signal in the estimated impulse responses as the respective times-of-arrival, as illustrated by the onset detector 1156a-2 (FIG. 11C).

At block 1308B, the method 1300B includes determining pairwise angles-of-arrival. For instance, the pairwise AoA estimator 1156b may determine pairwise angles-of-arrival for each pair of the microphones that are on opposite earcups. For instance, if there are two microphones on the left earcup (e.g., a microphone 922a-1 and a microphone 922a-2) and two microphones on the right earcup (e.g., a microphone 922b-1 and a microphone 922b-2), the AoA estimator 1156b may determine pairwise angles-of-arrival for each pair such that each pair includes one of the first microphones and one of the second microphones (microphone 922a-1+microphone 922b-1; microphone 922a-1+microphone 922b-2; microphone 922a-2+microphone 922b-1; and microphone 922a-2+microphone 922b-2).

Within examples, determining the pairwise angles-of-arrival may include determining pairwise time-differences-of-arrival between each pair of microphones, as described in connection with the pairwise AOA calculator 1156b-2 (FIG. 11C). Determining the pairwise time-differences-of-arrival between each pair of microphones facilitates determining pairwise angles-of-arrival based on the respective pairwise time-differences-of-arrival, as also described in connection with the pairwise AOA calculator 1156b-2. In some cases, some of the pairs are rejected when the calculations produce output that is outside of one or more thresholds indicative of a suitable measurement (e.g., via the discriminators 1156b-1 illustrated in FIG. 11C).

At block 1310B, the method 1300B includes determining an ensemble angle-of-arrival. For example, the ensemble AoA estimator 1156c may determine the ensemble angle-of-arrival based on the determined pairwise angles-of-arrival, as illustrated in connection with FIG. 11C. Determining an ensemble angle-of-arrival may include applying per-pair weightings to the determined pairwise angles-of-arrival based on at least one confidence metric, as shown by way of example using the per-pair weightings applicator 1156c-1. Determining an ensemble angle-of-arrival may also include determining the ensemble angle-of-arrival based on the weighted pairwise angles-of-arrival, as exemplified by the weighted ensemble AoA calculator 1156c-2 (FIG. 11C).

At block 1312B, the method 1300B includes adding the determined ensemble angle-of-arrival to a buffer. For example, the pulse train aggregator 1156d may add the determined ensemble angle-of-arrival to the buffer 1156b-1 (FIG. 11C), which represents estimated user gaze directions. In some cases, outliers to already-buffered estimates may be rejected (e.g., by the outlier rejector 1156d-2). In such examples, the adding the determined ensemble angle-of-arrival to the buffer may involving adding the determined ensemble angle-of-arrival to the buffer when the determined ensemble angle-of-arrival is not an outlier relative to additional ensemble angles-of-arrival stored in the buffer.

At block 1314B, the method 1300B includes determining head tracking data from the estimated gaze directions. For example, the head tracker 1150 may rotate incoming IMU samples from the IMU 992 to a reference frame centered on the current estimated gaze direction (FIG. 11A). This operation yields head tracking data centered on the playback device 102b, which is used a proxy for the location of the television 1044 (FIG. 10A). As such, when spatial audio is rendered using such head tracking data, the sound appears to come from a virtual source at the location of the playback device 102b (as well as possibly additional virtual sources in the listening environment, such as the locations of the playback device 102*a* and the playback device 102*j* in the den 101*d* (FIG. 10A).

At block 1316B, the method 1300B includes updating binaural rendering filters with the determined head tracking data. For instance, the system 900 may update filters (e.g., the rendering data 859) used by the binaural renderer 990, as described in connection with FIGS. 9C and 9D. The head tracking data may be repeatedly updated as new IMU samples are available. The binaural rendering filters may also be updated as well so as to keep the filters up to date with user head position centered on the reference frame.

At block 1318B, the method 1300B includes causing the wearable playback device to play back the binaural-rendered audio. For instance, the playback device 102*b* may send a data stream representing the binaural-rendered audio to the wearable playback device 902 (perhaps with instructions), which causes the wearable playback device 902 to play back the binaural-rendered audio. Given the input from the head tracking data, as the user moves their head, the binaural-rendered audio remains centered to the external reference frame (e.g., the virtual source at the location of the playback device 102*b*).

VI. Example Spatial Audio Interactions

A spatial audio rendering system, such as the system 900 (FIGS. 9A and 9B), may change its operation based on various interactions with one or more users. For instance, direct user interactions, such as user input received via a user interface, may cause the system 900 to toggle spatial audio rendering (e.g., on or off). Moreover, indirect user actions, such as movement within (or outside of) the listening environment (e.g., the den 101*d*), may also cause the system 900 to change its mode of operation.

To illustrate example interactions, FIGS. 14A, 14B, 14C, and 14D illustrate a model 1400*a*, a model 1400*b*, a model 1400*c*, and a model 1400*d*, respectively. These models, referred to collectively as the model(s) 1400, represent various states and/or modes that the example system 900 may operate in, as well as transitions between these states or modes. Given that the models 1400 include states and transitions between such states, the models, may in some examples, be considered to represent state machines implemented by the system 100. In other examples, the system 900 may implement the models 900 (or portions thereof) without necessarily implementing a state machine.

FIG. 14A is a block diagram showing a model 1400*a* illustrating example audio transitions in and out of spatial audio rendering. As discussed above, an example system (e.g., the system 900 of FIGS. 9A and 9B) to facilitate spatial audio may include a home theatre primary (e.g., the playback device 102*b*) and a wearable playback device (e.g., the wearable playback device 902). By way of example, the playback device 102*b* and the wearable playback device 902 are described in connection to the example states and transitions.

At block 1401*a*, the model 1400*a* includes playing content on the playback device 102*b*, which is referred to in FIGS. 14A-D as a home theatre (HT) primary 102*b*. For instance, the HT primary 102*b* may be playing the audio track(s) of a video (e.g., television or a movie). In other examples, playing content on the HT primary 102*b* may involve playing music (e.g., spatially-mastered music, such as Dolby® ATMOS® mastered music). Within examples, the HT primary 102*b* is playing the content out-loud in a listening environment, such as the den 101*d* (FIG. 7). Block 1401*a* may be considered a first state of the model 1400*a*.

In some examples, playing content on a particular playback device (e.g., the HT primary 102*b*) may be considered a playback session (or simply a "session"). Playback sessions may be transitioned from one playback device to another, such that playback that was occurring on a source playback device (or devices) is transferred to occur on a target playback device (or devices). For instance, a playback session may be transferred from the HT primary 102*b* to the wearable playback device 902, which is referred to in FIGS. 14A-D as a headphone 902. Although the wearable playback device 902 is referred to as the headphone 902 for the sake of brevity, examples involving the headphone device 902 may also apply to other types of wearable playback devices, such as earbuds.

Yet further, the playback session transition may also involve initiating spatial audio on the source device. For instance, a playback session involving playback of spatial audio on a source device may initiate spatial audio on the target playback device when the session is transitioned. As another example, a playback session that does not involve playback of spatial audio (perhaps because the source device does not support playback of spatial audio) may initiate spatial audio on the target playback device when the session is transitioned (perhaps because the target device does support playback of spatial audio).

At block 1402, the model 1400*a* includes initiating a pull. When a playback transition is initiated on a target playback device, the transition is referred to as a "pull" because the playback session is being "pulled" from the source playback device to the target playback device. Conversely, when a playback transition is initiated on the source playback device, the transition is referred to as a "push" because the playback session is being "pushed" from the source playback device to the target playback device.

In this example, a playback transition is being initiated on the headphone 902 to pull the current playback session from the HT primary 102*b* to the wearable playback device 902. The pull initiates playback of spatial audio on the wearable playback device 902. While a pull is shown in block 1402 by way of example, in other examples, the playback transition may be implemented using a push from the source device or via a third device, such as the control device 104.

In some examples, a playback transition, such as a push or pull, is initiated using a particular input or inputs on a user interface. For instance, input data representing a particular gesture on a touch-sensitive user interface of the wearable playback device 902 may be configured to trigger a pull. In other examples, a selectable control (e.g., a button) on a graphical user interface (e.g., the controller interfaces 540) may be configured to trigger a playback transition. Other examples are possible as well.

At block 1403, the model 1400*a* includes audio state transitions related to initiation of spatial audio rendering on the wearable playback device 902. These audio state transitions may enhance or otherwise improve the user experience during the transition, such as by notifying the user of the transition occurring and/or smoothing the transition, among other examples. The block 1403 audio state transitions are representative, and could include additional or fewer audio state transitions.

Block 1403 includes a block 1403*a* and a block 1403*b* related to volume fade-in and fade-out. In particular, the block 1403*a* includes a volume fade-out on the HT primary 102*b*. The block 1403*b* includes a volume fade-in on the headphone 902. Such volume transitions may notify the user of the transition occurring (via audible indications) and also smooth the transition, which may be more audibly pleasing to a user.

Block 1403 also includes a block 1403c and a block 1403d related to adjustments of the environmental filter(s) of the headphone 902. Example environmental filters include active noise cancelling (ANC) and ambient noise filters. Active noise cancelling, when enabled, attempts to cancel noise from the environment. Ambient noise filters, by contrast, allow ambient noise, such as human voice utterances (e.g., as part of conversation) to pass through and be audible to the user (thus negating attenuation caused by the housing (s) of the headphone 902 and/or noise from playback).

At block 1403c, the ambient mode filter ramps to full, which allows ambient noise to be heard while the headphone 902 is being worn. Here, by ramping the ambient mode, the volume fade-out of the HT primary 102b is audible to a user donning the headphone 902. In this manner, the volume fade-in and volume fade-outs may both be audible to the user, thus providing multiple audible indications of the transition.

At block 1403d, the environmental filters ramp to the previous state. For instance, if ambient mode was disabled prior to initiating spatial audio, the headphone device may ramp ambient mode back to that setting. ANC and any other environmental filters may be similarly adjusted to its previous state. In other examples, some of the environmental filters might not be ramped to the previous state, but instead to a state or state(s) suitable for spatial audio. For instance, such states might include at least partially enabling ANC and disabling ambient sound, among other examples.

At block 1404a, the model 1400a includes determining whether spatial audio should be enabled after the transition. For instance, the headphone 902 may determine that a setting (e.g., a default or other option) is enabled such that a playback session transition is configured to initiate spatial audio. If this option is not set, the model 1400a may include transitioning from block 1404a to block 1401b, which involve playing the content on the headphone 902 absent spatial audio rendering. Block 1401b may be considered a second state of the model 1400a.

Conversely, if spatial audio should be enabled after the transition, the model 1400a includes transitioning from block 1404a to block 1404b. At block 1404b, the model 1400a includes determining whether the head tracker is enabled. When enabled, the head tracker uses sensor data to track the location of the user's head relative to one or more reference points, such as a stable gaze position of the user or an external reference point (e.g., the HT primary 102b). As discussed herein, head-tracking data may improve spatial audio rendering by facilitating rotation of the rendered audio according to the user's current head position.

Determining whether the head tracker is enabled may involve referencing state information (e.g., one or more state variables) representing the current state of the head tracker. For instance, the one or more state variables may indicate whether the head tracker is enabled and further which mode or mode(s) the head tracker is operating in. Different modes may correspond to different reference points (e.g., internal or external) and/or different sensor data sources. The state information may be stored or otherwise maintained on the headphone device 902, or otherwise stored or maintained on a device accessible to the system 900 (e.g., one or more of the devices in the media playback system 100) via query over a network (e.g., the LAN 111).

Following block 1404b, the model 1400a proceeds to one of a block 1401c or a block 1401d. At block 1401c, the headphone device 902 renders spatial audio without head tracking. Block 1401c may be considered a third state of the model 1400a. Conversely, at block 1401d, the headphone device 902 renders spatial audio with head tracking. Block 1401d may be considered a fourth state of the model 1400a.

Figure 14B:
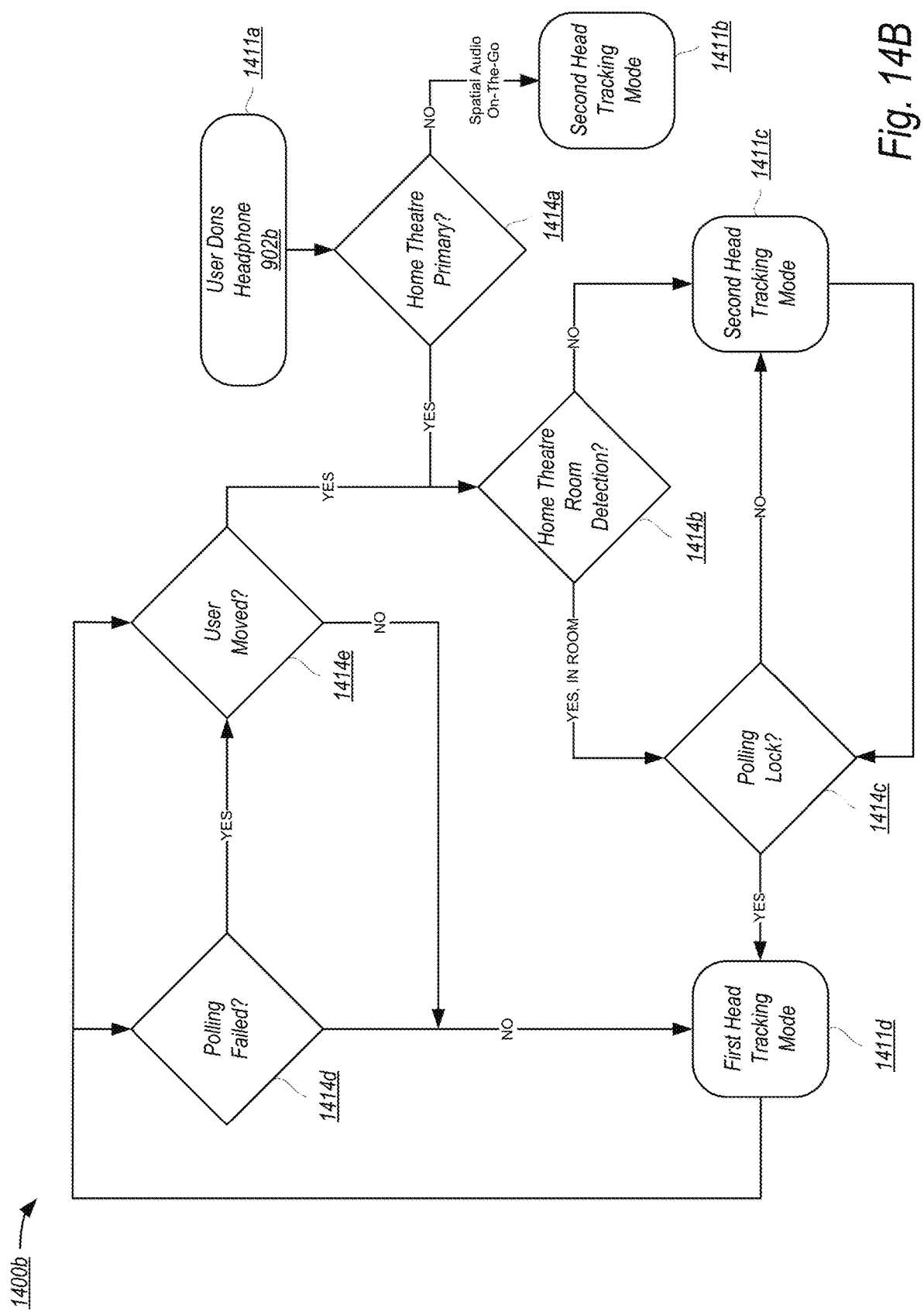

During rendering of spatial audio, user movement or action may trigger transitions to different states or modes of spatial audio rendering. To illustrate, FIG. 14B is a block diagram showing a model 1400b illustrating example transitions during spatial audio rendering which are triggered by detection of user movement, position, or action. In particular, the model 1400b relates to a first head tracking mode and a second head tracking mode, which are utilized by the system 900 under different conditions.

The first head tracking mode includes using an external reference point in the listening environment (e.g., the HT primary 102). In particular, while in the first head tracking mode, the system 900 performs a measurement to determine the orientation of the headphone 902 relative to the HT primary 902 (e.g., via the head tracker 1150 (FIG. 11A). Example measurement techniques involve measuring differences in time-of-flight of audio (e.g., ultrasonic signals) from the HT primary 102 to respective microphone(s) on each earcup of the headphone 902, which provide the relative orientation of the headphone device 902 to the HT primary 102. Alternatively, instead of audio, example measurement techniques may involve measuring differences in time-of-flight of radio signals (e.g., ultra-wideband signals) from the HT primary 102 to respective radio receivers (e.g., wireless network interfaces) on each earcup of the headphone 902. Such data may be combined with data from an inertial measurement unit on the headphone 902 (e.g., the IMU 992) to determine head position (e.g., using sensor fusion).

One characteristic of IMU data is that over time, small errors in reckoning of head orientation will compound, thus causing "drift" of the measured orientation from the actual orientation. Since head position is "anchored" to an external reference point in the first head tracking mode, the system 900 can "reset" the head tracking to the known reference point when a measurement of the orientation of the headphone 902 relative to the HT primary 902 is available. This can mitigate the effect of IMU drift.

The second head tracking mode uses an internal reference point (e.g., stable gaze direction). That is, when the user gazes in a given direction for a period of time (e.g., 7 seconds), the system 900 assumes that this direction should be the reference point (i.e., because the user is looking in this direction). While this technique might also mitigate some effects of IMU drift, the second head tracking mode might run into issues in common use cases, such as dual screening (where the user is listening to audio from their television but looking at their smartphone or tablet).

At block 1411a, the model 1400b includes a user donning the headphone 902b. In some examples, the system 900 may detect donning via sensor data one or more sensors on the headphone 902b. Such sensors may include an inertial measurement unit (e.g., the IMU 992 shown in FIG. 9A), which detects motion consistent with donning. In other examples, the sensor data is used to directly detect the user (e.g., their head), such as via an infrared sensor or the like. Block 1411a may be considered a first state of the model 1400b.

At block 1414a, the model 1400b includes determining whether a home theatre primary, such as the HT primary 102b is available. Such a determination may involve determining whether the headphone 902 is able to communicate (e.g., via one or more network interfaces via the LAN 111) with a playback device 102 configured to operate as a home theatre primary. Alternatively, this determination may involve determining that a playback device 102 is part of the media playback system 100, perhaps by referencing state information that identifies current composition of the media playback system 100 (i.e., its constituent device(s)).

Notably, as a wearable device, the headphone 902 may in some instances be used while connected to the media playback system 100 (e.g., via the LAN 111) and at other times used while "on-the-go" such that the other devices of the media playback system 100 are not available or otherwise remote. Since the second head tracking mode uses an internal reference point (rather than an external reference point), it can be used while on-the-go. Accordingly, as shown in FIG. 14B, if a home theatre primary is not available, the model 1400b includes operating in the second head tracking mode at block 1411b. Block 1411b may be considered a second state of the model 1400b.

If a home theatre primary is available, the model 1400b proceeds to block 1414b. At block 1414b, the model 1400b includes determining whether the headphone 902 is in the home theatre. Here, the "home theatre" refers to the particular room or listening environment that includes the home theatre primary 102b, such as the den 101d in FIG. 7.

Within examples, the system 900 may include a position detector configured to determine relative positioning between the headphone 902 and the playback device(s) 102. The position detector may use proximity as a proxy for whether the headphone 902 is within the home theatre. In some examples, proximity may be determined based on whether the headphone 902 can detect output (e.g., audio or radio signals) from the HT primary 102b. Such output may have limited practical transmission range, such that successful detection of such signals indicates that the headphone 902 and the HT primary 102b are within a certain range. Moreover, as described above, time-of-flight can be used to more accurately measure the relative positioning of the headphone 902 and the HT primary 102b. Within examples, the position detector may combine sensor data from multiple sources (e.g., microphone data and IMU data) to determine relative positioning.

Similar to the on-the-go state described in connection with block 1411b, when the position tracker determines that the headphone device 902 is not within the home theatre (or where the position tracker is not able to determine the relative positioning), the model 1400b includes operating in the second head tracking mode at block 1411c. Such a condition might occur when, after donning the headphone 902 to watch a movie in the den 101d using the television 744 (FIG. 7), the user 745 walks to the kitchen 101h (FIG. 1A) to get a snack or beverage while the opening credits play. Block 1411c may be considered a third state of the model 1400b.

Conversely, when the position tracker determines that the headphone device 902 is within the home theatre, the model 1400b includes determining whether the system 900 has a polling lock between the headphone 902 and the HT primary 102b. A polling lock refers to successful time-of-flight measurements between the headphone 902 and the HT primary 102b. In operation, the head tracker is configured to perform the time-of-flight measurements on a certain interval (i.e., polling). If a particular condition is met (e.g., a threshold number of successful measurements), the head tracker can be considered to have a polling lock. The head tracker might require multiple successful measurements to increase confidence that conditions are suitable for operating in the first head tracking mode (i.e., the environment or user movement is not impacting suitability of the first head tracking mode).

As shown in FIG. 14B, while in the second head tracking mode at block 1411c, the system 900 may occasionally perform the time-of-flight measurement to try to obtain a polling lock. For instance, continuing the example above, the user may return to the den 101d from the kitchen 101d and thus a polling lock may be possible. If not, the system 900 remains in the second head tracking mode. However, when a polling lock is achieved, the system 900 transitions from the second head tracking mode to the first head tracking mode.

Following a polling lock at block 1414c, the model 1400b includes operating in the first head tracking mode at block 1411d. While in the first head tracking mode, the system 900 may render spatial audio, such as via the binaural renderer 990. Further, while the in the first head tracking mode, the head tracker determines first directions-of-center indicating orientations of the headphone 902 relative to the playback device 102b (e.g., via the time-of-flight measurements). Then, the binaural renderer 990 rotates the audio being rendered according to the first directions-of-center. Such rotations facilitate the impression of the rendered audio coming from the direction of the playback device 102b within the larger listening environment (e.g., the den 101d), rather than from the audio transducers of the headphone 902 itself.

At block 1414d, the model 1400b includes determining that polling failed. When polling fails during spatial audio rendering in the first head tracking mode, the model 1400b may determine whether the user moved at block 1414e (e.g., via the position tracker). If the user did not move, the model 1400b may remain in the first head tracking mode (and try to re-poll), as the polling failure may be temporary. If the user did move, the model 1400b may proceed back to block 1414b to determine whether the headphone 902 is in the home theatre room.

As shown in FIG. 14B, the model 1000b may also include determining that the user moved at block 1414e without necessarily first determining that polling failed at block 1414d. Certain user movements, such as the user walking out of the listening environment or moving to cover one or more of the sensors (e.g., microphones) used in the measurements, may impact the ability to complete the time-of-flight measurements. As such, when detecting a user movement, the model 1400b may proceed back to block 1414b to determine whether the headphone 902 is in the home theatre room, and further whether the system 900 is able to obtain a polling lock at block 1414c.

In some examples, two or more wearable playback devices 902 may be used simultaneously in a playback session. Adding or removing an additional wearable playback device 902 may impact the state or mode of spatial audio rendering. In particular, when an additional playback device 902 is added to the playback session, the system 900 may disable certain context-aware modes and instead render spatial audio in a more context-agnostic manner.

Figure 14C:
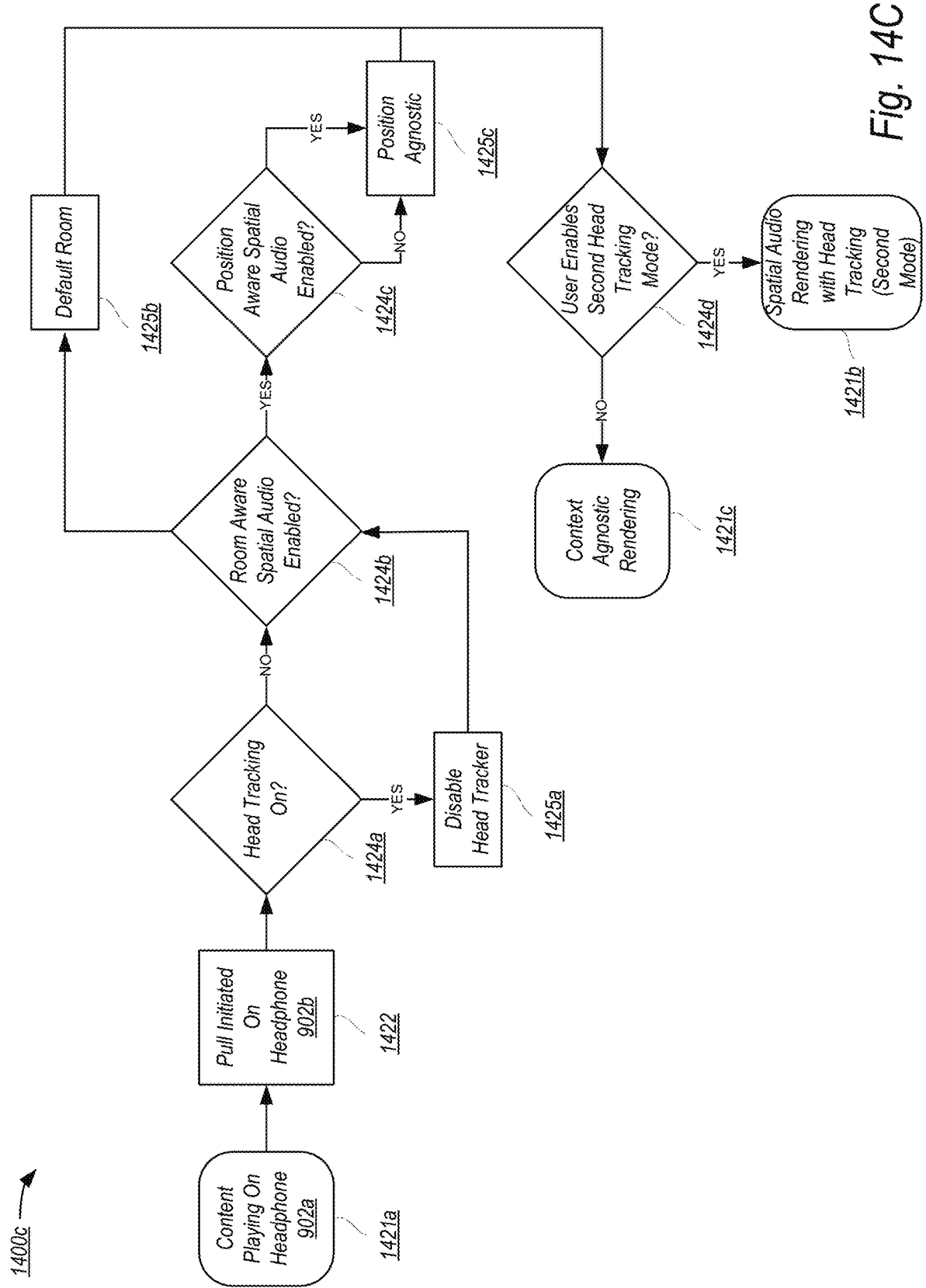

To illustrate, FIG. 14C is a block diagram showing a model 1400c illustrating example transitions during spatial audio rendering when an additional wearable playback device 902 is added to a playback session. At block 1421a, the model includes content playing on a first wearable playback device 902 (shown in FIG. 14C as a headphone 902a). At block 1422, a pull is initiated on a second wearable playback device 902 (shown in FIG. 14C as a headphone 902b). As described above, a pull may initiate or "pull" a playback session to a target device. Here, since the session is already ongoing on the headphone 902*a*, the pull on the headphone 902*b* adds the headphone 902*b* to the current session.

At block 1424*a*, the model 1400*c* includes determining if head tracking is enabled on the system 1424*a*. Such a determination may involve querying or otherwise referencing state information that indicates the enabled or disabled status of the head tracker. Such state information may be maintained on the playback device 102*b*, the headphone 902*a*, the headphone 902*b*, or any device that is connected to the system 900 (e.g., the devices of the media playback system 100). If head tracking is enabled, the model 1400*c* includes disabling the head tracker at block 1425*a*.

At block 1424*b*, the model 1400*c* includes determining if room aware spatial audio is enabled on the system 1424*a*. Example room aware spatial audio is discussed above with reference to room adapted binaural rendering as discussed in section III and illustrated in FIGS. 7-10C. Such a determination may involve querying or otherwise referencing state information that indicates the status of the spatial audio renderer (e.g., the binaural renderer 990 illustrated in FIG. 9A-9C). Such state information may be maintained on the playback device 102*b*, the headphone 902*a*, the headphone 902*b*, or any device that is connected to the system 900 (e.g., the devices of the media playback system 100).

If room aware spatial audio is enabled, the model 1400*c* includes reverting to a default room at block 1425*b*. For instance, the binaural renderer 990 may revert to the reference data 851, rather than the room-adapted rendering data 859 (FIG. 8C). Alternatively, the binaural renderer 990 may revert to a different set of rendering data representing the default room. As discussed above with reference to example room adaptation, multiple sets of reference data 851 may be stored and selected among based on the listening environment.

At block 1424*c*, the model 1400*c* includes determining if position-aware spatial audio is enabled on the system 1424*a*. Such a determination may involve querying or otherwise referencing state information that indicates the status of the spatial audio renderer (e.g., the binaural renderer 990 illustrated in FIG. 9A-9C). Such state information may be maintained on the playback device 102*b*, the headphone 902*a*, the headphone 902*b*, or any device that is connected to the system 900 (e.g., the devices of the media playback system 100). If position-aware spatial audio is enabled, the model 1400*c* includes reverting to a position-agnostic state at block 1425*c*.

Reverting to a position-agnostic state may be considered a context-agnostic rendering mode. In this mode, the spatial audio renderer (e.g., the binaural renderer 990 illustrated in FIG. 9A-9C) may render audio without certain adaptations related to positioning, such as the user's position within the room, their distance to the television (e.g., by proxy of the position of the playback device 102*b*) and/or with head tracking data applied. Conversely, in a context-aware rendering state, the spatial audio renderer renders audio with these adaptations, and possibly also with adaptation to the room. Notably, while the context-agnostic rendering mode is agnostic to user positioning, some example context-agnostic rendering modes may include adaptation to the room.

After the spatial audio renderer is reverted to a context-agnostic rendering mode for rendering audio in a playback session including multiple wearable playback devices, certain context may be re-enabled. For example, as shown at block 1424*d*, the second head tracking mode may be enabled on the headphone 902*a* and/or the headphone 902*b*. In this case, the model 1400*c* includes spatial audio rendering with head tracking (in the second head tracking mode) at block 1421*b*, which may be considered a second state of the model 1400*c*. Conversely, at block 1421*c*, the model 1400*c* may include context-agnostic audio rendering, which may be considered a third state of the model 1400*c*. Notably, the headphone 902*a* and/or the headphone 902*b* may operate in different states while participating in the same playback session.

Figure 14D:
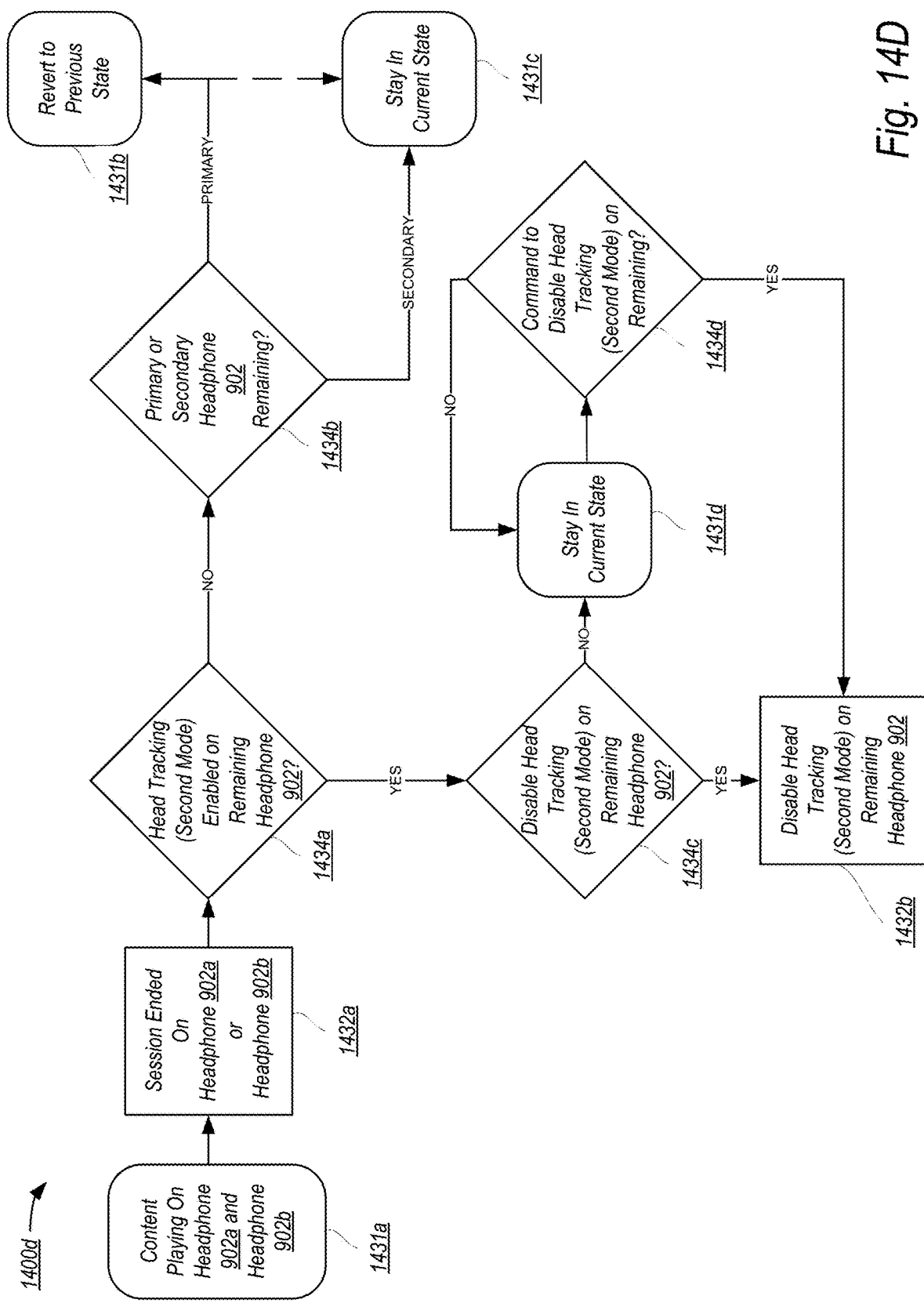

When a playback session with multiple wearable playback devices reverts to a playback session with a single wearable playback devices, the remaining wearable playback device in the playback session may undergo one or more transitions. To illustrate, FIG. 14D is a block diagram showing a model 1400*d* illustrating example transitions during spatial audio rendering when the additional wearable playback device 902 leaves the playback session. At block 1431*a*, the model includes content playing on a first wearable playback device 902 (shown in FIG. 14D as the headphone 902*a*) and a second wearable playback device 902 (shown in FIG. 14D as the headphone 902*b*). This may be considered a first state of the model 1400*d*.

At block 1432*a*, the playback session is ended on the headphone 902*a* or the headphone 902*b*. Either of the headphones 902 may end the session on the respective device by turning the device off, by switching to other content (in such a manner as to start a new session), or by stopping playback. Ending the session on one of the playback devices 902 then triggers one or more transitions, as further described in connection with FIG. 14D.

At block 1434*a*, the model 1400*d* includes determine whether head tracking is enabled on the remaining headphone 902. This determination may involve querying or otherwise referencing state information that indicates the status of the head tracker. Such state information may be maintained on the playback device 102*b*, the headphone 902*a*, the headphone 902*b*, or any device that is connected to the system 900 (e.g., the devices of the media playback system 100).

When head tracking is disabled on the remaining headphone 902, at block 1434*b*, the model 1400*d* includes determining whether the primary or secondary headphone 902 remains in the playback session. Here, the wearable playback device 902 that initiated the playback session (i.e., the playback device 902*a*) is considered to be primary while the later-added wearable playback device 902 (i.e., the playback device 902*b*) is secondary. In some examples, multiple wearable playback devices may be considered secondary in the playback session.

As shown in FIG. 14D, the primary headphone 902*a* may revert to the previous state at block 1431*b*. Here, the previous state refers to the rendering state that existed prior to the headphone 902*b* joining the playback session. This may include enabling one or more context-aware rendering modes, such as position-aware and/or room-aware spatial audio rendering. Operating in block 1431*b* may be considered a second state of the model 1400*d*.

As further shown in FIG. 14D, at block 1431*c*, the secondary headphone 902*b* stays in its current state following removal of the primary headphone 902*a* from the playback session. Operating in block 1431*c* may be considered a third state of the model 1400*d*. Further, as also shown in FIG. 14D, the primary headphone 902*a* may, as an alternative to reverting to the previous state, instead stay in the current state at block 1431*c*. Such an alternate could be configured via a setting, such as a setting configurable via a selectable control on a controller interface (e.g., the controller interface 540).

Referring back to block 1434*a*, when head tracking is enabled on the remaining headphone 902, at block 1434*c*, the model 1400*d* includes determining whether head tracking should be disabled on the remaining headphone 902. This determination may be based on a setting configurable via a selectable control on a controller interface (e.g., the controller interface 540). State information indicating the status of this setting (and possibly other settings) may be stored the respective headphone device 902, or via another device that can be queried or otherwise referenced, as described previously.

When the setting indicates that head tracking should be disabled on the remaining headphone 902, the model 1400*d* includes disabling head tracking on the remaining headphone 902 at block 1432*b*. As shown in FIG. 14D, the second head tracking mode may have possibly been enabled following the transitions shown in FIG. 14C when adding an additional wearable playback device. This change may then toggle the second head tracking mode back to a disabled state.

Conversely, when the setting indicates that head tracking should not be disabled on the remaining headphone 902, the model 1400*d* includes staying in the current state at block 1431*d*, which may be considered a fourth state. As shown in FIG. 14D, the system 900 may later receive a command to disable second head tracking mode at block 1434*d*. The model 1400*d* then includes disabling head tracking on the remaining headphone 902 at block 1432*b*.

VII. Example Spatial Audio Interaction Techniques

Figure 15A:
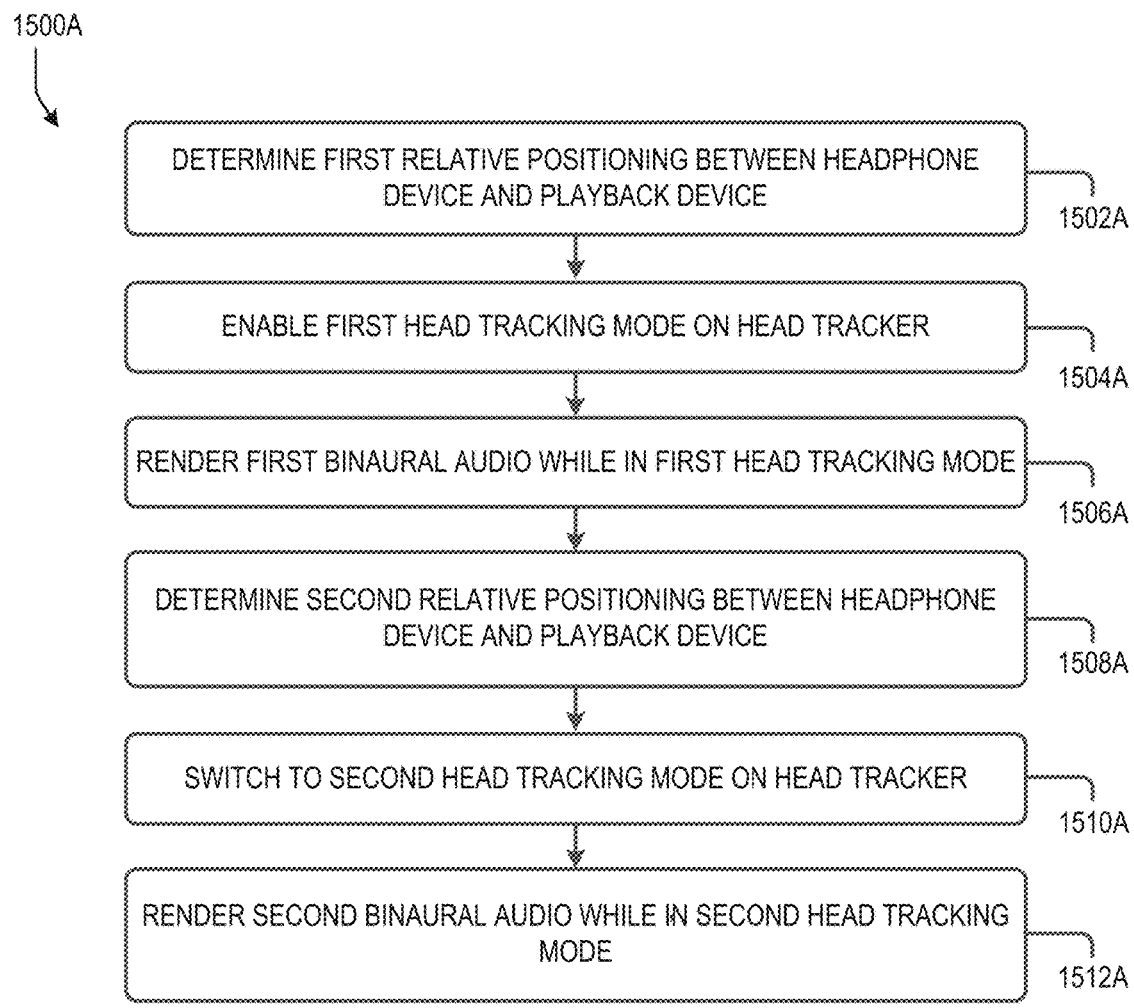
FIG. 15A is a flow diagram of an example method to facilitate spatial audio interactions in accordance with aspects of the disclosed technology.
Figure 15B:
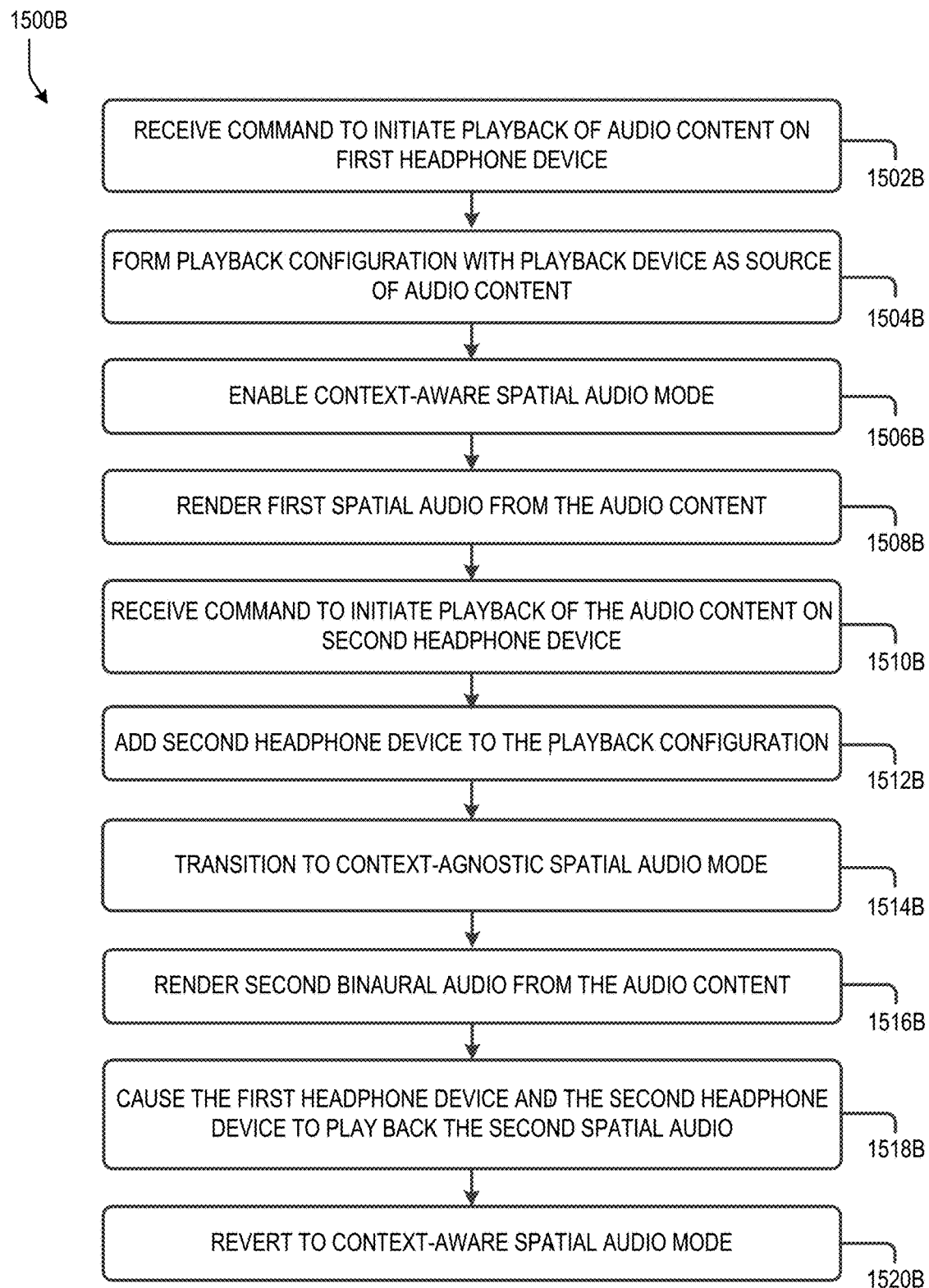
FIG. 15B is a flow diagram of an example method to facilitate spatial audio interactions in accordance with aspects of the disclosed technology.

FIGS. 15A and 15B are flow diagrams showing an example method 1500A and an example method 1500B, respectively, (collectively referred to as the methods 1500) for spatial audio transitions in a media playback system. The methods 1500 may be performed by a playback device 102 (FIGS. 1A and 1B) and a headphone device 702 (FIG. 7), as well as a bonded zone of playback devices 102, or a group of playback devices 102. Alternatively, the methods 1500 may be performed by any suitable device or by a system of devices, such as any of the playback devices 102, NMDs 103, control devices 104, computing devices 105, and/or computing devices 106. For the purposes of illustration, the methods 1500 are described as being performed by the system 900 (FIGS. 9A and 9B).

At block 1502A, the method 1500A includes determining first relative positioning between a headphone device and a playback device. For instance, the system 900 may determine relative positions at a first time between the headphone 902 and the playback device 102*b*. The playback device may be configured as a particular room of the listening environment (e.g., the den 101*d* in FIG. 7). The system 900 may utilize a head tracker to determine the first relative positioning, such as the head tracker 1150 (FIG. 11A).

Within examples, the system 900 may determine the first relative positioning when a first trigger occurs. For instance, the first trigger may correspond to expiration of a polling period (e.g., 60 seconds) of the head tracker, as illustrated in connection with block 1414*d* of FIG. 14B. In some examples, the polling period may vary depending on a recent history of successful measurements. For instance, the polling period may initially start at a shorter time period, such as 8 seconds, and gradually expand to a longer time period, such as 60 seconds, when successive successful measurements are made. Such an approach may balance power consumption caused by measurements with the practical consideration of obtaining up-to-date measurements.

Alternatively, the second trigger may correspond to an interrupt, such as an interrupt from an inertial measurement unit (e.g., the IMU 992 in FIGS. 9A and 9B). The IMU 992 may generate an interrupt when it detects sensor data consistent with user movement, among other examples. For instance, rapid changes in the sensor data may indicate user movement.

In further examples, the second trigger may correspond to a determination that the measurement of relative position is stale. This may be based on a single factor (e.g., time) or a combination of factors (e.g., position data and time, as well as other possible conditions). These factors may be combined in various ways to contribute to a determination whether the measurement of relative position is stale (and thus should be re-measured).

At block 1504A, the method 1500A includes enabling a first head tracking mode on a head tracker. The first head tracking mode may use an external reference point, such as a playback device 102, as described in the preceding sections. Such a head tracker may, in the first head tracking mode, determine, as the reference point, directions-of-center indicating orientations of the headphone device relative to the playback device.

Within examples, the system 900 may enable the first head tracking mode when the first relative positioning indicates that the headphone device is within a particular room. When the headphone device is in the particular room, the headphone device and the playback device configured as that particular room are more likely to be in relative positions that are suitable for the first head tracking mode. Recall that, within examples, measurement of head position in the first head tracking mode involves time-of-flight measurements between the headphone device and the playback device.

Examples of determining whether a wearable playback device, such as the headphone 902, is within a particular room are discussed in connection with block 1414*b* of FIG. 14B, as well as in connection with example head trackers. For instance, proximity between the headphone 902 and the playback device 102*b* may be used a proxy for whether the headphone device is in the den 101*d*. Further, since operation in the first head tracking mode depends upon time-of-flight measurements, one or more successful time-of-flight measurements may be used to indicate whether the devices are proximate (e.g., within a threshold distance) and further their relative positioning (e.g., based on the time-of-flight).

At block 1506A, the method 1500A includes rendering first binaural audio while in the first head tracking mode. For instance, the binaural renderer 990 (FIGS. 9A and 9B) may render first binaural audio while the head tracker is in the first head tracking mode. As illustrated in FIG. 9D, the binaural renderer 990 may receive head tracking data. Further, as described previously, in the first head tracking mode, the head tracking data may be determined with respect to the external reference point (e.g., the playback device 102*b*). As such, when rendering first binaural audio while in the first head tracking mode, the binaural renderer 990 is configured to rotate audio according to the first directions-of-center (which indicate orientations of the headphone device relative to the playback device).

At block 1508A, the method 1500A includes determining second relative positioning between the headphone device and the playback device. For instance, the system 900 may determine relative positions at a second time between the headphone 902 and the playback device 102b. The system 900 may utilize a head tracker to determine the second relative positioning, as discussed above.

Within examples, the system 900 may determine the second relative positioning when a second trigger occurs. The second trigger may correspond to expiration of a polling period, an interrupt, or a combination of factors, as discussed above with respect to the first trigger. Within examples, the second trigger operates under different trigger condition(s) than the first trigger.

At block 1510A, the method 1500A includes enabling a second head tracking mode on the head tracker. The second head tracking mode may use an internal reference point, such as a stable gaze direction, as described above. As such, in the second head tracking mode, the head tracker may determines, as the reference point, directions-of-center indicating orientations of the headphone device relative to gaze direction(s).

Within examples, the system 900 may enable the second head tracking mode when the second relative positioning indicates that the headphone device outside of the particular room. When the headphone device outside of the particular room, the headphone device and the playback device are more likely to not be in relative positions that are suitable for the first head tracking mode. As such, the second head tracking mode is used.

At block 1512A, the method 1500A includes rendering second binaural audio while in the second head tracking mode. For instance, the binaural renderer 990 (FIGS. 9A and 9B) may render first binaural audio while the head tracker is in the first head tracking mode. As illustrated in FIG. 9D, the binaural renderer 990 may receive head tracking data. Further, as described previously, in the second head tracking mode, the head tracking data may be determined with respect to an internal reference point (e.g., stable gaze direction). As such, when rendering second binaural audio while in the second head tracking mode, the binaural renderer 990 is configured to rotate audio according to second directions-of-center (which indicate orientations of the headphone device relative to gaze direction(s)).

Within examples, the binaural renderer 990 may be initially disable (e.g., when the headphone 902 is powered-on, or when a playback session is ended with the binaural renderer 990 in a disabled state). The system 900 may then receive input data representing a command to enable binaural rendering (e.g., via a "pull" as described in connection with block 1402 in FIG. 14A. The system 900 may then enable the binaural renderer 990 according to the command represented in the received data.

Within examples, spatial audio rendering may be enabled in the second head tracking mode, as illustrated in FIG. 14B. Starting in the second head tracking mode might provide a more consistent user experience, as it does not require proximity between the headphone 902 and an external reference (e.g., the playback device 102b). Given that the head tracker starts in the second head tracking mode, enabling the first head tracking mode may involve switching from the second head tracking mode to the first head tracking mode.

In examples, spatial audio rendering may be disabled. For instance, while binaural rendering is enabled, the system 900 may receive input data representing a command to disable binaural rendering, and then responsively disable the binaural renderer. To avoid possible discontinuities in the rendered audio, the system 990 may gradually rotate the audio to a default center position. For instance, if the user 745 is looking at the left wall of the den 101d during binaural rendering in the first head tracking mode (such that the sound is appearing to come from the playback device 102b), the system 900 may gradually rotate the audio from the direction of the playback device 102b to the direction of the left wall, which here is the gaze direction.

Turning now to FIG. 15B, at block 1502B, the method 1500B includes receiving a command to initiate playback of audio content on a first headphone device. For instance, as shown in FIG. 14A, the system 900 may receive a pull command to initiate playback of spatial audio on a headphone 902 (block 1402). The headphone device may be in a particular listening environment (e.g., the den 101d illustrated in FIG. 7) that includes a playback device (e.g., the playback device 102b).

At block 1504B, the method 1500B includes forming a playback configuration with a playback device in the listening environment. For example, the headphone device 902 may form the playback configuration with the playback device 102b in the den 101b. Within examples, the playback device 102b is connected to a source of the audio content (e.g., the television 744). The system 900 may form the playback configuration based on the received command to initiate playback of audio content on the first headphone device.

At block 1506B, the method 1500B includes enabling a context-aware spatial audio mode. For instance, the system 900 may enable room-aware and/or position-aware binaural rendering modes on the binaural renderer 990, as described in connection with FIGS. 14A and 14C. In an example, in the context-aware spatial audio mode, the binaural renderer 990 is configured with first room parameters corresponding to the listening environment, as described in connection with FIGS. 9A-9D. Additional details of example context-aware spatial audio are described throughout, such as with respect to example room adaptation in section III a and FIGS. 8C-8I.

At block 1508B, the method 1500B includes rendering first spatial audio from the audio content. For instance, while the context-aware binaural rendering mode is enabled, the binaural renderer 990 may render first binaural audio from the audio content. Examples of rendering binaural audio are described in connection with FIGS. 9A-9D.

At block 1510B, the method 1500B includes receiving a command to initiate playback of the audio content on a second headphone device. For instance, as illustrated in FIG. 14C, the system 900 may receive a pull command to initiate playback of spatial audio on the headphone 902b (block 1422). The command to initiate playback on the second headphone device may be received while a playback session is in-progress on the first headphone device (e.g., as illustrated in block 1421a in FIG. 14C.

At block 1512B, the method 1500B includes adding the second headphone device to the playback configuration. For example, the system 900 may add the headphone 902b to the playback configuration that includes the headphone 902a and the playback device 102b in the den 101b. The system 900 may add to the playback configuration based on the received command to initiate playback of the audio content on the second headphone device.

At block 1514B, the method 1500B includes transitioning to a context-agnostic spatial audio mode. For instance, the system 900 may transition the binaural renderer 990 to a context-agnostic rendering state, as illustrated by block 1421c in FIG. 14C. For instance, the system 900 may transition from position-aware rendering to position-agnostic rendering, as illustrated by block 1125c, also shown in FIG. 11C. Yet further, the system 900 may disable a head tracker, as illustrated by block 1125a in FIG. 11C.

Further, the system 900 may transition from room-aware rendering to a default room such that the binaural renderer 990 is configured with second room parameters corresponding to a default listening environment. Such a default listening environment would be different from the actual listening environment, as illustrated by block 1425*b* in FIG. 14C. However, in other examples, the context-agnostic spatial audio mode may include room aware adaptations (while excluding position-aware adaptations so as to be context-agnostic).

At block 1516B, the method 1500B includes rendering second spatial audio from the audio content. For instance, while the context-agnostic binaural rendering mode is enabled, the binaural renderer 990 may render second binaural audio from the audio content. As noted above, examples of rendering binaural audio are described in connection with FIGS. 9A-9D.

At block 1518B, the method 1500B includes causing the first headphone device and the second headphone device to play back the second spatial audio. For example, the system 900 may cause the headphone 902*a* and the headphone 902*b* to render binaural audio. The playback device 102*b* may send the rendered binaural audio to the headphone 902*a* and the headphone 902*b* for rendering, as shown in FIGS. 9A and 9B.

At block 1520B, the method 1500B includes reverting to a context-aware spatial audio mode. For instance, the headphone 902*a* may revert to a context-aware binaural rendering mode, as described in connection with block 1431*b* in FIG. 14D. Other examples are possible as well.

VIII. Further Example Spatial Audio Techniques

Figure 16:
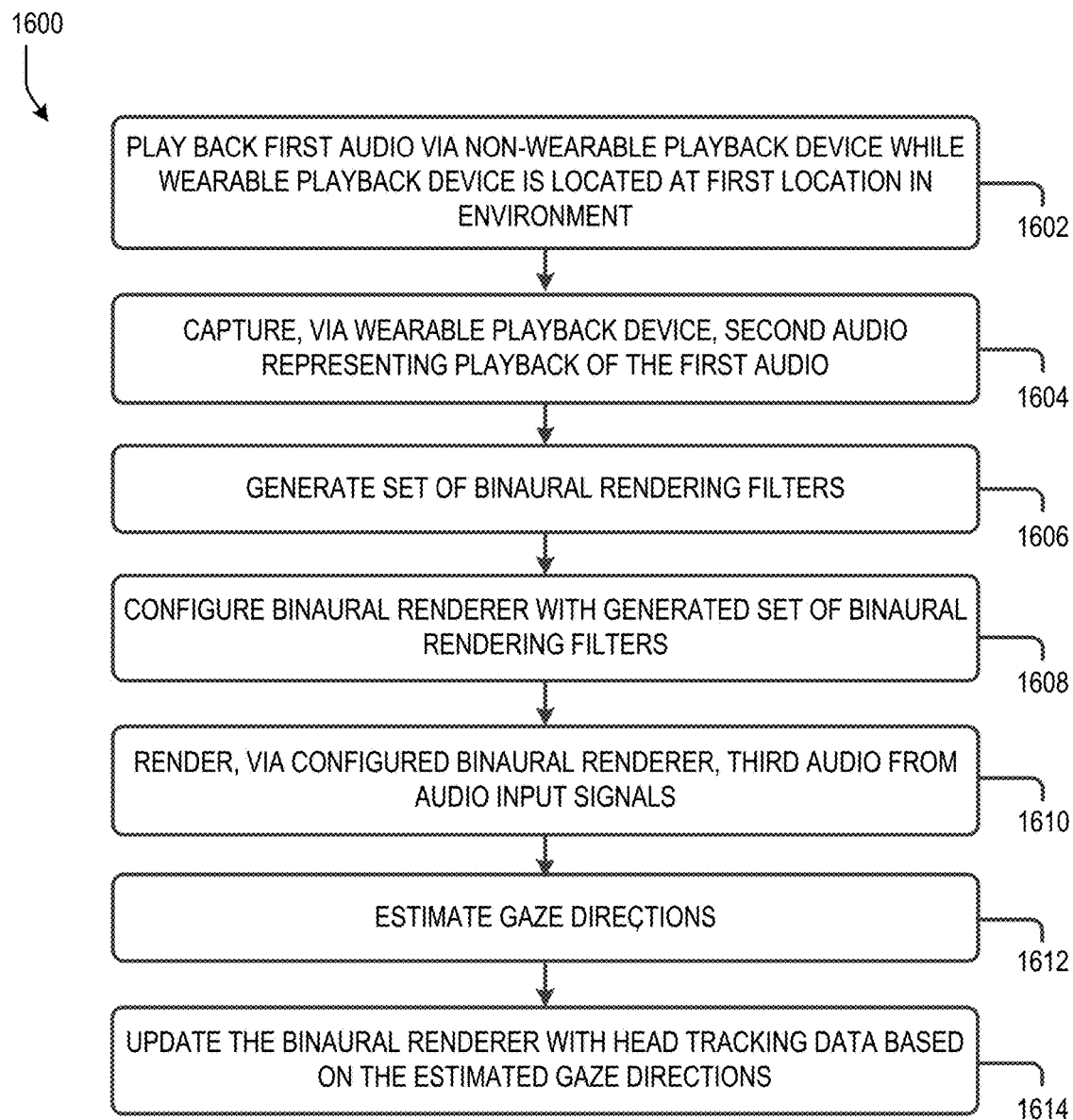
FIG. 16 is a flow diagram of an example method for binaural rendering in accordance with aspects of the disclosed technology.

As noted previously, some example technologies may involve features from two or more of the example methods described previously. To illustrate, FIG. 16 is a flow diagram showing an example method 1600 for spatial audio rendering in a media playback system. The method 1600 may be performed by a non-wearable playback device, such as a playback device 102 (FIGS. 1A and 1B) and wearable playback device, such the headphone device 702 (FIG. 7), as well as a bonded zone of playback devices 102, or a group of playback devices 102. Alternatively, the method 1600 may be performed by any suitable device or by a system of devices, such as any of the playback devices 102, NMDs 103, control devices 104, computing devices 105, and/or computing devices 106.

At block 1602, the method 1600 includes playing back first audio via first audio transducers of the non-wearable playback device while the wearable playback device is located at a first location in an environment. For instance, as described in connection with FIG. 10A, the playback device 102*b* may play back the first audio via the speakers 218 (FIG. 9A) in the den 101*d'* from a first position near the television 744 (FIG. 7). The den 101*d* is one example of a environment from among many possible environments, such as any of the example rooms 101 or combinations thereof (e.g., when formed into groups), as well as other environments.

At block 1604, the method 1600 includes capturing, via one or more microphones of the wearable playback device while the wearable playback device is in the environment, second audio representing playback of the first audio in the environment. For example, the wearable device 902 (FIG. 9A) may capture the second audio using the microphones 922 while the playback device 102*b* is playing back the first audio (FIG. 9A). Additionally or alternatively, one or more suitable devices equipped with microphones may capture the second audio. Examples of such suitable devices include the playback devices 102, the NMDS 103, and the control devices 104 (FIGS. 1A and 1B). For instance, the satellite playback devices 102*j* and 102*a* (FIG. 7) may capture the second audio.

At block 1606, the method 1600 includes generating a set of binaural rendering filters (859) from target data (853) based on the captured second audio. For instance, a processing device, such as the wearable playback device 902 or the control device 104, among other examples, may generate a set of binaural filters. Examples of binaural rendering filters and their generation are described above in connection with section III. For example, the room adapter 850 may generate the rendering data 859, which may include binaural rendering filters corresponding to direct, early, and late models, such as the direct parameter set 859*a*, the early parameter set 859*b*, and the late parameter set 859*c* (FIG. 8C).

At block 1608, the method 1600 includes configuring a binaural renderer with the generated set of binaural rendering filters. For example, the binaural renderer 990 may be configured with the rendering data 859, which may include binaural rendering filters, such as the direct parameter set 859*a*, the early parameter set 859*b*, and the late parameter set 859*c* (FIG. 8C). Other examples are possible as well.

At block 1610, the method 1600 includes rendering, via the configured binaural renderer, third audio from audio input signals. For instance, the binaural renderer 990 may render an audio input, such as the input channels 995. As described in connection with the preceding sections, the rendered audio is simulate playback from virtual sources within the environment, such that when played back by the wearable playback device, the rendered audio sounds as if its being played back by speakers within the environment, rather than via transducers on the wearable playback device.

At block 1612, the method 1600 includes estimating gaze directions while the wearable playback device is donned by a user. The gaze directions may be estimated based on one or more time-of-flight measurements of at least one signal propagating between the non-wearable playback device at the second location in the environment to the wearable playback device at the first location in the environment. Example time-of-flight measurements are described in connection with FIG. 10A. In some examples, the head tracker 1150 may estimate gaze directions, as described in connection with FIGS. 11A-D. Additional examples are described in connection with FIGS. 11E-11G.

At block 1614, the method 1600 includes updating the binaural renderer with head tracking data during binaural rendering of the audio via the binaural renderer. The head tracking data may be based on based on the estimated gaze directions to maintain simulation of playback from the virtual sources after head rotation. That is, updating the binaural renderer with head tracking data causes the audio played back by the wearable playback device to continue to sound as if its coming from the virtual sources within the environment when the user moves (e.g., rotates) their head. Examples of updating the binaural renderer include updating the set of binaural rendering filters as described in connection with FIG. 11A, which shows the head tracking data 1159 being sent to the binaural renderer 990.

As noted above, the method 1600 may additionally or alternatively include features from any of the example technologies disclosed herein, such as the example methods 1200A, 1200B, 1200C, 1300A, 1300B, 1500A, and/or 1500B, among other example features disclosed herein.

CONCLUSION

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples (1, 2, 3, etc.)s for convenience. These are provided as examples and do not limit the present technology. It is noted that any of the dependent examples may be combined in any combination, and placed into a respective independent example. The other examples can be presented in a similar manner.

Example 1: A method comprising: playing back first audio via first audio transducers of a playback device that is located at a first location in an acoustic environment; capturing, via one or more microphones of a headphone device while the headphone device in the acoustic environment, second audio representing playback of the first audio in the acoustic environment; determining target data from the captured second audio, the target data comprising target room parameters; adapting, based on the target room parameters, reference binaural rendering impulse response filters to an early reflections model representing reflections of the sound in the acoustic environment before a particular mixing time; generating, from the target room parameters, a late reverberation model representing reverberation of the sound in the acoustic environment after the particular mixing time; synthesizing a set of binaural rendering filters comprising a direct sound model, the determined early reflections model, and the determined late reverberation model, the direct sound model based on reference head-related impulse response data; configuring a binaural renderer with the synthesized set of binaural rendering filters; rendering, via the configured binaural renderer, third audio from audio input signals, wherein the rendered third audio is configured to simulate playback from virtual sources within the acoustic environment when played back via the headphone device, wherein the virtual sources include a first virtual source at the first location and one or more second virtual sources at respective second locations; and causing the headphone device to play back the rendered third audio via the second audio transducers to simulate playback from the virtual source.

Example 2: The method of Example 1, wherein the target room parameters comprise target early decay time, and wherein adapting the reference binaural rendering impulse response filters to the early reflections model comprises: modifying the reference binaural rendering impulse response filters by a gain envelope that converts a reference early decay time to the target early decay time.

Example 3: The method of Example 2, wherein determining the target data from the captured second audio comprises estimating the target early decay time from energy delay curves in respective subbands of the room impulse response.

Example 4: The method of any of Examples 1-3, further comprising selecting the reference binaural rendering impulse response filters to match the acoustic environment from among a plurality of filters representing different acoustic environments.

Example 5: The method of any of Examples 1-4, wherein the target room parameters comprise frequency-dependent late reverberation time, and wherein generating the late reverberation model comprises generating static late reverberation that matches the frequency-dependent late reverberation time.

Example 6: The method of any of Examples 1-5, wherein the room parameters comprise a target mixing-time energy spectrum, and wherein synthesizing the set of binaural rendering filters comprises: adjusting per subband gain in the determined early reflections model from a reference mixing-time energy spectrum to match the target mixing-time energy spectrum; and adjusting per subband gain in the determined late reverberation model from a native mixing-time energy spectrum to match the target mixing-time energy spectrum.

Example 7: The method of any of Examples 1-6, wherein the room parameters comprise a target direct-to-early ratio representing an energy ratio between direct sound and early reflections in the room impulse response, and wherein synthesizing the set of binaural rendering filters comprises: estimating an intermediate direct-to-early ratio representing an energy ratio between mean direct energy in the direct sound model and mean early reflections energy in the early reflections model; adjusting gain in the direct sound model from the intermediate direct-to-early ratio to match the target direct-to-early ratio; and adjusting gain in the determined early reflections model from the intermediate direct-to-early ratio to match the target direct-to-early ratio.

Example 8: The method of any of Examples 1-7, wherein the room parameters comprise a center-time of the room impulse response, and wherein synthesizing the set of binaural rendering filters comprises: determining a gain that when applied to the early reflections model would cause the early reflections model to match the center-time of the room impulse response; and applying the determined gain to the early reflections model.

Example 9: The method of any of Examples 1-8, wherein synthesizing the set of binaural rendering filters comprises:

normalizing the direct sound model, the early reflections model, and the late reverberation model.

Example 10: The method of any of Examples 1-9, further comprising: sending, via a network interface of the playback device, data representing the second audio; receiving, via a network interface of the playback device, the data representing the second audio; determining a target room impulse response from the received data representing the second audio; and determining the target room parameters from the determined target room impulse response.

Example 11: The method of any of Examples 1-10, wherein the headphone device comprises a first microphone and a second microphone, wherein the captured first audio comprises left audio captured by the first microphone and right audio captured by the second microphone, and wherein determining the room impulse response comprises: before determining of the room parameters, combining a first impulse response representing the left audio with a second impulse response representing the right audio.

Example 12: The method of any of Examples 1-11, wherein the playback device comprises a high-definition multimedia interface (HDMI) port, and wherein the method further comprises: receiving, via the HDMI port from a television, the audio input signals Example 13: A tangible, non-transitory, computer-readable medium having instructions stored thereon that are executable by one or more processors to cause a media playback system to perform the method of any one of Examples 1-12.

Example 14: A media playback system comprising a playback device and a headphone device, the media playback system configured to perform the method of any one of Examples 1-12.

Example 15: A playback device comprising a network interface, a microphone, one or more processors, and a data storage having instructions stored thereon that are executable by the one or more processors to cause the playback device to perform the method of any of Examples 1-12.

Example 16: A headphone device comprising a network interface, a microphone, one or more processors, and a data storage having instructions stored thereon that are executable by the one or more processors to cause the headphone device to perform the method of any of Examples 1-12.

Example 17: A method comprising: playing back first audio via first audio transducers of a playback device that is located at a first location in an acoustic environment; capturing, via one or more microphones of a microphone-equipped device while the microphone-equipped device is in the acoustic environment, second audio representing playback of the first audio in the acoustic environment; determining target data from the captured second audio, the target data comprising a target room parameters; generating, from the target room parameters, a late reverberation model representing reverberation of the sound in the acoustic environment after the particular mixing time; synthesizing a set of binaural rendering filters comprising a direct sound model, the determined early reflections model, and the determined late reverberation model, the direct sound model based on reference head-related impulse response data; configuring a binaural renderer with the synthesized set of binaural rendering filters; rendering, via the configured binaural renderer, third audio from audio input signals, wherein the rendered third audio is configured to simulate playback from virtual sources within the acoustic environment when played back via the headphone device, wherein the virtual sources include a first virtual source at the first location and one or more second virtual sources at respective second location; and causing the headphone device to play back the rendered third audio via the second audio transducers to simulate playback from the virtual sources.

Example 18: The method of Example 17, wherein the target data comprises a target late reverberation time, and wherein generating the late reverberation model comprises: shaping a noise sequence to match the target late reverberation time.

Example 19: The method of Example 18, wherein shaping a noise sequence to match the target late reverberation time comprises: filtering the noise sequence into subbands; multiplying the subbands with respective decaying exponentials having subband mixing time gains to yield the target reverberation time; and re-combining the subbands.

Example 20: The method of any of Examples 17-19, wherein the target data comprises a target mixing-time energy level, and wherein shaping the noise sequence comprises: determining the decaying exponentials based on the target mixing-time energy level and the target late reverberation time.

Example 21: The method of any of Examples 17-20, wherein the target data comprises a target late reverberation time, and wherein generating the late reverberation model comprises: rendering the late reverberation model with a parametric reverberator that is tuned to generate late reverberation with the target late reverberation time.

Example 22: The method of Example 21, wherein the parametric reverberator comprises a feedback delay network, and wherein rendering the late reverberation model with the parametric reverberator comprises tuning biquad cascade filters of the feedback delay network to correspond to the target late reverberation time.

Example 23: The method of any of Examples 17-22, wherein determining the early reflections model comprises: adapting, based on the target room parameters, reference binaural rendering impulse response filters to an early reflections model representing reflections of the sound in the acoustic environment before a particular mixing time.

Example 24: The method of Example 23, wherein the target room parameters comprise target early decay time, and wherein adapting the reference binaural rendering impulse response filters to the early reflections model comprises: modifying the reference binaural rendering impulse response filters by a gain envelope that converts a reference early decay time to the target early decay time.

Example 25: The method of Example 24, wherein determining the target data from the captured second audio comprises: estimating the target early decay time from energy delay curves in respective subbands of the room impulse response.

Example 26: The method of Example 23, further comprising: selecting the reference binaural rendering impulse response filters to match the acoustic environment from among a plurality of filters representing different acoustic environments.

Example 27: A tangible, non-transitory, computer-readable medium having instructions stored thereon that are executable by one or more processors to cause a media playback system to perform the method of any one of Examples 17-26.

Example 28: A media playback system comprising a playback device and a headphone device, the media playback system configured to perform the method of any one of Examples 17-26.

Example 29: A playback device comprising a network interface, a microphone, one or more processors, and a data storage having instructions stored thereon that are executable by the one or more processors to cause the playback device to perform the method of any of Examples 17-26.

Example 30: A headphone device comprising a network interface, a microphone, one or more processors, and a data storage having instructions stored thereon that are executable by the one or more processors to cause the headphone device to perform the method of any of Examples 17-26.

Example 31: A method comprising: playing back first audio via first audio transducers of the playback device while the playback device is located at a first location in an acoustic environment; capturing, via one or more microphones of a headphone device while the headphone device in the acoustic environment, second audio representing playback of the first audio in the acoustic environment; sending, via a network interface of the headphone device, data representing the captured second audio to the processing device; determining, via at least one processor of the processing device, target data from the captured second audio, the target data comprising target room parameters; generating a set of binaural rendering filters based on the determined target data; configuring a binaural renderer with the generated set of binaural rendering filters; rendering, via the configured binaural renderer, third audio from audio input signals, wherein the rendered third audio is configured to simulate playback from virtual sources within the acoustic environment when played back via the headphone device, wherein the virtual sources include a first virtual source at the first location and one or more second virtual sources at respective second location; and causing the headphone device to play back the rendered third audio via the second audio transducers to simulate playback from the virtual sources.

Example 32: The method of Example 31, wherein the system comprises a control device, and wherein the control device comprises the processing device.

Example 33: The method of Example 32, further comprising: establishing an audio communications channel between the headphone device and the control device; and sending, via the established audio communications channel from the headphone device to the control device, at least one of (a) telephony data or (b) voice input data, wherein send the data representing the captured second audio to the processing device comprises: sending the data representing the captured second audio to the control device via the established audio communications channel.

Example 34: The method of any of Examples 31-33, wherein the system comprises at least one server, and wherein the at least one server comprises the at least one server.

Example 35: The method of any of Examples 31-33, wherein the system comprises at least one additional playback device, and wherein the at least one additional playback device comprises the processing device.

Example 36: The method of any of Examples 31-35, further comprising: after generating the set of binaural rendering filters, send data representing the set of binaural rendering filters to the playback device.

Example 37: The method of any of Examples 31-36, wherein generating the set of binaural rendering filters comprises: adapting, based on the target room parameters, reference binaural rendering impulse response filters to an early reflections model representing reflections of the sound in the acoustic environment before a particular mixing time; generating, from the target room parameters, a late reverberation model representing reverberation of the sound in the acoustic environment after the particular mixing time; and synthesizing the set of set of binaural rendering filters from a direct sound model based on reference head-related impulse response data, the early reflections model, and the late reverberation model.

Example 38: A tangible, non-transitory, computer-readable medium having instructions stored thereon that are executable by one or more processors to cause a media playback system to perform the method of any one of Examples 31-37.

Example 39: A media playback system comprising a playback device and a headphone device, the media playback system configured to perform the method of any one of Examples 31-37.

Example 40: A playback device comprising a network interface, a microphone, one or more processors, and a data storage having instructions stored thereon that are executable by the one or more processors to cause the playback device to perform the method of any of Examples 31-37.

Example 41: A headphone device comprising a network interface, a microphone, one or more processors, and a data storage having instructions stored thereon that are executable by the one or more processors to cause the headphone device to perform the method of any of Examples 31-37.

Example 42: A method comprising: receiving a command to initiate playback of audio content on a first headphone device in a listening environment; based on receiving the command to initiate playback of the audio content on the first headphone device, forming a playback configuration with a playback device in the listening environment, wherein the playback device is connected to a source of the audio content; enabling, on a binaural renderer, a context-aware binaural rendering mode, wherein, in the context-aware binaural rendering mode, the binaural renderer is configured with (i) position parameters corresponding to a user position within the listening environment and (ii) head tracking data representing user head orientation; while the context-aware binaural rendering mode is enabled on the binaural renderer, rendering, via the binaural renderer, first binaural audio from the audio content; while the first headphone device is in the playback configuration with the playback device, causing the first headphone device to play back the rendered first binaural audio; receiving a command to initiate playback of the audio content on a second headphone device in the listening environment; based on receiving the command to initiate playback of the audio content on the second headphone device, add the second headphone device to the playback configuration; based on adding the second headphone device to the playback configuration, transitioning the binaural renderer to a context-agnostic rendering mode, wherein, in the context-agnostic listening mode, the binaural renderer is not configured with the (i) position parameters corresponding to the user position within the listening environment and (ii) the head tracking data representing user head orientation; while the context-agnostic binaural rendering mode is enabled on the binaural renderer, rendering, via the binaural renderer, second binaural audio from the audio content; and while the first headphone device and the second headphone device are in the playback configuration with the playback device, cause the first headphone device and the second headphone device to play back the rendered second binaural audio.

Example 43: The method of Example 42, further comprising: while the first headphone device and the second playback device are in the playback configuration, receiving a command to stop playback of the audio content on the second headphone device in the listening environment; based on receiving the command to stop playback of the audio content on the second headphone device in the listening environment, remove the second headphone device from the playback configuration; and based on removing the second headphone device from the playback configuration, transitioning the binaural renderer to the context-aware rendering mode.

Example 44: The method of any of Examples 42-43, further comprising: while the first headphone device and the second playback device are in the playback configuration, receive a command to stop playback of the audio content on the first headphone device in the listening environment; based on receipt of the command to stop playback of the audio content on the first headphone device in the listening environment, remove the first headphone device from the playback configuration; and after removal of the first headphone device from the playback configuration, maintain the binaural renderer in the context-agnostic rendering mode.

Example 45: The method of any of Examples 42-44, wherein rendering the first binaural audio from the audio content comprises rendering, via the binaural renderer, the first binaural audio from the audio content such that the first binaural audio appears to be playing out-loud within the listening environment when played back by the first headphone device.

Example 46: The method of Example 45, wherein rendering the first binaural audio from the audio content comprises: applying the position parameters to the rendering, via the binaural renderer, of the first binaural audio from the audio content such that the first binaural audio appears to be originate from the playback device within the listening environment when played back by the first headphone device.

Example 47: The method of Example 45, wherein, in the context-aware binaural rendering mode, the binaural renderer is further configured with head-tracking data representing orientations of the first headphone device, and wherein rendering the first binaural audio from the audio content comprises: applying the head-tracking data to rendering, via the binaural renderer, of the first binaural audio from the audio content such that, as the user turns their head, the first binaural audio appears to be originate from an external source within the listening environment when played back by the first headphone device.

Example 48: The method of Example 47, further comprising: while in the context-agnostic mode, receiving a command to enable head-tracking on the second headphone device; and based on receiving the command to enable head-tracking on the first headphone device, transitioning to an additional context-aware mode, wherein in the additional context-aware mode, head-tracking data is applied to rendering, via the binaural renderer, of the second binaural audio from the audio content such that the second binaural audio appears to be originate from the external source within the listening environment when played back by the second headphone device.

Example 49: The method of any of Examples 42-48, wherein, in the context-aware listening mode, the binaural renderer is configured with first room parameters corresponding to the listening environment and wherein, in the context-agnostic listening mode, the binaural renderer is configured with second room parameters corresponding to a default listening environment that is different from the listening environment.

Example 50: The method of any of Examples 42-49, wherein the playback device comprises the binaural renderer, and wherein causing the first headphone device and the second headphone device to play back the rendered second binaural audio comprises: sending, via a network interface, data representing the rendered first binaural audio to the first headphone device and the second headphone device.

Example 51: The method of any of Examples 42-50, wherein the first headphone device comprises a touch-sensitive control interface, and wherein receiving the command to initiate playback of audio content on the first headphone device in the listening environment comprises: receiving, via the touch-sensitive control interface, particular touch input corresponding to the command to initiate playback of audio content on the first headphone device.

Example 52: The method of any of Examples 42-51, wherein forming the playback configuration with the playback device in the listening environment comprises: while the playback device is playing the audio content, fading-out volume level of the playback device from a given perceptible level to an imperceptible level; and concurrently, fading-in volume level of the headphone device to match the given perceptible level.

Example 53: The method of Example 52, wherein forming the playback configuration with the playback device in the listening environment comprises: during at least a portion of the fade-out of the volume level, enabling active-noise cancellation on the first headphone device; and after the fade-out, disabling active noise cancellation.

Example 54: The method of any of Examples 42-53, wherein the playback device comprises a high-definition multimedia interface (HDMI) port, wherein the source of the audio content comprises the HDMI port, and wherein the method further comprises: receiving, via the HDMI port from a television, the audio content.

Example 55: A tangible, non-transitory, computer-readable medium having instructions stored thereon that are executable by one or more processors to cause a media playback system to perform the method of any one of Examples 42-54.

Example 56: A media playback system comprising a playback device and a headphone device, the media playback system configured to perform the method of any one of Examples 42-54.

Example 57: A playback device comprising a network interface, a microphone, one or more processors, and a data storage having instructions stored thereon that are executable by the one or more processors to cause the playback device to perform the method of any of Examples 42-54.

Example 58: A headphone device comprising a network interface, a microphone, one or more processors, and a data storage having instructions stored thereon that are executable by the one or more processors to cause the headphone device to perform the method of any of Examples 42-54.

Example 59: A method comprising: when a first trigger occurs, determining, via a position detector, first relative positioning between a headphone device and a playback device configured as a particular room of a media playback system; when the first relative positioning indicates that the headphone device is within a particular room, enabling a first head-tracking mode on a head tracker, wherein in the first head-tracking mode, the head tracker determines first directions-of-center indicating orientations of the headphone device relative to the playback device; while in the first head-tracking mode, rendering, via the binaural renderer, first binaural audio, wherein, in the first head-tracking mode, the binaural renderer is configured to rotate audio according to the first directions-of-center during binaural rendering; when a second trigger occurs, determining, via the position detector, second relative positioning between the headphone device and the playback device; when the second relative positioning indicates that the headphone device is outside the particular room, switching from the first head-tracking mode to a second head-tracking mode, wherein in the second head-tracking mode, the head tracker determines second directions-of-center indicating orientations of the headphone device relative to gaze directions; and while in the second head-tracking mode, rendering, via the binaural renderer, second binaural audio, wherein, in the second head-tracking mode, the binaural renderer is configured to rotate audio according to the second directions-of-center during binaural rendering.

Example 60: The method of Example 59, further comprising: while binaural rendering is disabled, receiving input data representing a command to enable binaural rendering; and according to the command represented in the received data, enabling the binaural renderer, wherein the binaural renderer is enabled with the head tracker in the second head tracking mode.

Example 61: The method of Example 60, wherein enabling the first head tracking mode comprises switching from the second head tracking mode to the first head tracking mode.

Example 62: The method of any of Examples 59-61, wherein determining, via the position detector, the first relative positioning between the headphone device and the playback device comprises: receiving, via at least one sensor, sensor data; determining the first relative positioning from the received sensor data; and determining that the first relative positioning indicates that the headphone device is within a given proximity to the playback device, wherein the given proximity represents a proxy for the headphone device being within the particular room.

Example 63: The method of Example 62, wherein determining, via the position detector, the second relative positioning between the headphone device and the playback device comprises: receiving, via at least one sensor, additional sensor data; determining that the second relative positioning cannot be determined to a given confidence threshold; and based on the determination, determining that the second relative positioning indicates that the headphone device outside of the particular room.

Example 64: The method of any of Examples 58-63, further comprising: while binaural rendering is enabled, receiving input data representing a command to disable binaural rendering; and disabling the binaural renderer, wherein disabling the binaural renderer comprises: gradually rotating the audio to a default center position.

Example 65: The method of Example 64: further comprising: detecting that the first trigger occurred, wherein detecting that the first trigger occurred comprises: detecting expiration of polling period corresponding to the first trigger.

Example 66: The method of any of Examples 58-65: wherein the playback device comprises an input interface connected to a television.

Example 67: The method of any of Examples 58-66: wherein the media playback system comprises multiple rooms that include at least one respective playback device, and wherein playback devices in the media playback system are connected to a local area network.

Example 68: A tangible, non-transitory, computer-readable medium having instructions stored thereon that are executable by one or more processors to cause a media playback system to perform the method of any one of Examples 59-67.

Example 69: A media playback system comprising a playback device and a headphone device, the media playback system configured to perform the method of any one of Examples 59-67.

Example 70: A playback device comprising a network interface, a microphone, one or more processors, and a data storage having instructions stored thereon that are executable by the one or more processors to cause the playback device to perform the method of any of Examples 59-67.

Example 71: A headphone device comprising a network interface, a microphone, one or more processors, and a data storage having instructions stored thereon that are executable by the one or more processors to cause the headphone device to perform the method of any of Examples 59-67.

Example 72: A method comprising: receiving a command to play back audio on a wearable playback device; after the wearable playback device is donned by a user, determining, via a first gaze direction estimator, first preliminary estimates of user gaze direction, the first preliminary estimates based on one or more time-of-flight measurements of at least one signal propagating from a non-wearable playback device at a first location in a listening environment to the wearable playback device at a second location in the listening environment; determining, via a second gaze direction estimator, second preliminary estimates of user gaze direction, the second preliminary estimates based on first samples from an inertial measurement unit (IMU); estimate gaze directions based on fusion of the first gaze direction estimates and the second preliminary estimates; determining head tracking data based on a rotation of second samples from the IMU to a reference frame centered on the estimated gaze directions; during binaural rendering of the audio via a binaural renderer, updating binaural rendering filters with the determined head tracking data; and causing the wearable playback device to play back the binaural-rendered audio to simulate playback from at least one virtual source in the listening environment.

Example 73: The method of Example 72: wherein estimating the gaze directions based on fusion of the first preliminary estimates and the second preliminary estimates comprises: based on at least one confidence metric, select the estimated gaze directions from among (a) the first preliminary gaze estimates and (b) the second preliminary gaze estimates.

Example 74: The method of Example 73: wherein the at least one confidence metric comprises a length of time elapsed since a previous time of flight measurement; and wherein selecting the estimated gaze directions comprises: selecting the first preliminary gaze estimates as the estimated gaze directions when the length of time elapsed since the previous time of flight measurement is less than a threshold; and selecting the second preliminary gaze estimates as the estimated gaze directions when the length of time elapsed since the previous time of flight measurement is greater than the threshold.

Example 75: The method of Example 73: wherein the at least one virtual source comprises the first location when the first preliminary gaze estimates are selected, and wherein the at least one virtual source comprise a third location when the second preliminary gaze estimates are selected.

Example 76: The method of any of Examples 72-75: wherein estimating the gaze directions based on fusion of the first preliminary estimates and the second preliminary estimates comprises: based on at least one confidence metric, applying weightings to at least one of the first preliminary gaze estimates and the second preliminary gaze estimates; and combining the weighted first preliminary gaze estimates and the second preliminary gaze estimates into the estimated gaze directions.

Example 77: The method of Example 76: wherein the at least one confidence metric comprises a length of time elapsed since a previous time of flight measurement; and wherein applying weightings to at least one of the first preliminary gaze estimates and the second preliminary gaze estimates comprises: applying a relatively higher weighting to the first preliminary gaze estimates than the second preliminary gaze estimates when the length of time elapsed since the previous time of flight measurement is less than a threshold length of time; and applying a relatively lower weighting to the first preliminary gaze estimates than the second preliminary gaze estimates when the length of time elapsed since the previous time of flight measurement is greater than the threshold length of time.

Example 78: The method of Example 76: wherein the at least one confidence metric comprises a condition that the user has moved since a previous time of flight measurement; and wherein applying weightings to at least one of the first preliminary gaze estimates and the second preliminary gaze estimates comprises: applying a relatively lower weighting to the first preliminary gaze estimates than the second preliminary gaze estimates when the condition that the user has moved since the previous time of flight measurement is present; and applying a relatively higher weighting to the first preliminary gaze estimates than the second preliminary gaze estimates when the condition that the user has moved since the previous time of flight measurement is not present.

Example 79: The method of Example 76: wherein the at least one confidence metric comprises an IMU drift estimate; and wherein applying weightings to at least one of the first preliminary gaze estimates and the second preliminary gaze estimates comprises: applying a relatively lower weighting to the second preliminary gaze estimates than the first preliminary gaze estimates when the IMU drift estimate is greater than an IMU drift threshold; and applying a relatively higher weighting to the second preliminary gaze estimates than the first preliminary gaze estimates when the IMU drift estimate is less than the IMU drift threshold.

Example 80: The method of any of Examples 72-79, wherein determining the first preliminary estimates of the user gaze direction comprises: capturing, via at least one first microphone and at least one second microphone, a signal emitted by at least one audio transducer of the non-wearable playback device; estimating respective times-of-arrival at the at least one first microphone and the at least one second microphone; estimating pairwise angle-of-arrivals from the estimated times-of-arrival; and calculating the first preliminary estimates from the estimated pairwise angle-of-arrivals.

Example 81: The method of any of Examples 72-80, wherein determining the second preliminary estimate of the user gaze direction comprises: receiving quaternion samples from the IMU; standardizing the quaternion samples; calculating angular variation in the standardized quaternion samples; determining that a range of head rotation over a time period is within a threshold; and when the range of head rotation over the time period is determined to be within the threshold, average the standardized quaternion samples.

Example 82: The method of any of Examples 72-81, further comprising: detecting that a threshold period of time has elapsed since a previous time-of-flight measurement; and sending, via a wireless network interface, instructions to trigger a new time-of-flight measurement.

Example 83: The method of any of Examples 72-82, further comprising: detecting that the user has changed position; and sending, via a wireless network interface, instructions to trigger a new time-of-flight measurement.

Example 84: A tangible, non-transitory, computer-readable medium having instructions stored thereon that are executable by one or more processors to cause a media playback system to perform the method of any one of Examples 72-83.

Example 85: A media playback system comprising a playback device and a headphone device, the media playback system configured to perform the method of any one of Examples 72-83.

Example 86: A playback device comprising a network interface, a microphone, one or more processors, and a data storage having instructions stored thereon that are executable by the one or more processors to cause the playback device to perform the method of any of Examples 72-82.

Example 87 A headphone device comprising a network interface, a microphone, one or more processors, and a data storage having instructions stored thereon that are executable by the one or more processors to cause the headphone device to perform the method of any of Examples 72-82.

Example 88: A method comprising: sending, via a wireless network interface, instructions to play a localization signal on a non-wearable playback device at a first location in a listening environment; while a wearable playback device is donned by a user at a second location in the listening environment, capturing, via microphones of the wearable playback device; recordings of the localization signal, wherein the microphones comprise first microphones carried on a first earcup of the wearable playback device and second microphones carried on a second earcup of the wearable playback device; determining respective times-of-arrival of the localization signal at the microphones; determining pairwise angles-of-arrival for each pair of the microphones that are on opposite earcups such that each pair includes one of the first microphones and one of the second microphones; determining an ensemble angle-of-arrival based on the determined pairwise angles-of-arrival; adding the determined ensemble angle-of-arrival to a buffer representing estimated user gaze directions; determining head tracking data based on a rotation of samples from an inertial measurement unit (IMU) to a reference frame centered on the estimated gaze directions stored in the buffer; during binaural rendering of the audio via a binaural renderer, updating binaural rendering filters with the determined head tracking data; and causing the wearable playback device to play back the binaural-rendered audio to simulate playback from at least one virtual source in the listening environment, wherein the at least virtual source comprises the non-wearable playback device at the first location.

Example 89: The method of Example 88, wherein determining the respective times-of-arrival of the localization signal at the microphones comprises: estimating impulse responses for each recording of the localization signal; and detecting respective onsets of the localization signal in the estimated impulse responses as the respective times-of-arrival.

Example 90: The method of any of Examples 88-89, wherein determining the pairwise angles-of-arrival for each pair of the microphones comprises: determining pairwise time-differences-of-arrival between each pair of microphones; and determining pairwise angles-of-arrival based on the respective pairwise time-differences-of-arrival.

Example 91: The method of Example 90: wherein determining the pairwise angles-of-arrival based on the respective pairwise time-differences-of-arrival comprises: adjusting geometry of the pairwise angles-of-arrival determination from a default inter-aural distance to an estimated inter-aural distance.

Example 92: The method of Example 90: wherein determining pairwise angles-of-arrival for each pair of the microphones comprises: applying one or more discriminators to reject recordings that are outside of thresholds corresponding to the respective discriminator.

Example 93: The method of any of Examples 88-92: wherein determining the ensemble angle-of-arrival based on the determined pairwise angles-of-arrival comprises: applying per-pair weightings to the determined pairwise angles-of-arrival based on at least one confidence metric; and determining the ensemble angle-of-arrival based on the weighted pairwise angles-of-arrival.

Example 94: The method of any of Examples 88-93: wherein adding the determined ensemble angle-of-arrival to a buffer comprises: adding the determined ensemble angle-of-arrival to the buffer when the determined ensemble angle-of-arrival is not an outlier relative to additional ensemble angles-of-arrival stored in the buffer.

Example 95: The method of any of Examples 88-94: further comprising: detecting that a threshold period of time has elapsed since user gaze direction was last estimated, wherein sending the instructions to play the localization signal on the non-wearable playback device comprises: based on the detection that the threshold period of time has elapsed since user gaze direction was last estimated, sending the instructions to play the localization signal on the non-wearable playback device.

Example 96: The method of any of Examples 88-95: further comprising: detecting that the user has changed position, wherein sending the instructions to play the localization signal on the non-wearable playback device comprises: based on the detection that the user has changed position, sending the instructions to play the localization signal on the non-wearable playback device.

Example 97: The method of any of Examples 88-96: wherein a first set of estimated gaze directions comprises the estimated gaze directions stored in the buffer, wherein a second set of estimated gaze directions comprises additional estimated gaze directions based on samples from the IMU, and wherein the method further comprises: based on at least one confidence metric, selecting the first set of estimated gaze directions from among two or more sets of estimated gaze directions, wherein the two or more sets comprise the first set and the second set.

Example 98: A tangible, non-transitory, computer-readable medium having instructions stored thereon that are executable by one or more processors to cause a media playback system to perform the method of any one of Examples 88-97.

Example 99: A media playback system comprising a playback device and a headphone device, the media playback system configured to perform the method of any one of Examples 88-97.

Example 100: A playback device comprising a network interface, a microphone, one or more processors, and a data storage having instructions stored thereon that are executable by the one or more processors to cause the playback device to perform the method of any of Examples 88-97.

Example 101: A headphone device comprising a network interface, a microphone, one or more processors, and a data storage having instructions stored thereon that are executable by the one or more processors to cause the headphone device to perform the method of any of Examples 88-97.

Example 102: A method comprising: playing back first audio via first audio transducers of a non-wearable playback device while a wearable playback device is located at a first location in an environment; capturing, via one or more microphones of the wearable playback device while the wearable playback device is in the environment, second audio representing playback of the first audio in the environment; generating a set of binaural rendering filters from target data based on the captured second audio; configuring a binaural renderer with the generated set of binaural rendering filters; rendering, via the configured binaural renderer, third audio from audio input signals, wherein the rendered third audio is configured to simulate playback from virtual sources within the environment when played back via the wearable playback device, wherein the virtual sources include a first virtual source at the first location and one or more second virtual sources at respective second locations; while the wearable playback device is donned by a user, estimating gaze directions based on one or more time-of-flight measurements of at least one signal propagating between the non-wearable playback device at the second location in the environment to the wearable playback device at the first location in the environment; and during binaural rendering of the audio via the binaural renderer, updating the set of binaural rendering filters with head tracking data based on the estimated gaze directions to maintain simulation of playback from the virtual sources after head rotation.

Example 103: The method of Example 102, further comprising: determining, via at least one processor of a control device, the target data from the captured second audio, the target data comprising target room parameters.

Example 104: The method of Example 103: further comprising: establishing an audio communications channel between the wearable playback device and the control device; sending, via the established audio communications channel from the wearable playback device to the control device, at least one of (a) telephony data or (b) voice input data; and sending data representing the captured second audio to the control device via the previously established audio communications channel.

Example 105: The method of any of Examples 102-104, wherein generating the set of binaural rendering filters based on the target data comprises: determining target data from the captured second audio, the target data comprising target room parameters; adapting, based on the target room parameters, reference binaural rendering impulse response filters to an early reflections model representing reflections of the sound in the environment before a particular mixing time; generating, from the target room parameters, a late reverberation model representing reverberation of the sound in the environment after the particular mixing time; and synthesizing a set of binaural rendering filters comprising a direct sound model, the determined early reflections model, and the determined late reverberation model, the direct sound model based on reference head-related impulse response data.

Example 106: The method of Example 105, wherein the target data comprises a target late reverberation time, and wherein generating the late reverberation model comprises: shaping a noise sequence to match the target late reverberation time.

Example 107: The method of Example 105, wherein the target data comprises a target late reverberation time, and wherein generating the late reverberation model comprises: rendering the late reverberation model with a parametric reverberator (880) that is tuned to generate late reverberation with the target late reverberation time.

Example 108: The method of any of Examples 102-107, wherein the wearable playback device comprises an inertial measurement unit (IMU), and wherein estimating the gaze directions comprises: determining, via a first gaze direction estimator, first preliminary estimates of user gaze direction, the first preliminary estimates based on the one or more time-of-flight measurements; determining, via a second gaze direction estimator, second preliminary estimates of user gaze direction, the second preliminary estimates based on first samples from an inertial measurement unit (IMU); estimating the gaze directions based on fusion of the first gaze direction estimates and the second preliminary estimates; and determining the head tracking data based on a rotation of second samples from the IMU to a reference frame centered on the estimated gaze directions.

Example 109: The method of Example 108, wherein estimating the gaze directions comprises: based on at least one confidence metric, selecting the estimated gaze directions from among (a) the first preliminary gaze estimates and (b) the second preliminary gaze estimates.

Example 110: The method of Example 109, wherein the at least one confidence metric comprises a length of time elapsed since a previous time of flight measurement; and wherein selecting the estimated gaze directions comprises: selecting the first preliminary gaze estimates as the estimated gaze directions when the length of time elapsed since the previous time of flight measurement is less than a threshold; and selecting the second preliminary gaze estimates as the estimated gaze directions when the length of time elapsed since the previous time of flight measurement is greater than the threshold.

Example 111: The method of Example 108, wherein estimating the gaze directions comprises: based on at least one confidence metric, applying weightings to at least one of the first preliminary gaze estimates and the second preliminary gaze estimates; and combining the weighted first preliminary gaze estimates and the second preliminary gaze estimates into the estimated gaze directions.

Example 112: The method of any of Examples 108-111, wherein determining the first preliminary estimates of the user gaze direction comprises: capturing, via at least one first microphone and at least one second microphone, a signal emitted by at least one audio transducer of the non-wearable playback device; estimating respective times-of-arrival at the at least one first microphone and the at least one second microphone; estimating pairwise angle-of-arrivals from the estimated times-of-arrival; and calculating the first preliminary estimates from the estimated pairwise angle-of-arrivals.

Example 112: The method of any of Examples 108-112 wherein determining the second preliminary estimates of the user gaze direction comprises: receive quaternion samples from the IMU; standardize the quaternion samples; calculate angular variation in the standardized quaternion samples; determine that a range of head rotation over a time period is within a threshold; and when the range of head rotation over the time period is determined to be within the threshold, average the standardized quaternion samples.

Example 113: The method of any of Examples 102-112, further comprising: receiving a command to initiate playback of audio content comprising the third audio on the wearable playback device in the environment; based on receiving the command to initiate playback of the audio content on the wearable playback device, forming a playback configuration with the non-wearable playback device in the environment, wherein the non-wearable playback device is connected to a source of the audio content; enabling, on the binaural renderer, a context-aware binaural rendering mode; receiving a command to initiate playback of the audio content on an additional wearable playback device in the environment; based on receiving the command to initiate playback of the audio content on the additional wearable playback device, adding the additional wearable playback device to the playback configuration; and based on adding the additional wearable playback device to the playback configuration, transitioning the binaural renderer to a context-agnostic rendering mode.

Example 114: The method of any of Examples 102-113, further comprising: when a first trigger occurs, determining, via a position detector, first relative positioning between the wearable playback device and the non-wearable playback device, wherein the non-wearable playback device is configured as a particular room of a media playback system; when the first relative positioning indicates that the wearable playback device is within a particular room, enabling a first head-tracking mode on a head tracker (1150), wherein in the first head-tracking mode, the head tracker determines first directions-of-center indicating orientations of the wearable playback device relative to the non-wearable playback device; while in the first head-tracking mode, rendering, via the binaural renderer, a first portion of the third audio, wherein, in the first head-tracking mode, the binaural renderer is configured to rotate audio according to the first directions-of-center during binaural rendering; when a second trigger occurs, determining, via the position detector, second relative positioning between the wearable playback device and the non-wearable playback device; when the second relative positioning indicates that the wearable playback device is outside the particular room, switching from the first head-tracking mode to a second head-tracking mode, wherein in the second head-tracking mode, the head tracker determines second directions-of-center indicating orientations of the wearable playback device relative to gaze directions; and while in the second head-tracking mode, rendering, via the binaural renderer, a second portion of the third audio, wherein, in the second head-tracking mode, the binaural renderer is configured to rotate audio according to the second directions-of-center during binaural rendering.

Example 115: A tangible, non-transitory, computer-readable medium having instructions stored thereon that are executable by one or more processors to cause a system to perform the method of any one of Examples 102-114.

Example 116: A system comprising a wearable playback device playback device and a non-wearable playback device, the system configured to perform the method of any one of Examples 102-114.

Example 117: A wearable playback device comprising a network interface, a microphone, one or more processors, and a data storage having instructions stored thereon that are executable by the one or more processors to cause the wearable playback device to perform the method of any of Examples 102-114.

Example 118: A device comprising a network interface, a microphone, one or more processors, and a data storage having instructions stored thereon that are executable by the one or more processors to cause the device to perform the method of any of Examples 102-114.

I claim:

1. A system comprising:
   a network interface;
   at least one processor; and
   at least one non-transitory computer-readable medium comprising program instructions that are executable by the at least one processor such that the system is configured to:

receive a command to initiate playback of audio content on a first headphone device in a listening environment;

based on receipt of the command to initiate playback of the audio content on the first headphone device, form a playback configuration with a playback device in the listening environment, wherein the playback device is connected to a source of the audio content;

enable, on a binaural renderer, a context-aware binaural rendering mode, wherein, in the context-aware binaural rendering mode, the binaural renderer is configured with (i) position parameters corresponding to a user position within the listening environment and (ii) head tracking data representing user head orientation;

while the context-aware binaural rendering mode is enabled on the binaural renderer, render, via the binaural renderer, first binaural audio from the audio content;

while the first headphone device is in the playback configuration with the playback device, cause the first headphone device to play back the rendered first binaural audio;

receive a command to initiate playback of the audio content on a second headphone device in the listening environment;

based on receipt of the command to initiate playback of the audio content on the second headphone device, add the second headphone device to the playback configuration;

based on addition of the second headphone device to the playback configuration, transition the binaural renderer to a context-agnostic rendering mode, wherein, in the context-agnostic listening mode, the binaural renderer is not configured with the (i) position parameters corresponding to the user position within the listening environment and (ii) the head tracking data representing user head orientation;

while the context-agnostic binaural rendering mode is enabled on the binaural renderer, render, via the binaural renderer, second binaural audio from the audio content; and while the first headphone device and the second headphone device are in the playback configuration with the playback device, cause the first headphone device and the second headphone device to play back the rendered second binaural audio.

2. The system of claim 1, wherein the at least one non-transitory computer readable medium further comprises program instructions that are executable by the at least one processor such that the system is configured to:

while the first headphone device and the second headphone device are in the playback configuration, receive a command to stop playback of the audio content on the second headphone device in the listening environment;

based on receipt of the command to stop playback of the audio content on the second headphone device in the listening environment, remove the second headphone device from the playback configuration; and based on removal of the second headphone device from the playback configuration, transition the binaural renderer to the context-aware rendering mode.

3. The system of claim 1, wherein the at least one non-transitory computer readable medium further comprises program instructions that are executable by the at least one processor such that the system is configured to:

while the first headphone device and the second headphone device are in the playback configuration, receive a command to stop playback of the audio content on the first headphone device in the listening environment;

based on receipt of the command to stop playback of the audio content on the first headphone device in the listening environment, remove the first headphone device from the playback configuration; and after removal of the first headphone device from the playback configuration, maintain the binaural renderer in the context-agnostic rendering mode.

4. The system of claim 1, wherein the program instructions that are executable by the at least one processor such that the system is configured to render the first binaural audio from the audio content comprise program instructions that are executable by the at least one processor such that the system is configured to:

render, via the binaural renderer, the first binaural audio from the audio content such that the first binaural audio appears to be playing out-loud within the listening environment when played back by the first headphone device.

5. The system of claim 4, wherein the program instructions that are executable by the at least one processor such that the system is configured to render the first binaural audio from the audio content comprise program instructions that are executable by the at least one processor such that the system is configured to:

apply the position parameters to the rendering, via the binaural renderer, of the first binaural audio from the audio content such that the first binaural audio appears to originate from the playback device within the listening environment when played back by the first headphone device.

6. The system of claim 4, wherein, in the context-aware binaural rendering mode, the binaural renderer is further configured with head-tracking data representing orientations of the first headphone device, and wherein the program instructions that are executable by the at least one processor such that the system is configured to render the first binaural audio from the audio content comprise program instructions that are executable by the at least one processor such that the system is configured to:

apply head-tracking data to rendering, via the binaural renderer, of the first binaural audio from the audio content such that, as the user turns their head, the first binaural audio appears to originate from an external source within the listening environment when played back by the first headphone device.

7. The system of claim 6, wherein the at least one non-transitory computer readable medium further comprises program instructions that are executable by the at least one processor such that the system is configured to:

while in the context-agnostic mode, receive a command to enable head-tracking on the second headphone device; and based on receipt of the command to enable head-tracking on the first headphone device, transition to an additional context-aware mode, wherein in the additional context-aware mode, head-tracking data is applied to rendering, via the binaural renderer, of the second binaural audio from the audio content such that the second binaural audio appears to originate from the external source within the listening environment when played back by the second headphone device.

8. The system of claim 1, wherein, in the context-aware listening mode, the binaural renderer is configured with first room parameters corresponding to the listening environment and wherein, in the context-agnostic listening mode, the binaural renderer is configured with second room parameters corresponding to a default listening environment that is different from the listening environment.

9. The system of claim 1, wherein the playback device comprises the binaural renderer, and wherein the program instructions that are executable by the at least one processor such that the system is configured to cause the first headphone device and the second headphone device to play back the rendered second binaural audio comprise program instructions that are executable by the at least one processor such that the system is configured to:
send, via the network interface, data representing the rendered first binaural audio to the first headphone device and the second headphone device.

10. The system of claim 1, wherein the first headphone device comprises a touch-sensitive control interface, and wherein the program instructions that are executable by the at least one processor such that the system is configured to receive the command to initiate playback of audio content on the first headphone device in the listening environment comprise program instructions that are executable by the at least one processor such that the system is configured to:
receive, via the touch-sensitive control interface, particular touch input corresponding to the command to initiate playback of audio content on the first headphone device.

11. The system of claim 1, wherein the program instructions that are executable by the at least one processor such that the system is configured to form the playback configuration with the playback device in the listening environment comprise program instructions that are executable by the at least one processor such that the system is configured to:
while the playback device is playing the audio content, fade-out volume level of the playback device from a given perceptible level to an imperceptible level; and concurrently, fade-in volume level of the first headphone device to match the given perceptible level.

12. The system of claim 10, wherein the program instructions that are executable by the at least one processor such that the system is configured to form the playback configuration with the playback device in the listening environment comprise program instructions that are executable by the at least one processor such that the system is configured to:
during at least a portion of the fade-out of the volume level, adjust an ambient sound filter from a given setting to a full setting such that the fade-out is audible while the first headphone device is worn; and
after the fade-out, adjust the ambient sound filter to the given setting.

13. The system of claim 10, wherein the program instructions that are executable by the at least one processor such that the system is configured to form the playback configuration with the playback device in the listening environment comprise program instructions that are executable by the at least one processor such that the system is configured to:
during at least a portion of the fade-out of the volume level, enable active-noise cancellation on the first headphone device; and
after the fade-out, disable active noise cancellation.

14. The system of claim 1, wherein the playback device comprises a high-definition multimedia interface (HDMI) port, wherein the source of the audio content comprises the HDMI port, and wherein the at least one non-transitory computer readable medium further comprises program instructions that are executable by the at least one processor such that the system is configured to:
receive, via the HDMI port from a television, the audio content.

15. At least one non-transitory computer-readable medium comprising program instructions that are executable by at least one processor such that a system is configured to:
receive a command to initiate playback of audio content on a first headphone device in a listening environment;
based on receipt of the command to initiate playback of the audio content on the first headphone device, form a playback configuration with a playback device in the listening environment, wherein the playback device is connected to a source of the audio content;
enable, on a binaural renderer, a context-aware binaural rendering mode, wherein, in the context-aware binaural rendering mode, the binaural renderer is configured with (i) position parameters corresponding to a user position within the listening environment and (ii) head tracking data representing user head orientation;
while the context-aware binaural rendering mode is enabled on the binaural renderer, render, via the binaural renderer, first binaural audio from the audio content;
while the first headphone device is in the playback configuration with the playback device, cause the first headphone device to play back the rendered first binaural audio;
receive a command to initiate playback of the audio content on a second headphone device in the listening environment;
based on receipt of the command to initiate playback of the audio content on the second headphone device, add the second headphone device to the playback configuration;
based on addition of the second headphone device to the playback configuration, transition the binaural renderer to a context-agnostic rendering mode, wherein, in the context-agnostic listening mode, the binaural renderer is not configured with the (i) position parameters corresponding to the user position within the listening environment and (ii) the head tracking data representing user head orientation;
while the context-agnostic binaural rendering mode is enabled on the binaural renderer, render, via the binaural renderer, second binaural audio from the audio content; and
while the first headphone device and the second headphone device are in the playback configuration with the playback device, cause the first headphone device and the second headphone device to play back the rendered second binaural audio.

16. The at least one non-transitory computer-readable medium of claim 15, wherein the at least one non-transitory computer readable medium further comprises program instructions that are executable by the at least one processor such that the system is configured to:
while the first headphone device and the second headphone device are in the playback configuration, receive a command to stop playback of the audio content on the second headphone device in the listening environment;
based on receipt of the command to stop playback of the audio content on the second headphone device in the listening environment, remove the second headphone device from the playback configuration; and based on removal of the second headphone device from the playback configuration, transition the binaural renderer to the context-aware rendering mode.

17. The at least one non-transitory computer-readable medium of claim 15, wherein the at least one non-transitory computer readable medium further comprises program instructions that are executable by the at least one processor such that the system is configured to:
while the first headphone device and the second headphone device are in the playback configuration, receive a command to stop playback of the audio content on the first headphone device in the listening environment;
based on receipt of the command to stop playback of the audio content on the first headphone device in the listening environment, remove the first headphone device from the playback configuration; and
after removal of the first headphone device from the playback configuration, maintain the binaural renderer in the context-agnostic rendering mode.

18. The at least one non-transitory computer-readable medium of claim 15, wherein the program instructions that are executable by the at least one processor such that the system is configured to render the first binaural audio from the audio content comprise program instructions that are executable by the at least one processor such that the system is configured to:
render, via the binaural renderer, the first binaural audio from the audio content such that the first binaural audio appears to be playing out-loud within the listening environment when played back by the first headphone device.

19. The at least one non-transitory computer-readable medium of claim 15, wherein the program instructions that are executable by the at least one processor such that the system is configured to form the playback configuration with the playback device in the listening environment comprise program instructions that are executable by the at least one processor such that the system is configured to:
while the playback device is playing the audio content, fade-out volume level of the playback device from a given perceptible level to an imperceptible level; and
concurrently, fade-in volume level of the first headphone device to match the given perceptible level.

20. A method comprising:
receiving a command to initiate playback of audio content on a first headphone device in a listening environment;
based on receiving the command to initiate playback of the audio content on the first headphone device, forming a playback configuration with a playback device in the listening environment, wherein the playback device is connected to a source of the audio content;
enabling, on a binaural renderer, a context-aware binaural rendering mode, wherein, in the context-aware binaural rendering mode, the binaural renderer is configured with (i) position parameters corresponding to a user position within the listening environment and (ii) head tracking data representing user head orientation;
while the context-aware binaural rendering mode is enabled on the binaural renderer, rendering, via the binaural renderer, first binaural audio from the audio content;
while the first headphone device is in the playback configuration with the playback device, causing the first headphone device to play back the rendered first binaural audio;
receiving a command to initiate playback of the audio content on a second headphone device in the listening environment;
based on receiving the command to initiate playback of the audio content on the second headphone device, adding the second headphone device to the playback configuration;
based on adding the second headphone device to the playback configuration, transitioning the binaural renderer to a context-agnostic rendering mode, wherein, in the context-agnostic listening mode, the binaural renderer is not configured with the (i) position parameters corresponding to the user position within the listening environment and (ii) the head tracking data representing user head orientation;
while the context-agnostic binaural rendering mode is enabled on the binaural renderer, rendering, via the binaural renderer, second binaural audio from the audio content; and
while the first headphone device and the second headphone device are in the playback configuration with the playback device, causing the first headphone device and the second headphone device to play back the rendered second binaural audio.

\* \* \* \* \*